(12) United States Patent
Hoshino

(10) Patent No.: US 8,243,459 B2
(45) Date of Patent: Aug. 14, 2012

(54) ELECTRONIC APPARATUS

(75) Inventor: Hironari Hoshino, Tokyo (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 12/837,804

(22) Filed: Jul. 16, 2010

(65) Prior Publication Data

US 2011/0063809 A1 Mar. 17, 2011

(30) Foreign Application Priority Data

Sep. 14, 2009 (JP) ................................. 2009-211852

(51) Int. Cl.
*H05K 5/00* (2006.01)
(52) U.S. Cl. .......................... 361/755; 361/715; 361/728
(58) Field of Classification Search .................. 361/600, 361/679.01, 715, 728–730, 755; 455/575.1–575.4; 206/387.13, 459.5, 472; 417/204, 486, 269; 720/728, 732, 733

See application file for complete search history.

(56) References Cited

U.S. PATENT DOCUMENTS

| | | | | |
|---|---|---|---|---|
| 6,901,937 | B2* | 6/2005 | Sebban | 132/301 |
| 7,426,406 | B2* | 9/2008 | Maatta et al. | 455/575.8 |
| 7,484,271 | B2* | 2/2009 | Oshima et al. | 16/366 |
| 7,512,426 | B2* | 3/2009 | Maatta et al. | 455/575.1 |
| 7,667,959 | B2* | 2/2010 | Pelkonen | 361/679.27 |
| 7,730,587 | B2* | 6/2010 | Chang et al. | 16/340 |
| 2005/0101358 | A1* | 5/2005 | Carpenter | 455/575.1 |
| 2011/0080702 | A1* | 4/2011 | Ladouceur et al. | 361/679.09 |

FOREIGN PATENT DOCUMENTS

| | | |
|---|---|---|
| JP | 3852150 | 9/2006 |
| JP | 2008-75747 | 4/2008 |

OTHER PUBLICATIONS

U.S. Appl. No. 13/190,851, filed Jul. 26, 2011, Hoshino.

* cited by examiner

*Primary Examiner* — Hung S Bui
(74) *Attorney, Agent, or Firm* — Oblon, Spivak, McClelland, Maier & Neustadt, L.L.P.

(57) ABSTRACT

An electronic apparatus includes a rectangular-parallelepiped first casing, a rectangular-parallelepiped second casing, and a first connecting apparatus. The first connecting apparatus connects the first casing and the second casing such that the first casing and the second casing are capable of being rotated relatively in one of a first rotation direction and a second rotation direction orthogonal to each other between a first state and a second state. The first state is a state where a first main surface of the first casing comes to be faced with a third main surface of the second casing. The second state is a state where a second main surface of the first casing comes to be faced with a fourth main surface of the second casing.

12 Claims, 44 Drawing Sheets

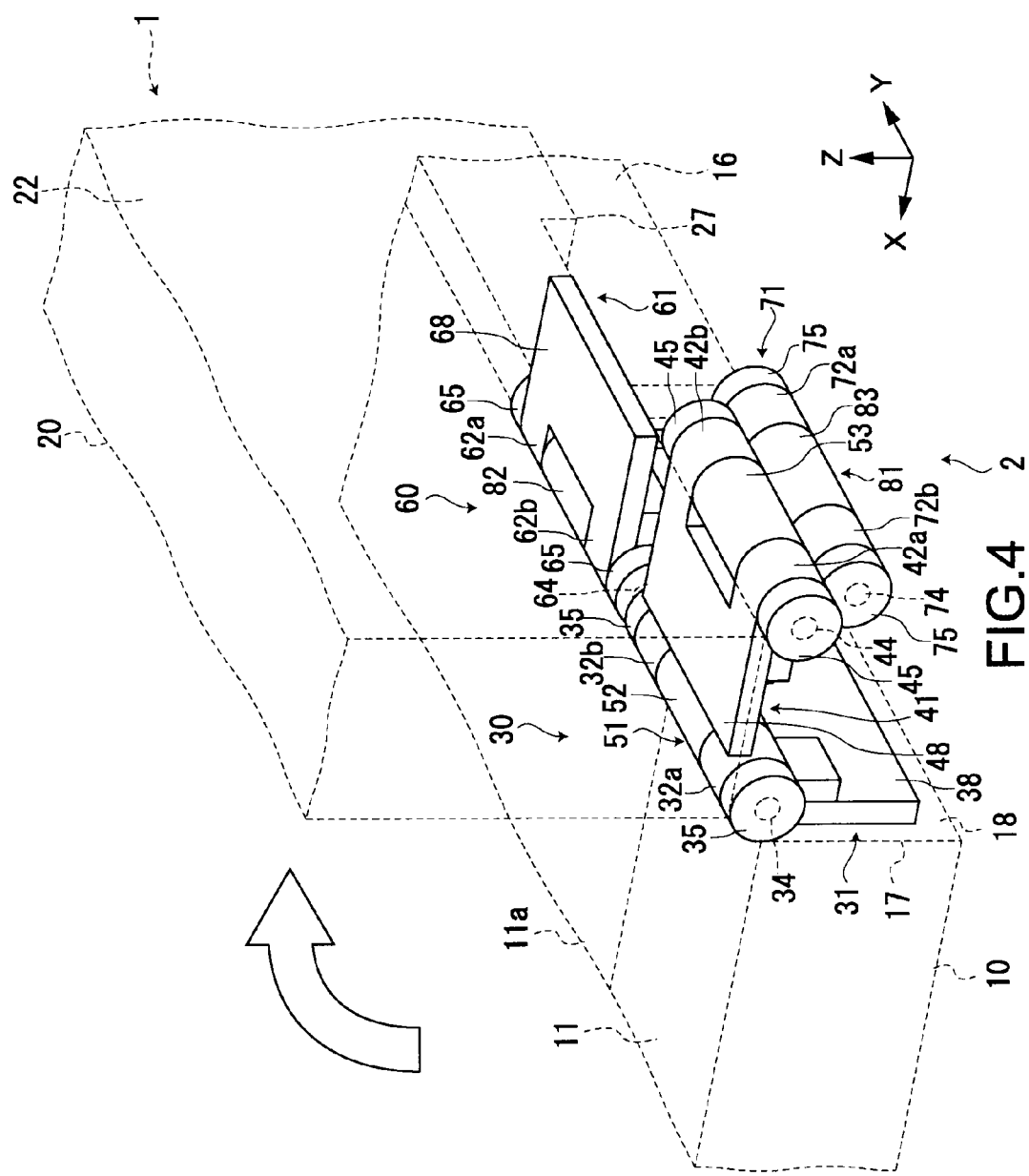

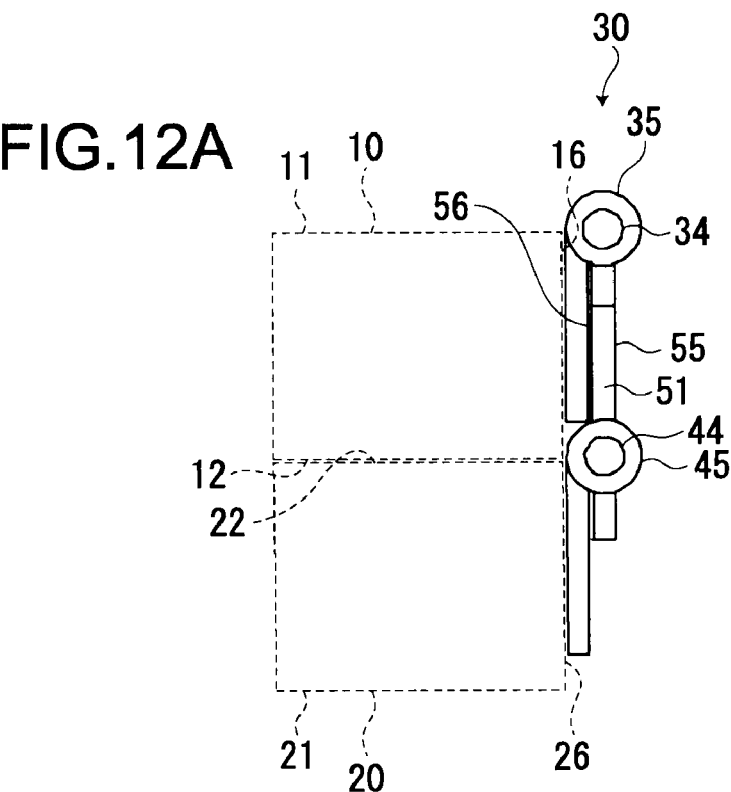
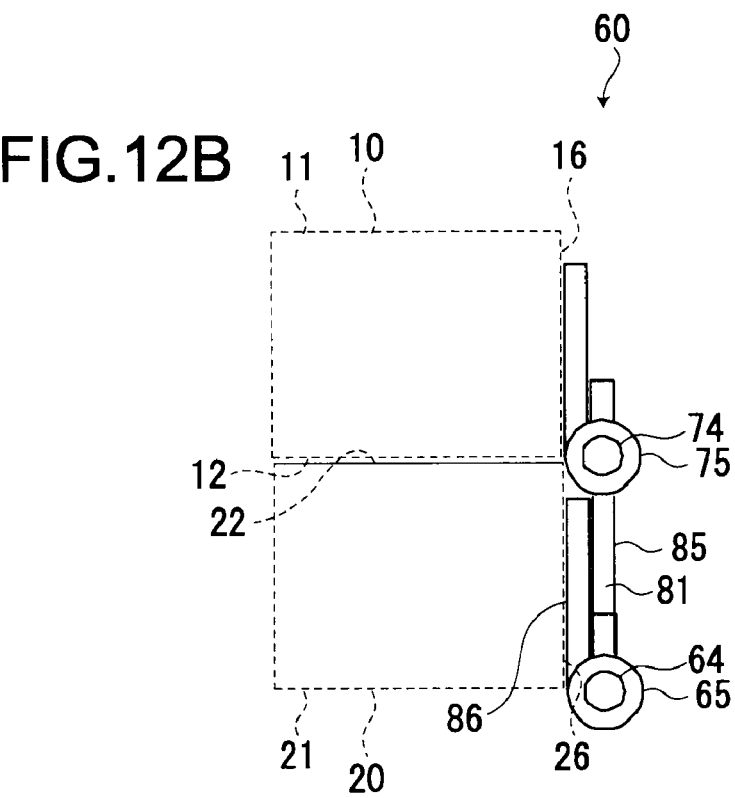

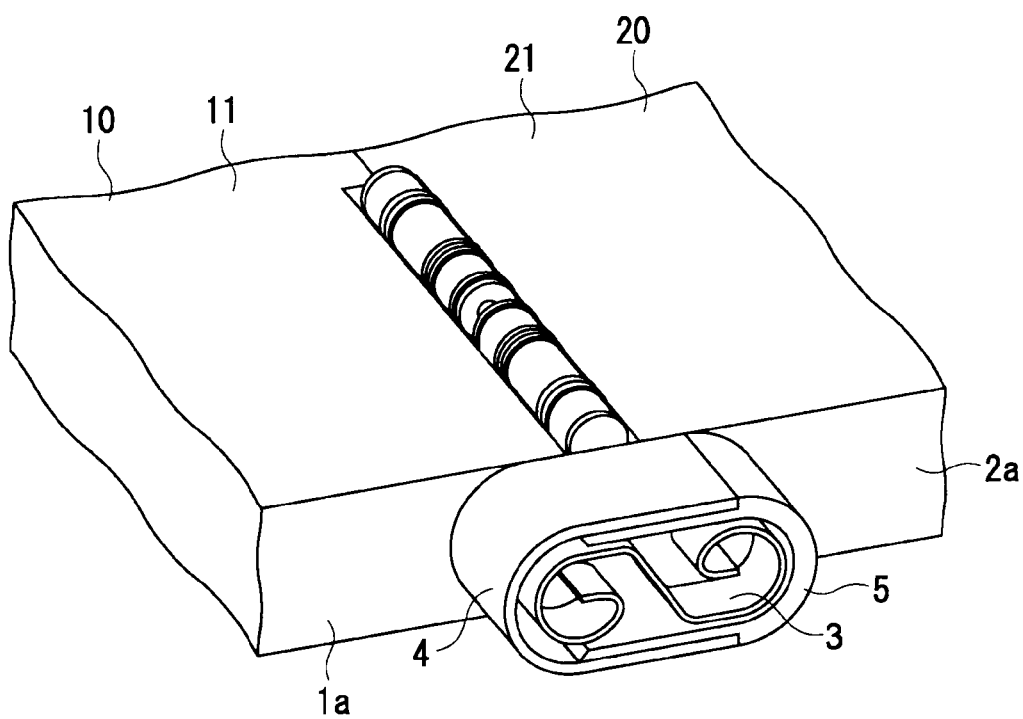
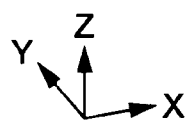
FIG.17

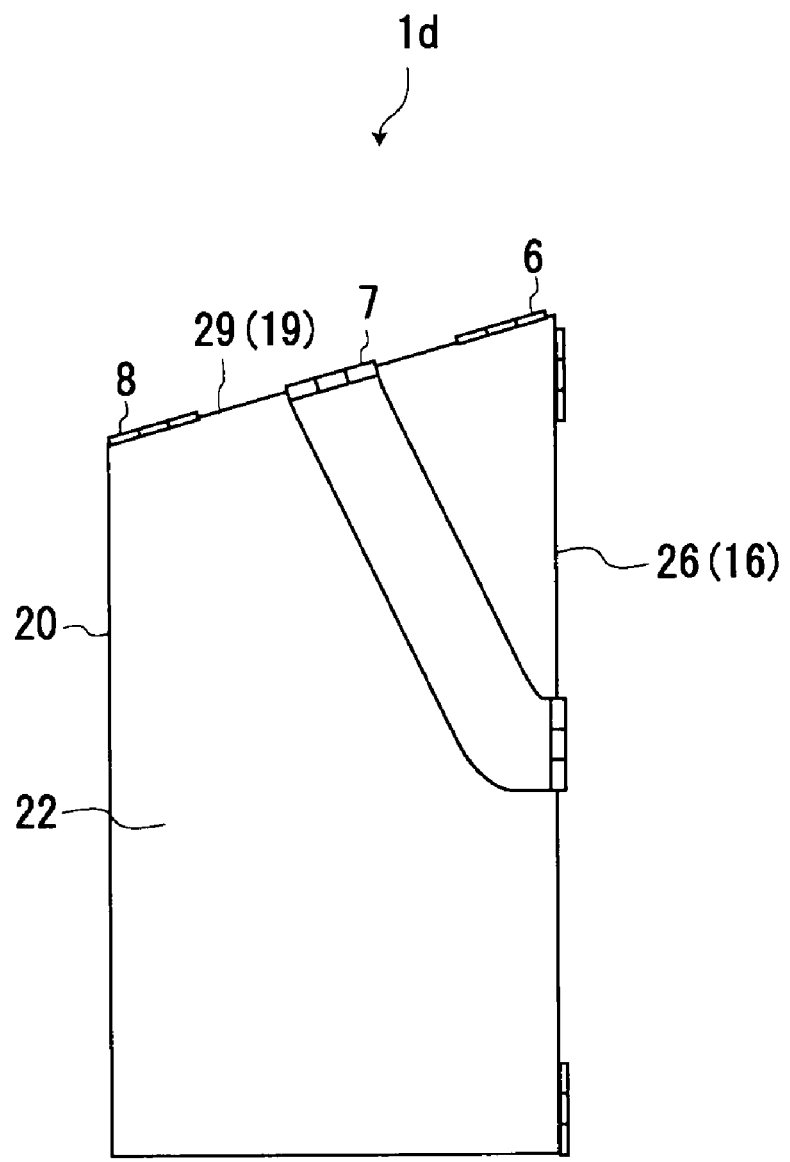
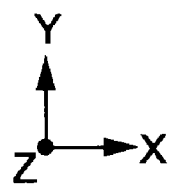
FIG.41

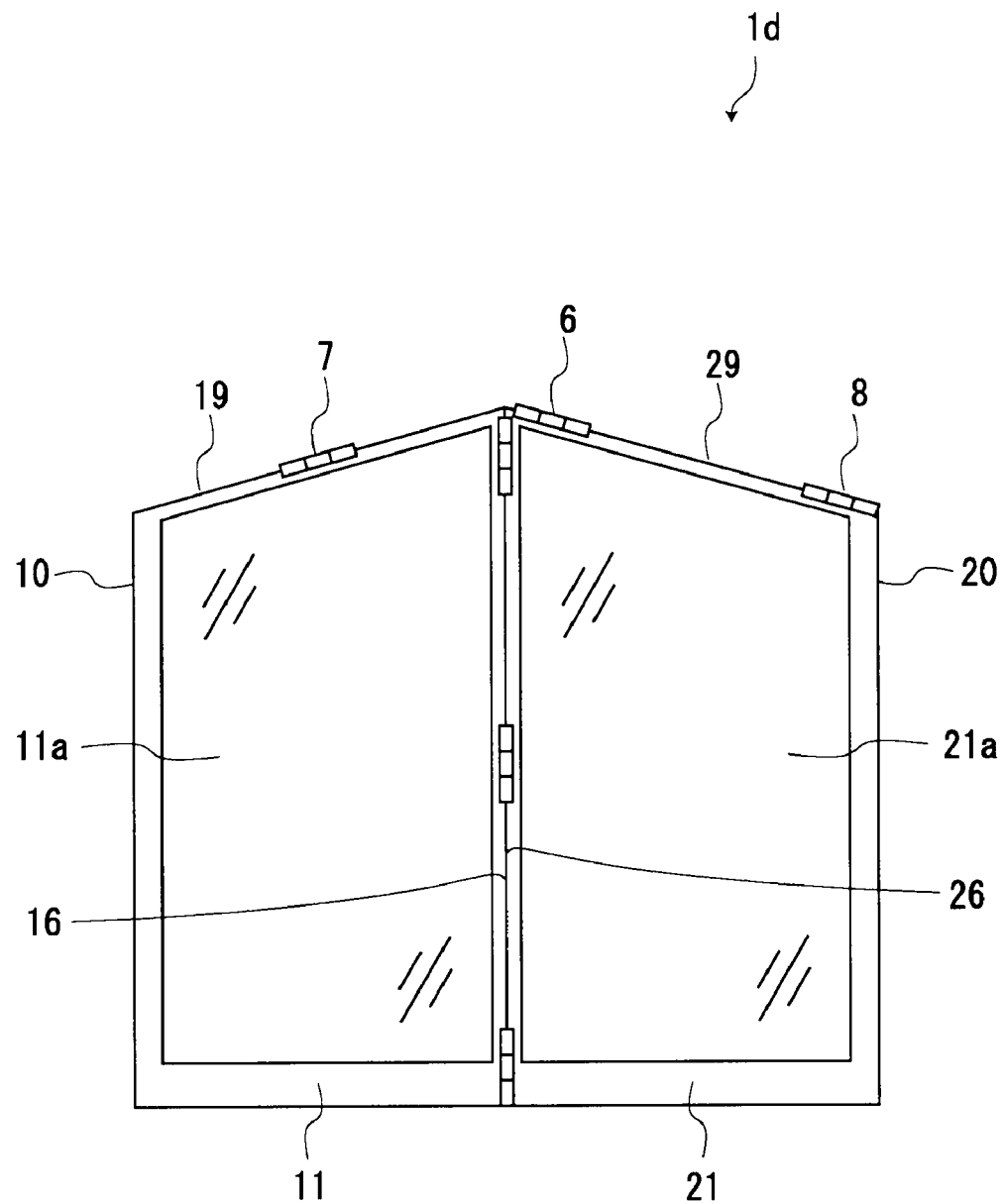
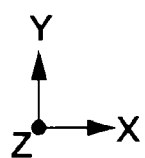
FIG.44

ELECTRONIC APPARATUS

BACKGROUND OF THE INVENTION

1. Field of the Invention

The present invention relates to an electronic apparatus having a structure in which two casings are capable of being rotated relatively.

2. Description of the Related Art

In the field of an electronic apparatus having a structure in which two casings are capable of being rotated relatively such as a flip mobile phone or a laptop personal computer, an electronic apparatus having two casings connected by a connecting apparatus such that the two casings are capable of being rotated relatively by 360° is provided, for example, in Japanese Patent Application Laid-open No. 2008-75747 (paragraphs 0017 and 0077, FIGS. 1 and 6-8) (hereinafter, referred to as Patent Document 1).

In the electronic apparatus of Patent Document 1, between the two casings, that is, between a first member having an operating unit and a second member having a display unit, a hinge apparatus rotatably connecting the two casings is provided. The hinge apparatus includes a first rotation shaft unit and a second rotation shaft unit in parallel to each other. The first member is rotatably provided via the first rotation shaft unit, and the second member is rotatably provided via the second rotation shaft unit. A first rotation unit and a second rotation unit capable being rotated relatively are provided on the first rotation shaft unit and the second rotation shaft unit, respectively. The first rotation unit and the second rotation unit are connected by an interlocking link unit such that the second rotation unit is capable of being rotated by rotating the first rotation unit through transmission and interlock. Accordingly, the two casings, that is, the first member and the second member, are capable of being rotated relatively by 360° via the hinge apparatus.

SUMMARY OF THE INVENTION

However, according to Patent Document 1, in a state where the electronic apparatus is closed, on the end portions of the two casings overlapped in a manner that the entire areas of the main surfaces come in contact with each other, the hinge apparatus connecting the casings is arranged. Meanwhile, in a state where the electronic apparatus is opened in a manner that the surfaces of the two casings are in parallel to each other, the hinge apparatus is arranged between the two casings. Since the hinge apparatus has the two shafts, the electronic apparatus is enlarged.

Further, the operating unit or the display unit cannot be provided on the hinge apparatus of Patent Document 1. As a result, the operating unit and the display unit are provided on the casings, respectively, in a manner that the operating unit and the display unit are spaced apart from each other by the size of the hinge apparatus. Since the hinge apparatus has the two shafts, the area in which the operating unit and the display unit cannot be provided becomes large. So the electronic apparatus is enlarged and the limitation as to the design becomes also large.

Further, the hinge apparatus of Patent Document 1 includes, in addition to the plurality of rotation shaft units, the plurality of rotation units, and the interlocking link unit, a number of members such as cams and springs, and thus has a complicated structure. Accordingly, there is a fear that the hinge apparatus is enlarged and the assembly process is complicated. Further, there is a fear that the electronic apparatus including such a hinge apparatus is also enlarged.

In view of the above-mentioned circumstances, it is desirable to provide an electronic apparatus having two casings capable of being rotated relatively by 360° by employing a simple structure without being enlarged.

According to an embodiment of the present invention, there is provided an electronic apparatus including a rectangular-parallelepiped first casing, a rectangular-parallelepiped second casing, and a first connecting apparatus.

The first connecting apparatus connects the first casing and the second casing such that the first casing and the second casing are capable of being rotated relatively in one of a first rotation direction and a second rotation direction orthogonal to each other between a first state and a second state, the first state being a state where a first main surface of the first casing comes to be faced with a third main surface of the second casing, the second state being a state where a second main surface of the first casing comes to be faced with a fourth main surface of the second casing, the first main surface being one main surface of two main surfaces of the first casing, the second main surface being the other main surface which is the backside surface of the first main surface, the third main surface being one main surface of two main surfaces of the second casing, the fourth main surface being the other main surface which is the backside surface of the third main surface.

The first connecting apparatus includes a first hinge unit, a second hinge unit, and a first hinge connecting portion.

The first hinge unit includes a first rotation shaft, a first shaft bearing portion, a second rotation shaft, a second shaft bearing portion, and a first shaft.

The first rotation shaft serves as a fulcrum of rotation between the first state and a first intermediate state, the first intermediate state being a state where the first main surface of the first casing is in parallel with the third main surface of the second casing in a first rotation process, the first rotation process being a rotation process between the first state and the second state in the first rotation direction.

The first shaft bearing portion is fixed on the first casing and pivotally supports the first rotation shaft.

The second rotation shaft serves as a fulcrum of rotation between the first intermediate state and the second state.

The second shaft bearing portion pivotally supports the second rotation shaft.

The first shaft connecting portion connects the first rotation shaft pivotally supported by the first shaft bearing portion and the second rotation shaft pivotally supported by the second shaft bearing portion such that the first rotation shaft and the second rotation shaft are capable of being rotated.

The second hinge unit includes a third rotation shaft, a third shaft bearing portion, a fourth rotation shaft, a fourth shaft bearing portion, and a second shaft connecting portion.

The third rotation shaft serves as a fulcrum of rotation between the second state and a second intermediate state, the second intermediate state being a state where the first main surface of the first casing is in parallel with the third main surface of the second casing in a second rotation process, the second rotation process being a rotation process between the first state and the second state in the second rotation direction.

The third shaft bearing portion pivotally supports the third rotation shaft.

The fourth rotation shaft serves as a fulcrum of rotation between the second intermediate state and the first state.

The fourth shaft bearing portion is fixed on the second casing and pivotally supports the fourth rotation shaft.

The second shaft connecting portion connects the third rotation shaft pivotally supported by the third shaft bearing portion and the fourth rotation shaft pivotally supported by the fourth shaft bearing portion such that the third rotation shaft and the fourth rotation shaft are capable of being rotated.

The first hinge connecting portion connects the second shaft bearing portion and the third shaft bearing portion.

According to the above-mentioned electronic apparatus, the casings are capable of being rotated relatively in the first rotation direction and the second rotation direction orthogonal with each other between the first state where the first main surface of the first casing comes to be faced with the third main surface of the second casing and the second state where the second main surface of the first casing comes to be faced with the fourth main surface of the second casing.

The first casing may have a first notch surface having a first wiring opening, the first notch surface being provided on a corner portion formed by the first main surface, the second main surface, a first side surface, and a second side surface, the first side surface coming to be faced with the second casing in the first intermediate state, the second side surface coming to be faced with the second casing in the second intermediate state.

The second casing may have a second notch surface having a second wiring opening, the second notch surface being provided on a corner portion formed by the third main surface, the fourth main surface, a third side surface, and a fourth side surface, the third side surface coming to be faced with the first side surface of the first casing in the first intermediate state, the fourth side surface coming to be faced with the second side surface of the first casing in the second intermediate state.

The electronic apparatus may further include a first circuit board accommodated in the first casing, a second circuit board accommodated in the second casing, and a wiring electrically connecting the first circuit board and the second circuit board through the first wiring opening and the second wiring opening.

According to the above-mentioned electronic apparatus, the circuit boards in the first casing and the second casing can be electrically connected irrespective of the positional relationship of the first casing and the second casing.

The first side surface of the first casing may have a first concave portion.

The second side surface of the first casing may have a second concave portion.

The third side surface of the second casing coming to be faced with the first side surface of the first casing in the first intermediate state may have a third concave portion capable of coming to be faced with the first concave portion.

The fourth side surface of the second casing coming to be faced with the second side surface of the first casing in the second intermediate state may have a fourth concave portion capable of coming to be faced with the second concave portion.

At least a part of the first shaft connecting portion may be accommodated in the first concave portion and the third concave portion facing with each other in the first intermediate state.

At least a part of the second shaft connecting portion may be accommodated in the second concave portion and the fourth concave portion facing with each other in the second intermediate state.

According to the above-mentioned electronic apparatus, at least a part of the first shaft connecting portion is accommodated in the first concave portion and the third concave portion facing with each other in the first intermediate state. At least a part of the second shaft connecting portion is accommodated in the second concave portion and the fourth concave portion facing with each other in the second intermediate state. Accordingly, the distance between the first casing and the second casing can be made smaller.

The electronic apparatus may further include a display unit provided in at least one of the first casing and the second casing.

According to the above-mentioned electronic apparatus, in the case where the display units are provided in both the first casing and the second casing arranged such that the distance between the first casing and the second casing can be made smaller, the display units may function as one display area, and one content can be displayed over the two display units.

The second main surface of the first casing may have a first accommodation concave portion accommodating the first hinge connecting portion in the second rotation process.

The fourth main surface of the second casing may have a second accommodation concave portion accommodating the first hinge connecting portion in the first rotation process.

According to the above-mentioned electronic apparatus, in the second state where the second main surface of the first casing comes to be faced with the fourth main surface of the second casing, even in the state where the first hinge connecting portion is arranged between the first casing and the second casing, the second main surface is capable of coming in contact with the fourth main surface. The electronic apparatus is thus secured and the design thereof is improved.

The electronic apparatus may further include a second connecting apparatus connecting, cooperatively with the first connecting apparatus, the first casing and the second casing such that the first casing and the second casing are capable of being rotated relatively in one of the first rotation direction and the second rotation direction orthogonal to each other between the first state and the second state.

The second connecting apparatus includes a third hinge unit, a fourth hinge unit, and a second hinge connecting portion.

The third hinge unit includes a fifth rotation shaft, a fifth shaft bearing portion, a sixth rotation shaft, a sixth shaft bearing portion, and a third shaft connecting portion.

The fifth rotation shaft serves, together with the first rotation shaft, as the fulcrum of rotation between the first state and the first intermediate state in the first rotation process in the first rotation direction.

The fifth shaft bearing portion is fixed on the second casing and pivotally supports the fifth rotation shaft.

The sixth rotation shaft serves, together with the second rotation shaft, as the fulcrum of rotation between the first intermediate state and the second state.

The sixth shaft bearing portion pivotally supports the sixth rotation shaft.

The third shaft connecting portion connects the fifth rotation shaft pivotally supported by the fifth shaft bearing portion and the sixth rotation shaft pivotally supported by the sixth shaft bearing portion such that the fifth rotation shaft and the sixth rotation shaft are capable of being rotated.

The fourth hinge unit includes a seventh rotation shaft, a seventh shaft bearing portion, an eighth rotation shaft, an eighth shaft bearing portion, and a fourth shaft connecting portion.

The seventh rotation shaft serves, together with the third rotation shaft, as the fulcrum of rotation between the second state and the second intermediate state in the second rotation process in the second rotation direction.

The seventh shaft bearing portion pivotally supports the seventh rotation shaft.

The eighth rotation shaft serves, together with the fourth rotation shaft, as the fulcrum of rotation between the second intermediate state and the first state.

The eighth shaft bearing portion is fixed on the first casing and pivotally supports the eighth rotation shaft.

The fourth shaft connecting portion connects the seventh rotation shaft pivotally supported by the seventh shaft bearing portion and the eighth rotation shaft pivotally supported by the eighth shaft bearing portion such that the seventh rotation shaft and the eighth rotation shaft are capable of being rotated.

The second hinge connecting portion connects the sixth shaft bearing portion and the seventh shaft bearing portion.

According to the above-mentioned electronic apparatus, the casings are capable of being rotated relatively in the first rotation direction and the second rotation direction orthogonal with each other between the first state where the first main surface of the first casing comes to be faced with the third main surface of the second casing and the second state where the second main surface of the first casing comes to be faced with the fourth main surface of the second casing.

According to an embodiment of the present invention, there is provided an electronic apparatus, including a rectangular-parallelepiped first casing, a rectangular-parallelepiped second casing, and a connecting apparatus.

The connecting apparatus connects the first casing and the second casing such that the first casing and the second casing are capable of being rotated relatively between a first state and a second state, the first state being a state where a first main surface of the first casing comes to be faced with a third main surface of the second casing, the second state being a state where a second main surface of the first casing comes to be faced with a fourth main surface of the second casing, the first main surface being one main surface of two main surfaces of the first casing, the second main surface being the other main surface which is the backside surface of the first main surface, the third main surface being one main surface of two main surfaces of the second casing, the fourth main surface being the other main surface which is the backside surface of the third main surface.

The connecting apparatus includes a first hinge unit and a second hinge unit.

The first hinge unit includes a first rotation shaft, a first shaft bearing portion, a second rotation shaft, a second shaft bearing portion, and a first shaft connecting portion.

The first rotation shaft serves as a fulcrum of rotation between the first state and an intermediate state, the intermediate state being a state where the first main surface of the first casing is in parallel with the third main surface of the second casing in a rotation process between the first state and the second state.

The first shaft bearing portion is fixed on the first casing and pivotally supports the first rotation shaft.

The second rotation shaft serves as a fulcrum of rotation between the intermediate state and the second state.

The second shaft bearing portion is fixed on the second casing and pivotally supports the second rotation shaft.

The first shaft connecting portion connects the first rotation shaft pivotally supported by the first shaft bearing portion and the second rotation shaft pivotally supported by the second shaft bearing portion.

The second hinge unit includes a third rotation shaft, a third shaft bearing portion, a fourth rotation shaft, a fourth shaft bearing portion, and a second shaft connecting portion.

The third rotation shaft serves, together with the first rotation shaft, as the fulcrum of rotation between the first state and the intermediate state.

The third shaft bearing portion is fixed on the second casing and pivotally supports the third rotation shaft.

The fourth rotation shaft serves, together with the second rotation shaft, as the fulcrum of rotation between the intermediate state and the second state.

The fourth shaft bearing portion is fixed on the first casing and pivotally supports the fourth rotation shaft.

The second shaft connecting portion connects the third rotation shaft pivotally supported by the third shaft bearing portion and the fourth rotation shaft pivotally supported by the fourth shaft bearing portion.

According to the above-mentioned electronic apparatus, the casings are capable of being rotated relatively between the first state where the first main surface of the first casing comes to be faced with the third main surface of the second casing and the second state where the second main surface of the first casing comes to be faced with the fourth main surface of the second casing.

A first side surface of the first casing coming to be faced with the second casing in the intermediate state may have a first concave portion.

A third side surface of the second casing coming to be faced with the first side surface of the first casing in the intermediate state may have a second concave portion capable of coming to be faced with the first concave portion.

At least a part of the first shaft connecting portion and at least a part of the second shaft connecting portion may be accommodated in the first concave portion and the second concave portion facing with each other in the first intermediate state.

According to the above-mentioned electronic apparatus, at least a part of the first shaft connecting portion is accommodated in the first concave portion and the third concave portion facing with each other in the first intermediate state. At least a part of the second shaft connecting portion is accommodated in the second concave portion and the fourth concave portion facing with each other in the second intermediate state. Accordingly, the distance between the first casing and the second casing can be made smaller.

The electronic apparatus may further include a display unit provided in at least one of the first casing and the second casing.

According to the above-mentioned electronic apparatus, in the case where the display units are provided in both the first casing and the second casing arranged such that the distance between the first casing and the second casing can be made smaller, the display units may function as one display area, and one content can be displayed over the two display units.

The first casing may have a first notch surface having a first wiring opening, the first notch surface being provided on a corner portion formed by the first main surface, the second main surface, the first side surface, and a second side surface orthogonal to the first side surface.

The second casing may have a second notch surface having a second wiring opening, the second notch surface being provided on a corner portion formed by the third main surface, the fourth main surface, the third side surface, and a fourth side surface being in parallel with the second side surface of the first casing in the intermediate state.

The electronic apparatus may further include a first circuit board accommodated in the first casing, a second circuit board accommodated in the second casing, and a wiring electrically connecting the first circuit board and the second circuit board through the first wiring opening and the second wiring opening.

According to the above-mentioned electronic apparatus, the circuit boards in the first casing and the second casing can be electrically connected irrespective of the positional relationship of the first casing and the second casing.

The first casing may have a first wiring opening provided on a second side surface orthogonal to the first side surface coming to be faced with the second casing in the intermediate state.

The second casing may have a second wiring opening provided on a fourth side surface being in parallel with the second side surface of the first casing in the intermediate state.

The electronic apparatus may further includes a first circuit board accommodated in the first casing, a second circuit board accommodated in the second casing, and a wiring electrically connecting the first circuit board and the second circuit board through the first wiring opening and the second wiring opening.

According to the above-mentioned electronic apparatus, the circuit boards in the first casing and the second casing can be electrically connected irrespective of the positional relationship of the first casing and the second casing.

The electronic apparatus may further include a first circuit board accommodated in the first casing, a second circuit board accommodated in the second casing, and a wiring electrically connecting the first circuit board and the second circuit board.

The wiring may be provided on one of the first main surface side and the second main surface side in the first casing, the wiring may be provided on the fourth main surface side in the second casing in the case where the wiring is provided on the first main surface side in the first casing, and the wiring may be provided on the third main surface side in the second casing in the case where the wiring is provided on the second main surface side in the first casing.

According to the above-mentioned electronic apparatus, the circuit boards in the first casing and the second casing can be electrically connected irrespective of the positional relationship of the first casing and the second casing.

According to the embodiments of the present invention, there is provided an electronic apparatus having two casings capable of being rotated relatively by 360° by employing a simple structure without enlarged.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4 is a perspective view showing the connecting apparatus in a state where a second casing is rotated by +90° with respect to a first casing;

FIG. 12 are schematic views respectively showing the first hinge unit and the second hinge unit in the +360° rotation state;

FIG. 17 is a partial sectional view showing the electronic apparatus including a wiring electrically connecting the circuit board accommodated in the first casing and the circuit board accommodated in the second casing of a second example, in which the second casing is rotated by +180° with respect to the first casing;

FIG. 41 is a plan view showing an electronic apparatus in the 0° rotation state according to a modified example of the electronic apparatus of the second embodiment;

FIG. 44 is a plan view showing the electronic apparatus of FIG. 41 in the Y-axis +180° rotation state.

DESCRIPTION OF PREFERRED EMBODIMENTS

Hereinafter, embodiments of the present invention will be described with reference to the drawings.

First Embodiment

Structure of Electronic Apparatus

An electronic apparatus having two casings capable of being rotated relatively between an open state and a closed state according to a first embodiment of the present invention will be described. In this embodiment, the electronic apparatus is, for example, a laptop personal computer (hereinafter referred to as PC).

Figure 1:
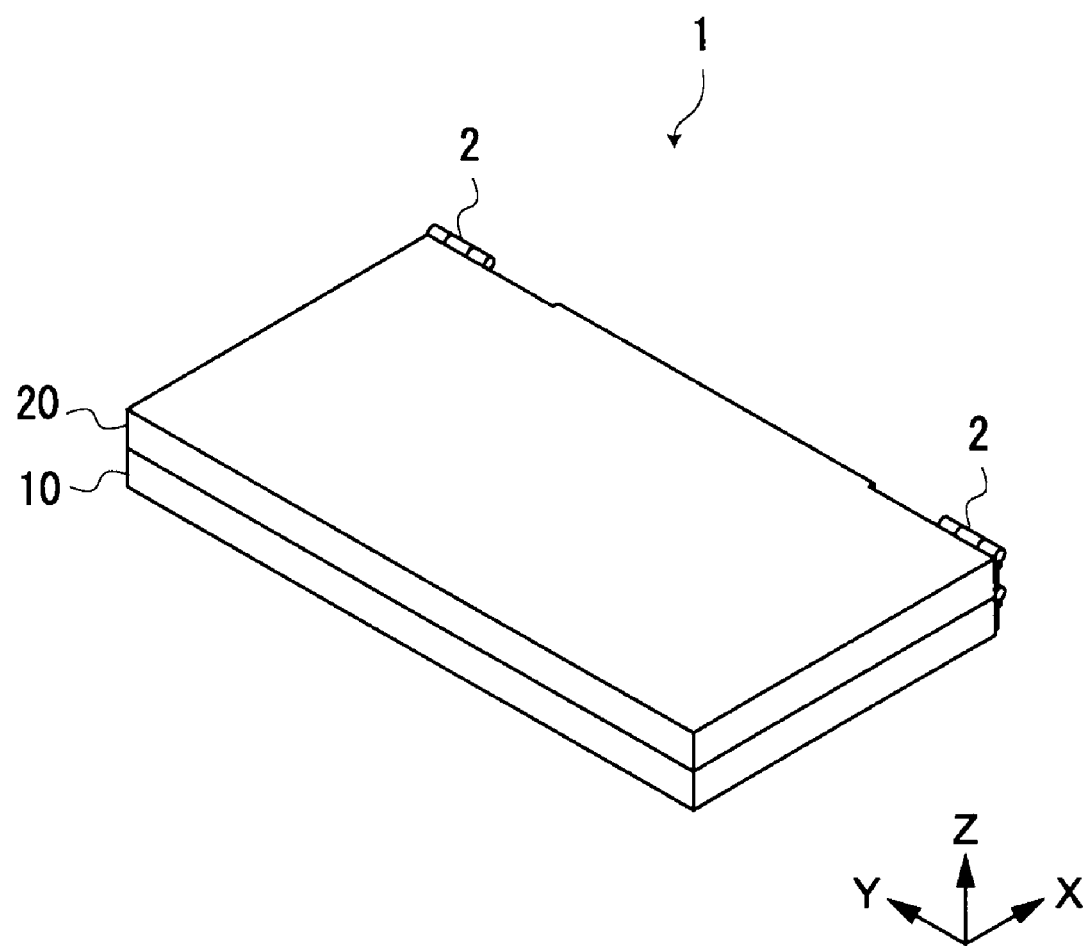
FIG. 1 is a perspective view showing an electronic apparatus of an embodiment of the present invention in the closed state.
Figure 2:
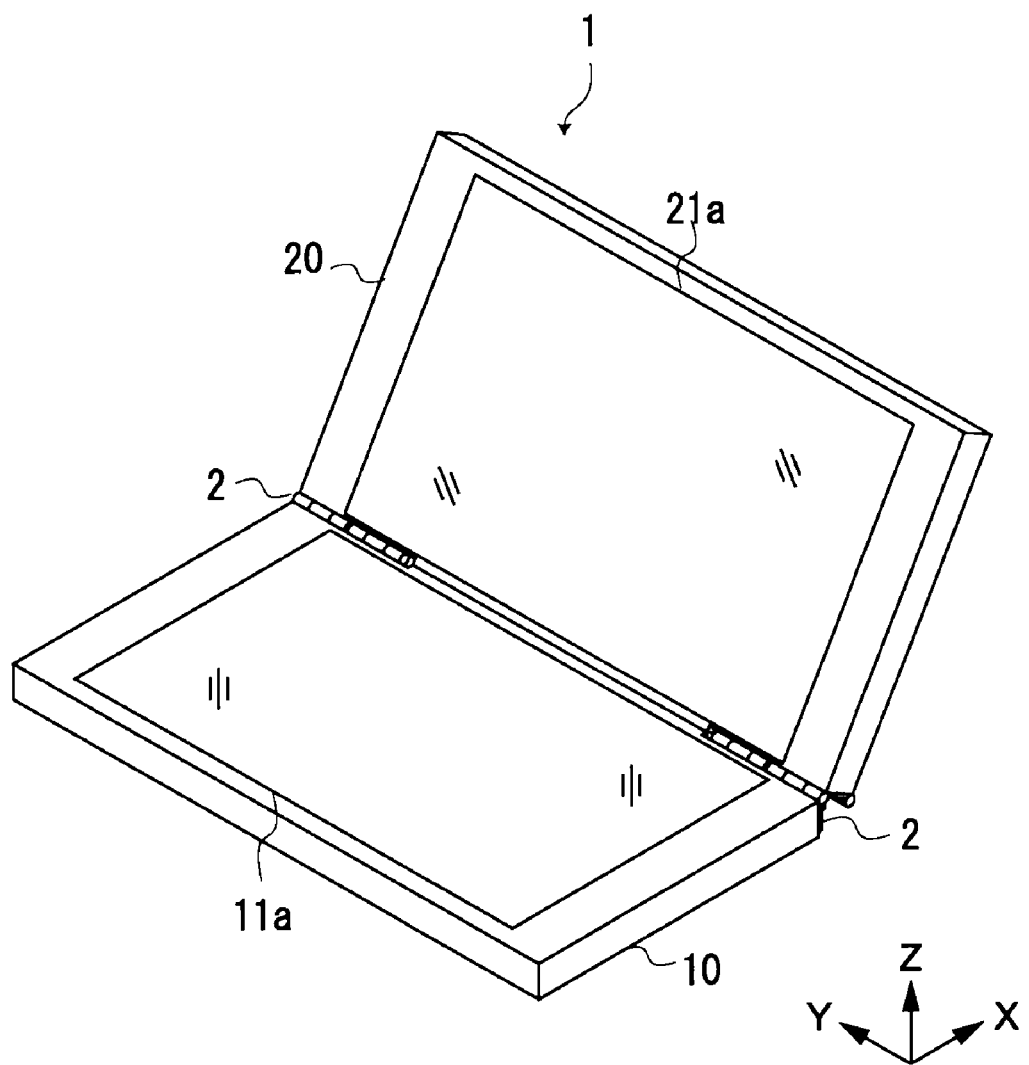
FIG. 2 is a perspective view showing the electronic apparatus in the open state.

FIG. 1 is a perspective view showing an electronic apparatus 1 of this embodiment in the closed state. FIG. 2 is a perspective view showing the electronic apparatus 1 in the open state.

The electronic apparatus 1 includes a first casing 10, a second casing 20, and two connecting apparatuses 2, 2. Each of the first casing 10 and the second casing 20 is, for example, a rectangular parallelepiped. The first casing 10 and the second casing 20 have substantially the same shape. Note that in this embodiment, the term "rectangular parallelepiped" includes a shape which is not strictly a rectangular parallelepiped but is substantially similar to a rectangular parallelepiped. For example, the term "rectangular parallelepiped" conceptually includes a rectangular parallelepiped having notches, a rectangular parallelepiped having a pair of facing surfaces of a parallelogram of the same shape or a trapezoid of the same shape, or the like.

The first casing 10 accommodates a touch sensor panel 11a and a display panel (not shown) such that they are overlapped with each other. The second casing 20 accommodates a touch sensor panel 21a and a display panel (not shown) such that they are overlapped with each other. Each of the display panels is made of, for example, an LCD (Liquid Crystal Display) or the like, and displays UI (User Interface) elements or contents such as an image content on a display area. For example, one display panel displays UI elements, and the other display panel displays contents. Alternatively, one content is displayed over the two display panels, in which the two display panels function as one display area. Each of the touch sensor panels 11a, 21a is arranged over the display area of the display panel, and detects position information of a position defined by a user using a finger or the like.

Each of the first casing 10 and the second casing 20 has a circuit board (not shown) therein. The circuit board in the first casing 10 and the circuit board in the second casing 20 are electrically connected via a wiring such as a flexible printed circuit board or wirelessly. Various electronic components configuring the electronic apparatus 1 (PC) such as a CPU (Central Processing Unit), a main memory, a chip set, and various interfaces are each mounted on at lease one of the circuit boards. A drive apparatus such as a hard disk drive, a solid state drive, and an optical disc drive may be mounted in one of the first casing 10 and the second casing 20.

The first casing 10 and the second casing 20 configured as described above are connected by the two connecting apparatuses 2, 2 so as to be able to be rotated freely. Note that structure, movement, and the like of the two connecting apparatuses 2, 2 are the same. So, hereinafter, one connecting apparatus 2 will be described.

(Structure of Connecting Apparatus)

Figure 3:
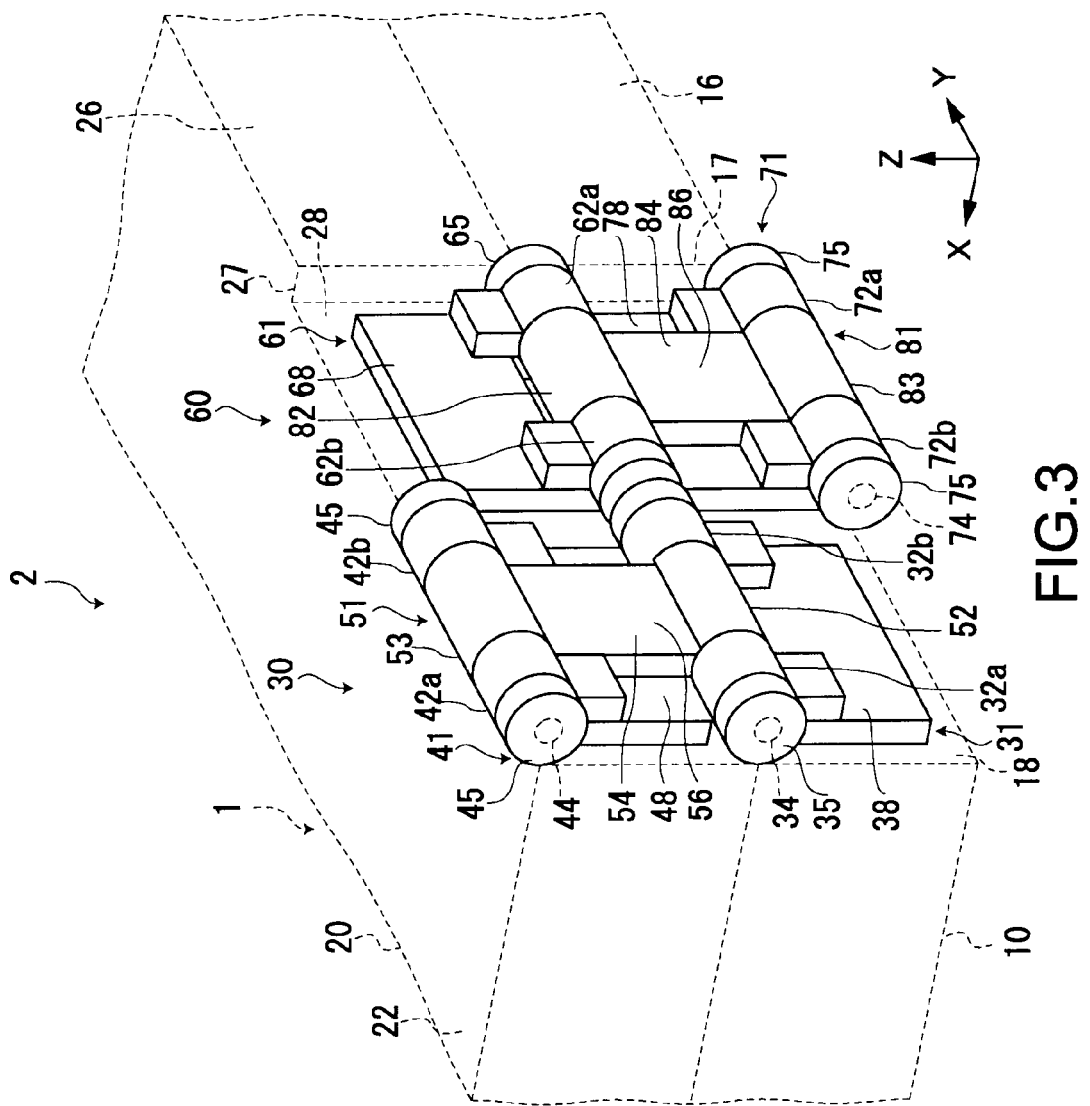
FIG. 3 is a perspective view showing one connecting apparatus.

FIG. 3 is a perspective view showing one connecting apparatus 2.

The connecting apparatus 2 includes a first hinge unit 30 and a second hinge unit 60.

The first hinge unit 30 includes a first hinge plate portion 31, a second hinge plate portion 41, and a first shaft connecting portion 51.

The first hinge plate portion 31 includes a first plate portion 38, a first shaft bearing portion 32a having a shaft hole, a first shaft bearing portion 32b having a shaft hole, and a first rotation shaft 34.

The first shaft bearing portions 32a, 32b are provided on an end portion of the first plate portion 38. The shaft hole of the first shaft bearing portion 32a and the shaft hole of the first shaft bearing portion 32b are coaxially provided. The first shaft bearing portions 32a, 32b are provided so as to be apart from each other in the axial direction. The first shaft bearing portions 32a, 32b are formed by, for example, curl processing.

The second hinge plate portion 41 has the same structure as the structure of the first hinge plate portion 31.

The second hinge plate portion 41 includes a second plate portion 48, a second shaft bearing portion 42a having a shaft hole, a second shaft bearing portion 42b having a shaft hole, and a second rotation shaft 44.

The second shaft bearing portions 42a, 42b are provided on an end portion of the second plate portion 48. The shaft hole of the second shaft bearing portion 42a and the shaft hole of the second shaft bearing portion 42b are coaxially provided. The second shaft bearing portions 42a, 42b are provided so as to be apart from each other in the axial direction. The second shaft bearing portions 42a, 42b are formed by, for example, curl processing.

The first shaft connecting portion 51 includes shaft holding portions 52, 53 and a connecting plate portion 54.

The shaft holding portions 52, 53 are formed by, for example, curl processing. Each of the shaft holding portions 52, 53 has a shaft hole. The axial center of the shaft hole of the shaft holding portion 52 and the axial center of the shaft hole of the shaft holding portion 53 are in parallel to each other. The outer diameter of each of the shaft holding portions 52, 53 is approximately the same as the outer diameter of each of the first shaft bearing portions 32a, 32b and the second shaft bearing portions 42a, 42b. The diameter of the shaft hole of each of the shaft holding portions 52, 53 is approximately the same as the diameter of the shaft hole of each of the first shaft bearing portions 32a, 32b and the second shaft bearing portions 42a, 42b. The length of each of the shaft holding portions 52, 53 is smaller than the distance between the first shaft bearing portions 32a, 32b and the distance between the second shaft bearing portions 42a, 42b.

The connecting plate portion 54 is a plate-like portion connecting the shaft holding portions 52, 53 such that the shaft holding portions 52, 53 are in parallel to each other. The distance between the shaft holding portions 52, 53 is substantially the same as the length of the first plate portion 38 in the direction orthogonal to the axial center of the shaft hole of each of the first shaft bearing portions 32a, 32b, and as the length of the second plate portion 48 in the direction orthogonal to the axial center of the shaft hole of each of the second shaft bearing portions 42a, 42b. The thickness of the first shaft connecting portion 51 is substantially the same as the thickness of each of the first hinge plate portion 31 and the second hinge plate portion 41. The shaft holding portion 52 is coaxially provided between the first shaft bearing portions 32a, 32b.

The first rotation shaft 34 is inserted in the shaft hole of the first shaft bearing portion 32a, the shaft hole of the shaft holding portion 52, and the shaft hole of the first shaft bearing portion 32b. The first shaft bearing portion 32a, the shaft holding portion 52, and the first shaft bearing portion 32b are thus integrally connected by the first rotation shaft 34. Lid portions 35, 35 prevents the first rotation shaft 34 from being dropped from the side of each of the first shaft bearing portions 32a, 32b in the axial direction.

The assembling of the second hinge plate portion 41 and the shaft holding portion 53 is similar to the above-mentioned assembling of the first hinge plate portion 31 and the shaft holding portion 52.

The second rotation shaft 44 is inserted in the shaft hole of the second shaft bearing portion 42a, the shaft hole of the shaft holding portion 53, and the shaft hole of the second shaft bearing portion 42b. The second shaft bearing portion 42a, the shaft holding portion 53, and the second shaft bearing portion 42b are thus integrally connected by the second rotation shaft 44. Lid portions 45, 45 prevents the second rotation shaft 44 from being dropped from the side of each of the second shaft bearing portions 42a, 42b in the axial direction.

In the first hinge unit 30 thus structured, the first hinge plate portion 31 and the first shaft connecting portion 51 connected by the first rotation shaft 34 are rotated relatively about the first rotation shaft 34 being the center. Similarly, the second hinge plate portion 41 and the first shaft connecting portion 51 connected by the second rotation shaft 44 are rotated relatively about the second rotation shaft 44 being the center.

The second hinge unit 60 has the structure same as the structure of the first hinge unit 30. The portions of the second hinge unit 60 similar to the portions of the first hinge unit 30 are denoted by corresponding reference symbols, and the description will be omitted or shortened.

That is, the second hinge unit 60 includes a third hinge plate portion 61, a fourth hinge plate portion 71, and a second shaft connecting portion 81.

The third hinge plate portion 61 of the second hinge unit 60 has the structure same as the structure of the first hinge plate portion 31 of the first hinge unit 30. The portions of the third hinge plate portion 61 similar to the portions of the first hinge plate portion 31 are denoted by corresponding reference symbols (60s), and the overlapping description will be omitted.

The fourth hinge plate portion 71 of the second hinge unit 60 has the structure same as the structure of the second hinge plate portion 41 of the first hinge unit 30. The portions of the fourth hinge plate portion 71 similar to the portions of the second hinge plate portion 41 are denoted by corresponding reference symbols (70s), and the overlapping description will be omitted.

The second shaft connecting portion 81 of the second hinge unit 60 has the structure same as the structure of the first shaft connecting portion 51 of the first hinge unit 30. The portions of the second shaft connecting portion 81 similar to the portions of the first shaft connecting portion 51 are denoted by corresponding reference symbols (80s), and the overlapping description will be omitted.

(Mounting of Connecting Apparatuses on Casings)

Next, with reference to FIG. 3, mounting of the connecting apparatuses 2, 2 on the first casing 10 and the second casing 20 will be described.

In the electronic apparatus 1, the first casing 10 includes a rectangular first main surface 11 and a rectangular second main surface 12 being a backside surface of the first main surface 11. The first main surface 11 includes the touch sensor panel 11a and serves as an operation surface. The second casing 20 includes a rectangular third main surface 21 and a rectangular fourth main surface 22 being a backside surface of the third main surface 21. The third main surface 21 includes the touch sensor panel 21a and serves as an operation surface. In the state shown in FIG. 3, the first main surface 11 of the first casing 10 is overlapped with the third main surface 21 of the second casing 20.

In the following description, the thickness direction of the first casing 10 and the second casing 20 where the first casing 10 is overlapped with the second casing 20 is referred to as "Z-axis direction". The short-side direction of the main surfaces 11, 12, 21, 22 of the first casing 10 and the second casing 20 where the first casing 10 is overlapped with the second casing 20 is referred to as "X-axis direction". The long-side direction thereof is referred to as "Y-axis direction".

On a first side surface 16 including one long side of the rectangular first main surface 11 and one long side of the rectangular second main surface 12 of the first casing 10, two first concave portions 17, 17 are provided corresponding to the positions on which the connecting apparatuses 2, 2 are provided, respectively.

On a third side surface 26 including one long side of the rectangular third main surface 21 and one long side of the rectangular fourth main surface 22 of the second casing 20, two second concave portions 27, 27 are provided corresponding to the positions on which the connecting apparatuses 2, 2 are provided, respectively.

In the first hinge unit 30 of the connecting apparatus 2, the first hinge plate portion 31 is fixed on a bottom surface 18 of the first concave portion 17 of the first casing 10. In the first hinge plate portion 31, the axial center of the first rotation shaft 34 rotatably supporting the first hinge plate portion 31 is arranged along the line on which the plane on the first main surface 11 of the first casing 10 crosses the plane on the first side surface 16 of the first casing 10.

The second hinge plate portion 41 is fixed on a bottom surface 28 of the second concave portion 27 of the second casing 20. In the second hinge plate portion 41, the axial center of the second rotation shaft 44 rotatably supporting the second hinge plate portion 41 is arranged along the line on which the plane on the fourth main surface 22 of the second casing 20 crosses the plane on the third side surface 26 of the second casing 20.

In the state where the first casing 10 is overlapped with the second casing 20, the connecting plate portion 54 of the first shaft connecting portion 51 comes in contact with the second plate portion 48 of the second hinge plate portion 41. In this state, a surface of the connecting plate portion 54 coming in contact with the second plate portion 48 is referred to as "first surface 55", and the backside surface of the first surface 55 is referred to as "second surface 56".

In the second hinge unit 60, the third hinge plate portion 61 is fixed on the bottom surface 28 of the second concave portion 27 of the second casing 20. In the third hinge plate portion 61, the axial center of the third rotation shaft 64 rotatably supporting the third hinge plate portion 61 is arranged along the line on which the plane on the third main surface 21 of the second casing 20 crosses the plane on the third side surface 26 of the second casing 20. In this state, since the first main surface 11 of the first casing 10 is overlapped with the third main surface 21 of the second casing 20, the axial center of the first rotation shaft 34 and the axial center of the third rotation shaft 64 are coaxially arranged.

The fourth hinge plate portion 71 is fixed on the bottom surface 18 of the first concave portion 17 of the first casing 10, on which the first plate portion 38 is fixed. In the fourth hinge plate portion 71, the axial center of the fourth rotation shaft 74 rotatably supporting the fourth hinge plate portion 71 is arranged along the line on which the plane on the second main surface 12 of the first casing 10 crosses the plane on the second side surface 16 of the first casing 10.

In the state where the first casing 10 is overlapped with the second casing 20, the connecting plate portion 84 of the second shaft connecting portion 81 comes in contact with the fourth plate portion 78 of the fourth hinge plate portion 71. In this state, a surface of the connecting plate portion 84 coming in contact with the second fourth plate portion 78 is referred to as "first surface 85", and the backside surface of the first surface 85 is referred to as "second surface 86".

(Operations of Connecting Apparatus in Rotation of Casings of Electronic Apparatus)

Next, operations of the connecting apparatus 2 in a case where a user opens/closes the electronic apparatus 1 thus structured will be described.

Before the user opens/closes the electronic apparatus 1, the first main surface 11 of the first casing 10 is overlapped with the third main surface 21 of the second casing 20 as shown in FIG. 3. Hereinafter, operations of the connecting apparatus 2 in a case where the second casing 20 is rotated with respect to the first casing 10, the position of the first casing 10 being not changed, will be described.

The state where the first main surface 11 of the first casing 10 is overlapped with the third main surface 21 of the second casing 20 is referred to as "0° rotation state". Hereinafter, operations of the connecting apparatus 2 in a case where the user opens/closes the electronic apparatus 1 by rotating the second casing 20 with respect to the first casing 10 will be described.

Hereinafter, the rotation direction of the second casing 20 with respect to the first casing 10 from the 0° rotation state is referred to as "+ direction". The rotation direction opposite to the + direction is referred to as "− direction".

Figure 5A:
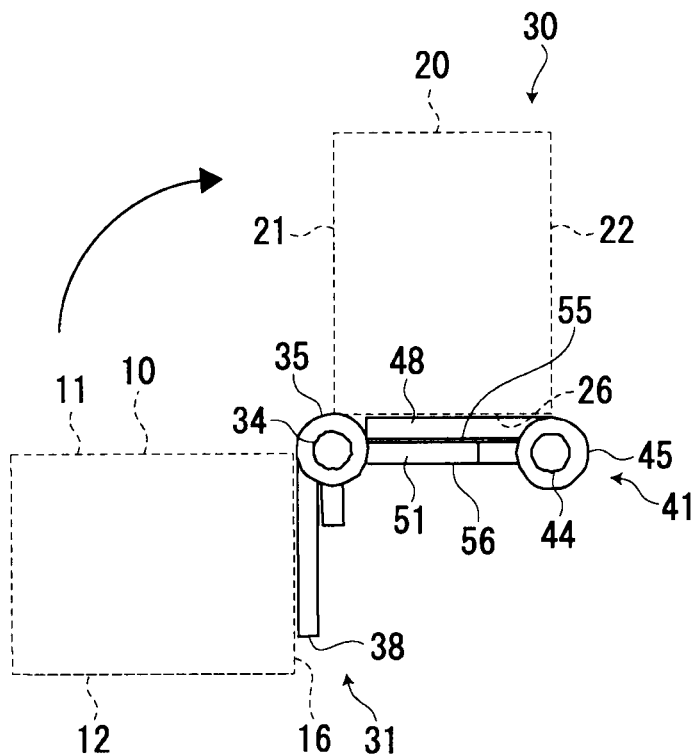
FIG. 5 are schematic views respectively showing a first hinge unit and a second hinge unit in the +90° rotation state.
Figure 5B:
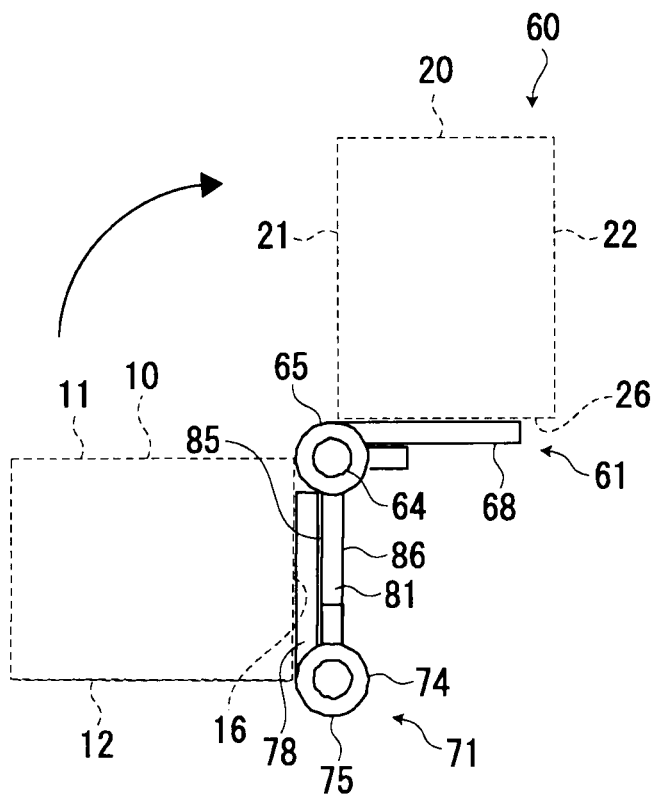

FIG. 4 is a perspective view showing the connecting apparatus 2 in a state where the second casing 20 is rotated from the 0° rotation state by 90° with respect to the first casing 10 in the + direction (+90° rotation state). FIG. 5A is a schematic view showing the first hinge unit 30 in the +90° rotation state. FIG. 5B is a schematic view showing the second hinge unit 60 in the +90° rotation state.

As shown in FIGS. 3 and 4, the first rotation shaft 34 of the first hinge plate portion 31 and the third rotation shaft 64 of the third hinge plate portion 61 are in the coaxial relationship. The second casing 20 is capable of being rotated with respect to the first casing 10 about the first rotation shaft 34 and the third rotation shaft 64 as the fulcrum.

In the case where the second casing 20 is rotated with respect to the first casing 10, in the first hinge unit 30, the second hinge plate portion 41 fixed on the second casing 20 is rotated about the first rotation shaft 34 as the fulcrum. Herein, the first shaft connecting portion 51 having the first surface 55 coming in contact with the second plate portion 48 of the second hinge plate portion 41 is rotated about the first rotation shaft 34 as the fulcrum together with the second hinge plate portion 41.

Meanwhile, in the case where the second casing 20 is rotated with respect to the first casing 10, in the second hinge unit 60, the third hinge plate portion 61 fixed on the second casing 20 is rotated about the third rotation shaft 64 as the fulcrum. Herein, the first surface 85 of the second shaft connecting portion 81 of the second hinge unit 60 comes in contact with the fourth plate portion 78 even though the second casing 20 is rotated with respect to the first casing 10.

Figure 6:
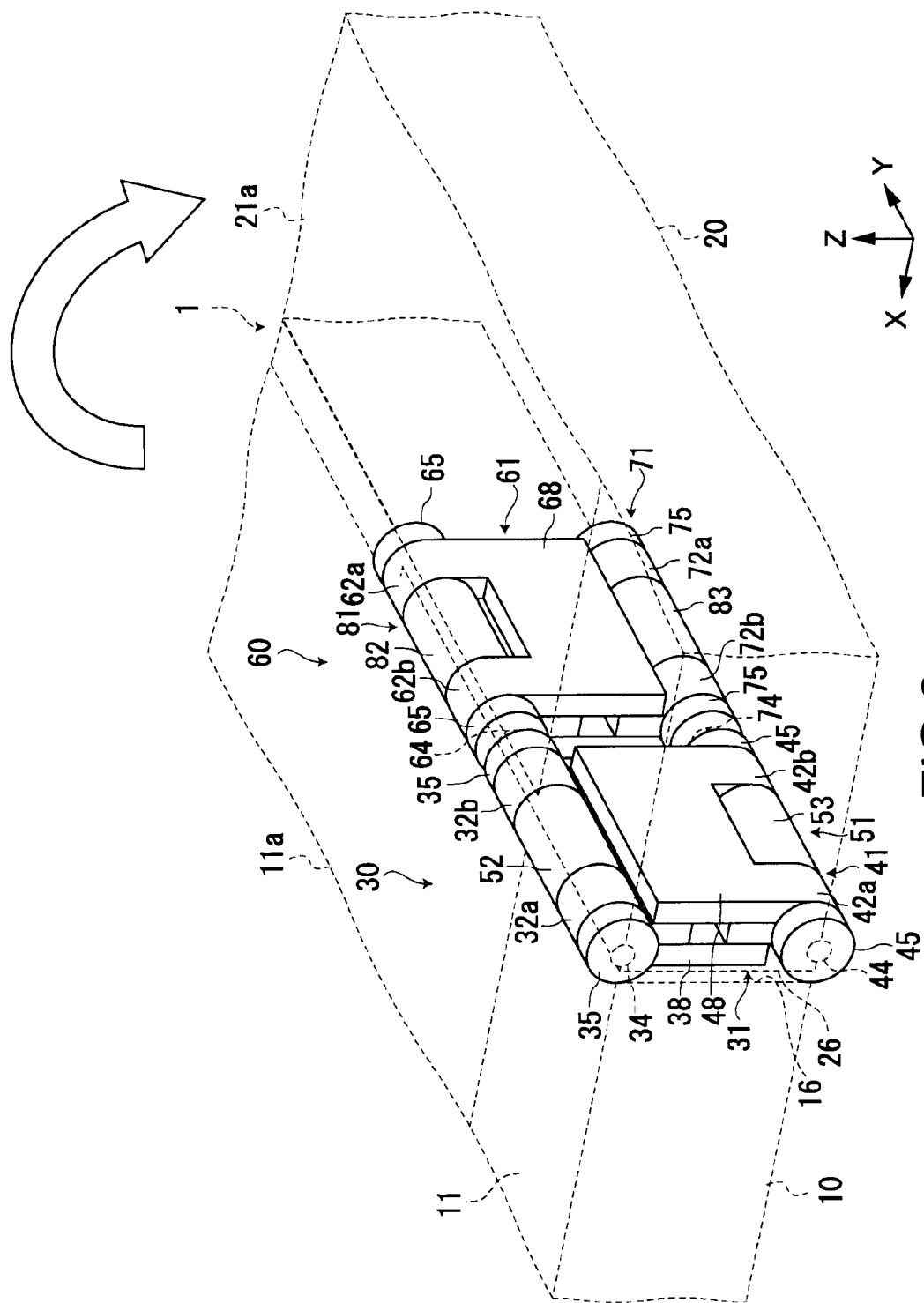
FIG. 6 is a perspective view showing the connecting apparatus in a state where the second casing is rotated by +180° with respect to the first casing.
Figure 7A:
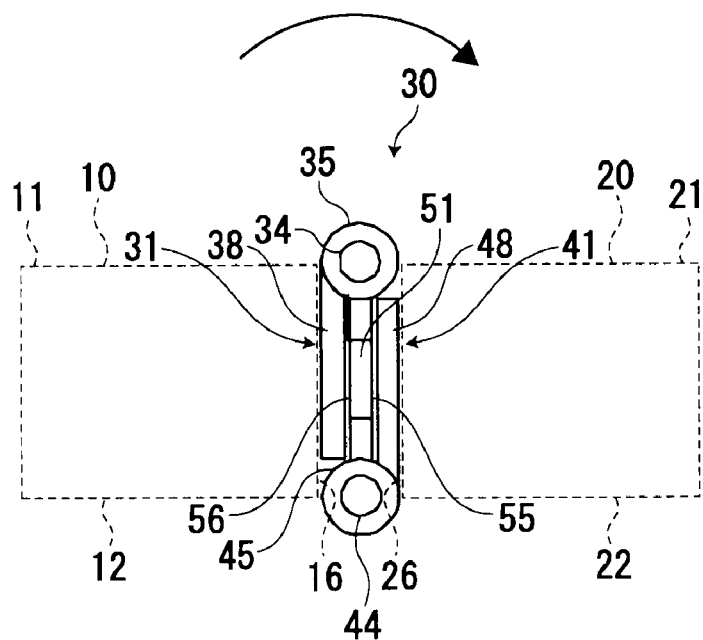
FIG. 7 are schematic views respectively showing the first hinge unit and the second hinge unit in the +180° rotation state.
Figure 7B:
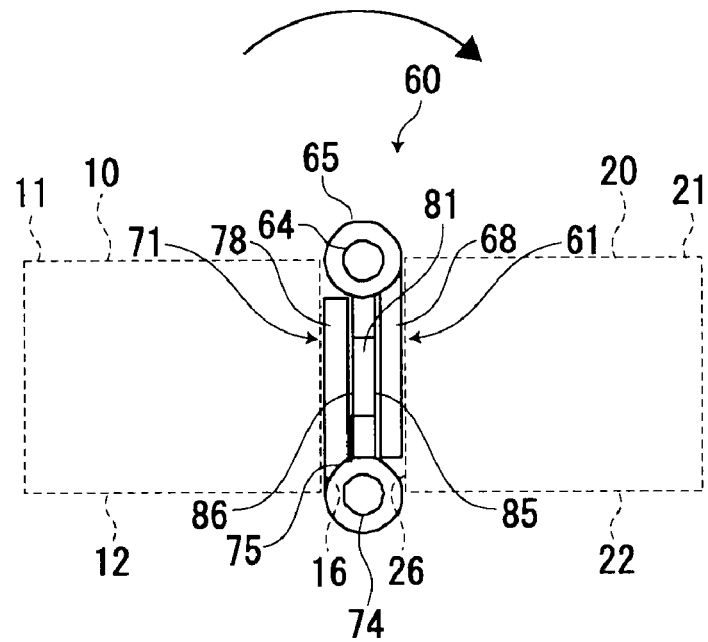

FIG. 6 is a perspective view showing the connecting apparatus 2 in a state where the second casing 20 is rotated by +180° with respect to the first casing 10 (+180° rotation state). FIG. 7A is a schematic view showing the first hinge unit 30 in the +180° rotation state. FIG. 7B is a schematic view showing the second hinge unit 60 in the +180° rotation state.

In the +180° rotation state, in the first hinge unit 30, the second plate portion 48 of the second hinge plate portion 41 rotated about the first rotation shaft 34 as the fulcrum and the connecting plate portion 54 of the first shaft connecting portion 51 rotated therewith are overlapped with the first hinge plate portion 31 fixed on the first casing 10. As a result, in the connecting plate portion 54 of the first shaft connecting portion 51, the second surface 56 comes in contact with the first plate portion 38 of the first hinge plate portion 31 while the first surface 55 keeps in contact with the second plate portion 48 of the second hinge plate portion 41.

Meanwhile, in the +180° rotation state, in the second hinge unit 60, the third plate portion 68 of the third hinge plate portion 61 rotated about the third rotation shaft 64 as the fulcrum is overlapped with the fourth hinge plate portion 71 fixed on the first casing 10 and the connecting plate portion 84 of the second shaft connecting portion 81. As a result, in the connecting plate portion 84 of the second shaft connecting portion 81, the second surface 86 comes in contact with the third plate portion 68 of the third hinge plate portion 61 while the first surface 85 keeps in contact with the fourth plate portion 78 of the fourth hinge plate portion 71.

In this state, the first rotation shaft 34 of the first hinge plate portion 31 and the third rotation shaft 64 of the third hinge plate portion 61 are in the coaxial relationship. At the same time, the second rotation shaft 44 of the second hinge plate portion 41 and the fourth rotation shaft 74 of the fourth hinge plate portion 71 are in the coaxial relationship.

Figure 8:
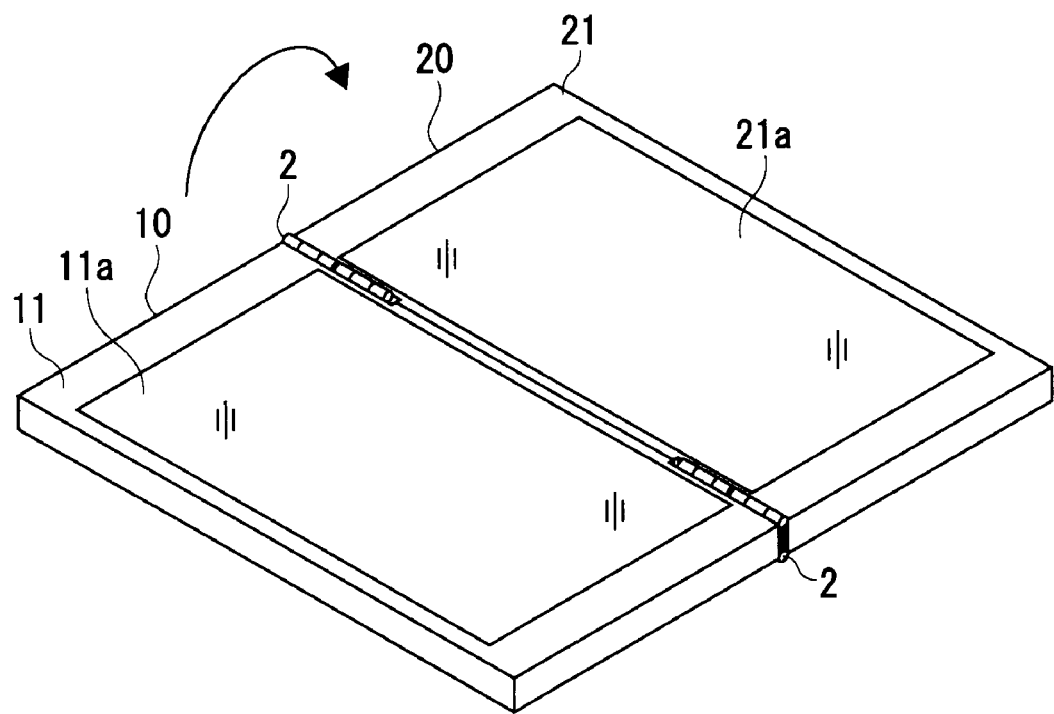
FIG. 8 is a perspective view showing the electronic apparatus in the +180° rotation state.

FIG. 8 is a perspective view showing the electronic apparatus 1 in the +180° rotation state.

As shown in FIG. 8, in the +180° rotation state, the first main surface 11 of the first casing 10 and the third main surface 21 of the second casing 20 are arranged in parallel and on the same plane.

In this state, in the first concave portion 17 and the second concave portion 27 facing with each other, the first hinge plate portion 31 and the second hinge plate portion 41 overlapped with each other are accommodated. Similarly, in the first concave portion 17 and the second concave portion 27, the third hinge plate portion 61 and the fourth hinge plate portion 71 overlapped with each other are accommodated. In the +180° rotation state, the distance between the first casing 10 and the second casing 20 can thus be made smaller.

Accordingly, the distance between the touch sensor panel 11a provided on the first main surface 11 of the first casing 10 and the touch sensor panel 21a provided on the third main surface 21 of the second casing 20 can thus be made smaller. In this state, the display panels overlapped with the touch sensor panels 11a, 21a may function as one display area.

Figure 9:
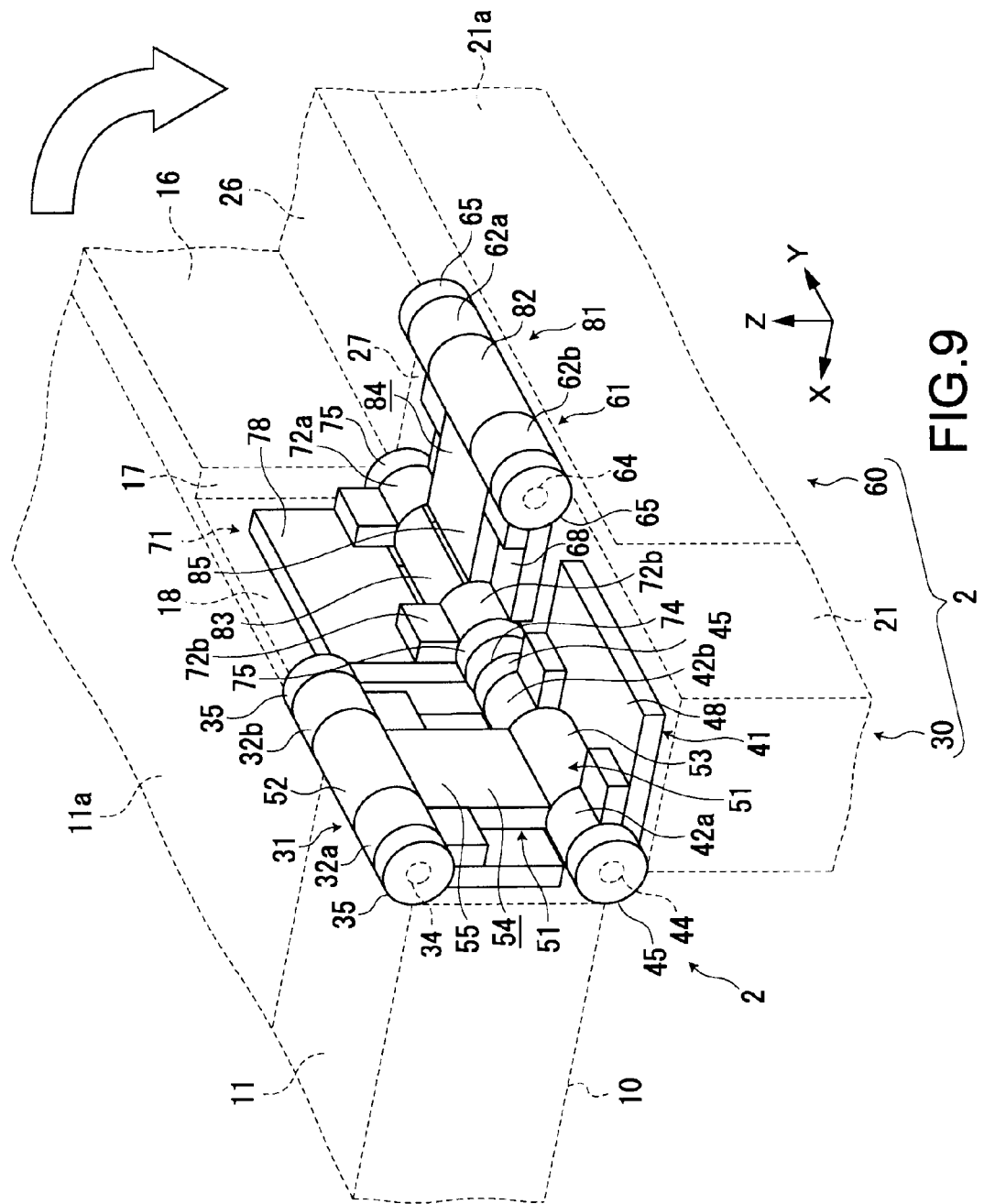
FIG. 9 is a perspective view showing the connecting apparatus in a state where the second casing is rotated by +270° with respect to the first casing.
Figure 10A:
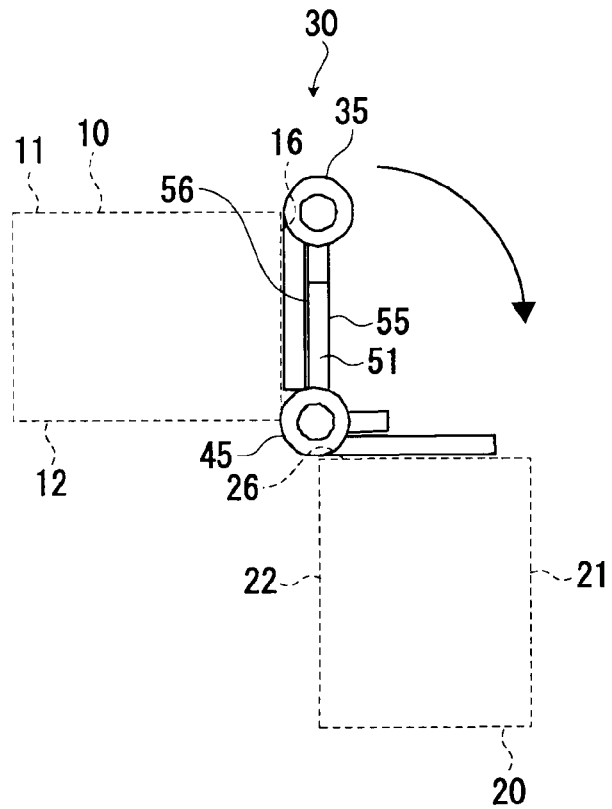
FIG. 10 are schematic views respectively showing the first hinge unit and the second hinge unit in the +270° rotation state.
Figure 10B:
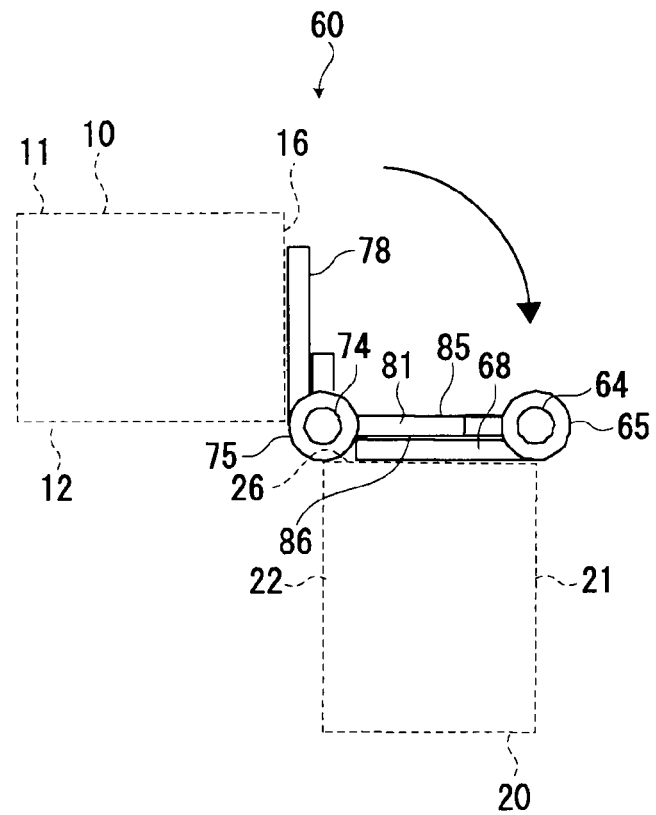

FIG. 9 is a perspective view showing the connecting apparatus 2 in a state where the second casing 20 is rotated by +270° with respect to the first casing 10 (+270° rotation state). FIG. 10A is a schematic view showing the first hinge unit 30 in the +270° rotation state. FIG. 10B is a schematic view showing the second hinge unit 60 in the +270° rotation state.

As shown in FIGS. 7 and 9, the second rotation shaft 44 of the second hinge plate portion 41 and the fourth rotation shaft 74 of the fourth hinge plate portion 71 are in the coaxial relationship. The second casing 20 is capable of being rotated with respect to the first casing 10 about the second rotation shaft 44 and the fourth rotation shaft 74 as the fulcrum.

That is, while in the rotation from 0° to +180°, the first rotation shaft 34 and the third rotation shaft 64 serve as the fulcrum of the rotation, in the rotation from +180° to +360°, the second rotation shaft 44 and the fourth rotation shaft 74 serve as the fulcrum of the rotation.

In the case where the second casing 20 is rotated with respect to the first casing 10, in the first hinge unit 30, the second hinge plate portion 41 fixed on the second casing 20 is rotated about the second rotation shaft 44 as the fulcrum. Herein, the second surface 56 of the first shaft connecting portion 51 of the first hinge unit 30 comes in contact with the first plate portion 38 even though the second casing 20 is rotated with respect to the first casing 10.

Meanwhile, in the case where the second casing 20 is rotated with respect to the first casing 10, in the second hinge unit 60, the third hinge plate portion 61 fixed on the second casing 20 is rotated about the fourth rotation shaft 74 as the fulcrum. Herein, the second shaft connecting portion 81 having the second surface 86 coming in contact with the third plate portion 68 of the third hinge plate portion 61 is rotated about the fourth rotation shaft 74 as the fulcrum together with the third hinge plate portion 61.

Figure 11:
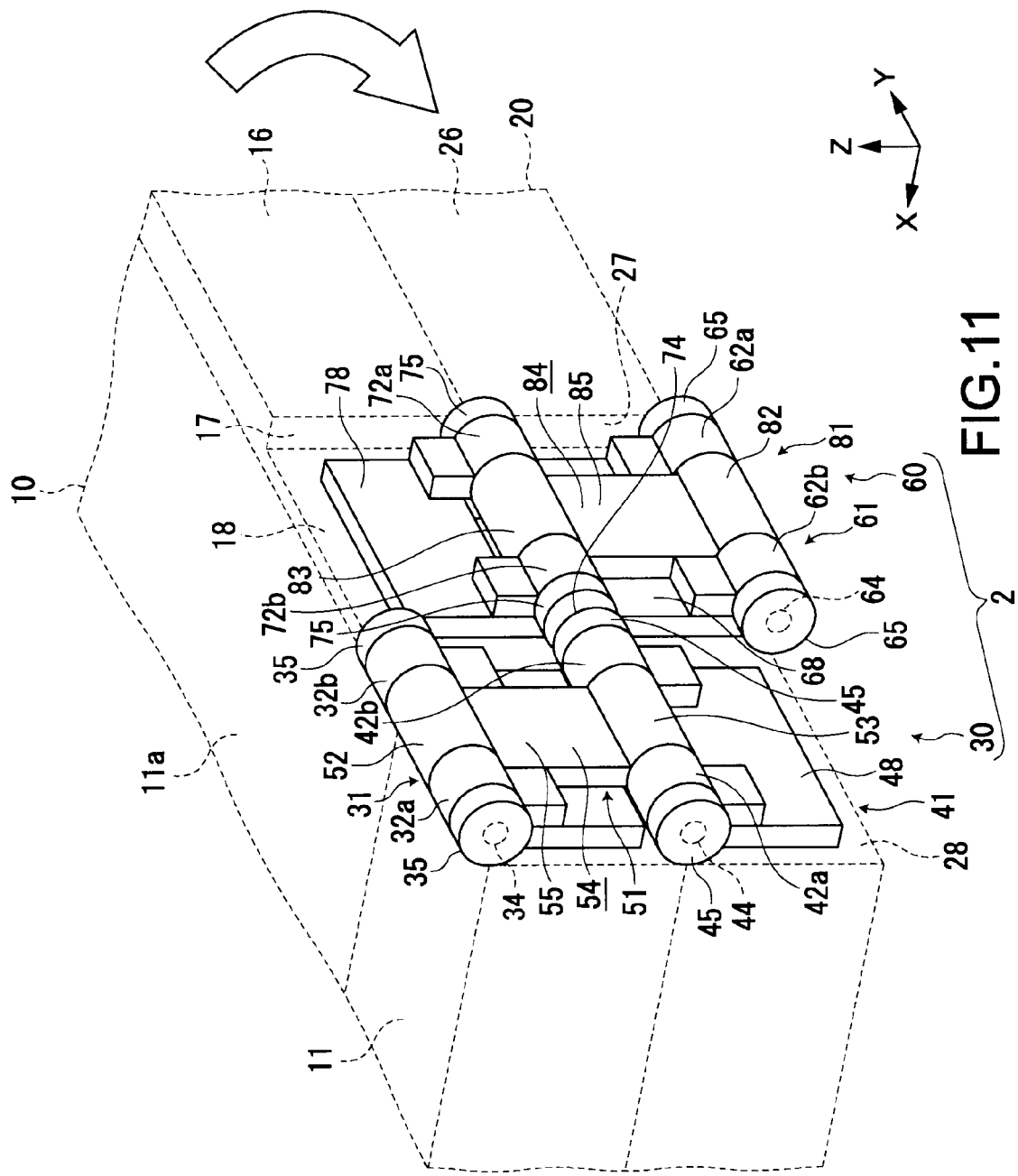
FIG. 11 is a perspective view showing the connecting apparatus in a state where the second casing is rotated by +360° with respect to the first casing.

FIG. 11 is a perspective view showing the connecting apparatus 2 in a state where the second casing 20 is rotated by +360° with respect to the first casing 10 (+360° rotation state). FIG. 12A is a schematic view showing the first hinge unit 30 in the +360° rotation state. FIG. 12B is a schematic view showing the second hinge unit 60 in the +360° rotation state.

In the state where the second casing 20 is rotated by 360° with respect to the first casing 10 about the second rotation shaft 44 and the fourth rotation shaft 74 being the fulcrum of the rotation, the fourth main surface 22 of the second casing 20 comes to be overlapped with the second main surface 12 of the first casing 10.

According to this embodiment, the first casing 10 and the second casing 20 are capable of being rotated relatively by +360° about the first rotation shaft 34 and the third rotation shaft 64 serving as the fulcrum in the rotation from 0° to +180° and about the second rotation shaft 44 and the fourth rotation shaft 74 serving as the fulcrum in the rotation from +180° to +360°.

Note that by rotating the second casing 20 in the +360° rotation state with respect to the first casing 10 in the − direction opposite to the opening direction, the second casing 20 is capable of being returned to the original 0° rotation state.

(Wiring Between First Casing and Second Casing)

Figure 13:
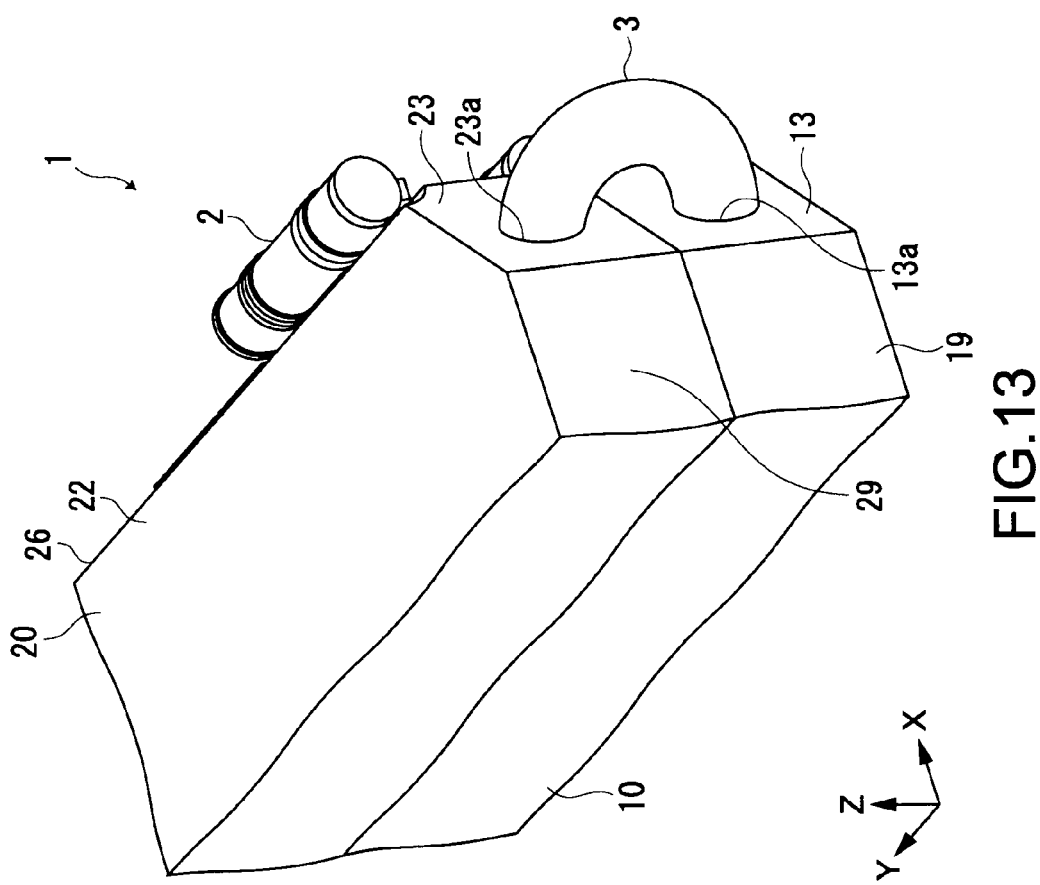
FIG. 13 is a perspective view showing the electronic apparatus in the 0° rotation state including a wiring electrically connecting a circuit board accommodated in the first casing and a circuit board accommodated in the second casing of a first example.

FIG. 13 is a perspective view showing the electronic apparatus 1 in the 0° rotation state including a wiring electrically connecting the circuit board accommodated in the first casing 10 and the circuit board accommodated in the second casing 20 of a first example.

In the first casing 10, a first notch surface 13 is provided on a corner portion formed by the first main surface 11, the second main surface 12, the first side surface 16, and a second side surface 19 having one short side of each of the rectangular main surfaces. A first opening 13a is formed on the first notch surface 13.

In the second casing 20, a second notch surface 23 is provided on a corner portion formed by the third main surface 21, the fourth main surface 22, the third side surface 26, and a fourth side surface 29 having one short side of each of the rectangular main surfaces. A second opening 23a is formed on the second notch surface 23. In the state where the first casing 10 and the second casing 20 connected by the connecting apparatuses 2, 2 are closed, the first notch surface 13 and the second notch surface 23 are arranged on the same plane.

The circuit board accommodated in the first casing 10 and the circuit board accommodated in the second casing 20 are electrically connected via a wiring 3 through the first opening 13a and the second opening 23a.

In the state where the first casing 10 is overlapped with the second casing 20 as shown in FIG. 13, the length of the exposed portion of the wiring 3 is, for example, about 11 mm in the case where the electronic apparatus 1 is a laptop PC.

Figure 14:
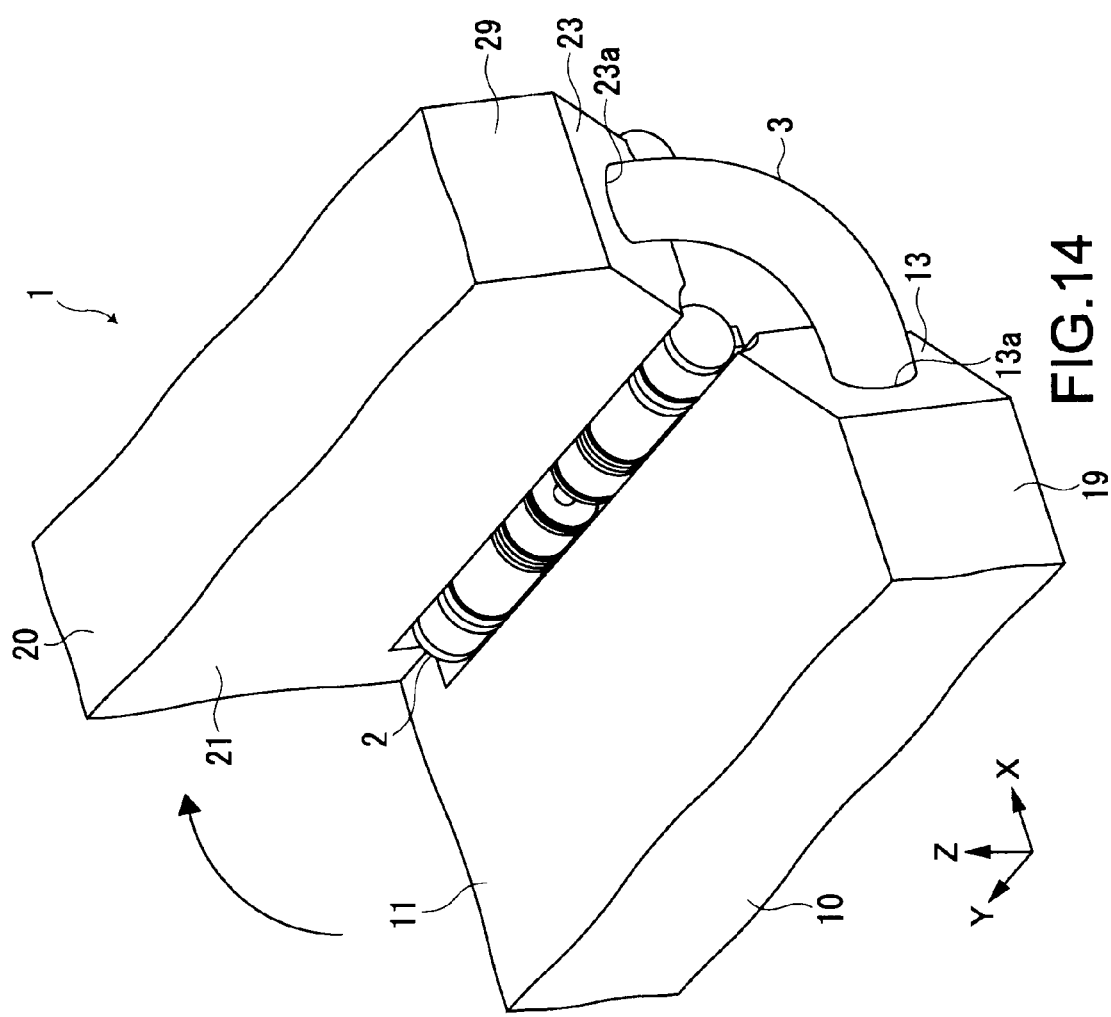
FIG. 14 is a perspective view showing the electronic apparatus in the state where the second casing is rotated by +90° with respect to the first casing.

FIG. 14 is a perspective view showing the electronic apparatus 1 in the state where the second casing 20 is rotated by +90° with respect to the first casing 10.

As shown in FIG. 14, in the state where the second casing 20 is rotated by +90° with respect to the first casing 10, the first notch surface 13 of the first casing 10 comes to be apart from the second notch surface 23 of the second casing 20. Accordingly, the length of the portion of the wiring 3 exposed from the first opening 13a and the second opening 23a becomes larger. In this case, the length is, for example, about 12.57 mm.

Figure 15:
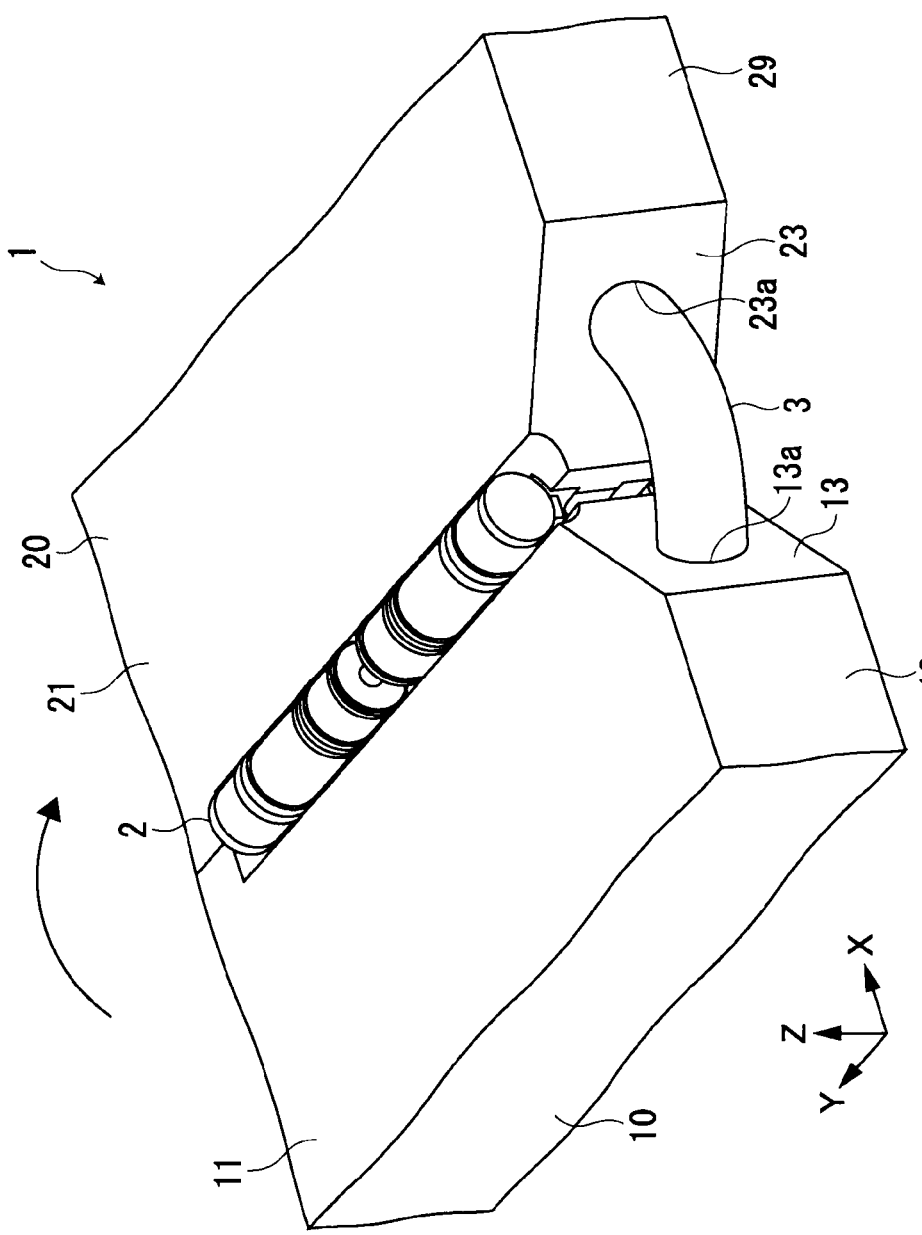
FIG. 15 is a perspective view showing the electronic apparatus in the state where the second casing is rotated by +180° with respect to the first casing.

FIG. 15 is a perspective view showing the electronic apparatus 1 in the state where the second casing 20 is rotated by +180° with respect to the first casing 10.

As shown in FIG. 15, in the state where the second casing 20 is rotated by +180° with respect to the first casing 10, the first notch surface 13 of the first casing 10 comes to be faced with the second notch surface 23 of the second casing 20. In this case, the length of the portion of the wiring 3 exposed from the first opening 13a and the second opening 23a becomes smaller than those in the +90° rotation state and the 0° rotation state. In this case, the length is, for example, about 9.42 mm.

In the wiring of the first example, the circuit boards in the casings can be electrically connected irrespective of the positional relationship of the first casing 10 and the second casing 20.

Figure 16:
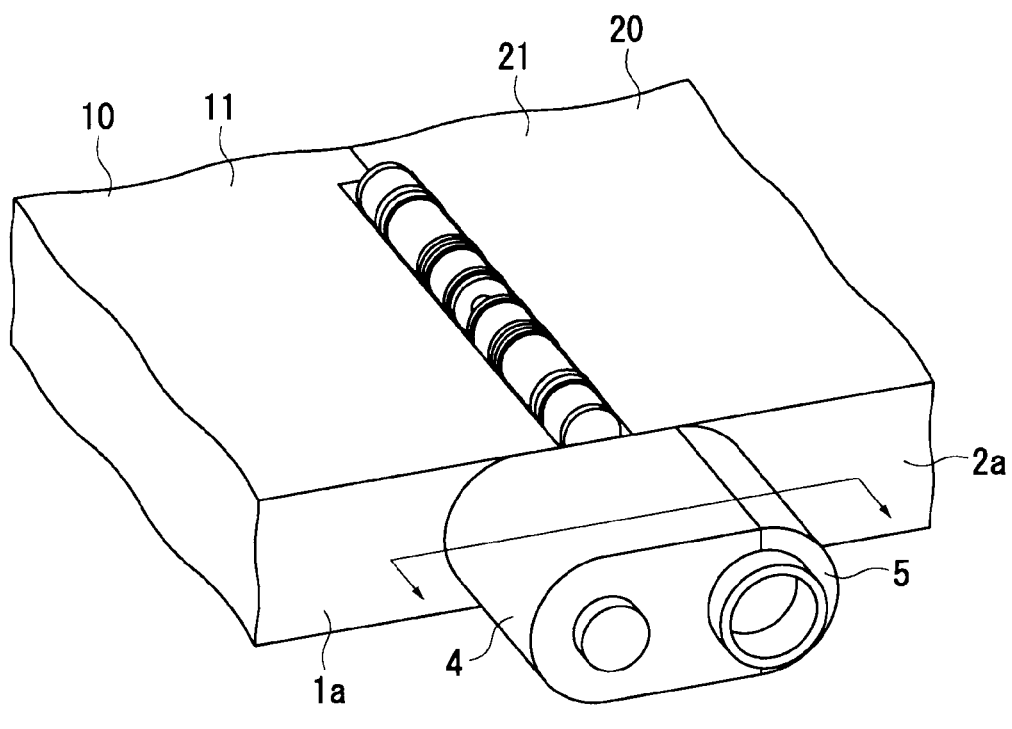
FIG. 16 is a perspective view showing the electronic apparatus including a wiring electrically connecting the circuit board accommodated in the first casing and the circuit board accommodated in the second casing of a second example, in which the second casing is rotated by +180° with respect to the first casing.

FIG. 16 is a perspective view showing the electronic apparatus 1 including a wiring electrically connecting the circuit board accommodated in the first casing 10 and the circuit board accommodated in the second casing 20 of a second example, in which the second casing 20 is rotated by +180° with respect to the first casing 10. FIG. 17 is a partial sectional view showing the electronic apparatus 1 of FIG. 16.

On the second side surface 19 having one short side of each of the rectangular main surfaces of the first casing 10, a first wiring accommodation portion 4 having a U-shaped section and having an opening on the side of the first side surface 16 is provided. An opening (not shown) is provided on the portion of the second side surface 19 coming in contact with the first wiring accommodation portion 4, and an opening (not shown) is provided on the portion of the first wiring accommodation portion 4 coming in contact with the second side surface 19. The wiring 3 is led out from the circuit board accommodated in the first casing 10 through the openings.

On the fourth side surface 29 having one short side of each of the rectangular main surfaces of the second casing 20, a second wiring accommodation portion 5 capable of being slidably coupled with the opening of the first wiring accommodation portion 4 and partially inserted in the first wiring accommodation portion 4 is provided. An opening (not shown) is provided on the portion of the third side surface 26 coming in contact with the second wiring accommodation portion 5, and an opening (not shown) is provided on the portion of the second wiring accommodation portion 5 coming in contact with the third side surface 26. The wiring 3 in the first wiring accommodation portion 4 is electrically connected to the circuit board accommodated in the second casing 20 through the openings.

In the state where the second casing 20 is rotated by +180° with respect to the first casing 10, most of the second wiring accommodation portion 5 is inserted in the first wiring accommodation portion 4, and the wiring 3 is accommodated in an S-shaped manner in the wiring accommodation portions 4, 5.

Figure 18:
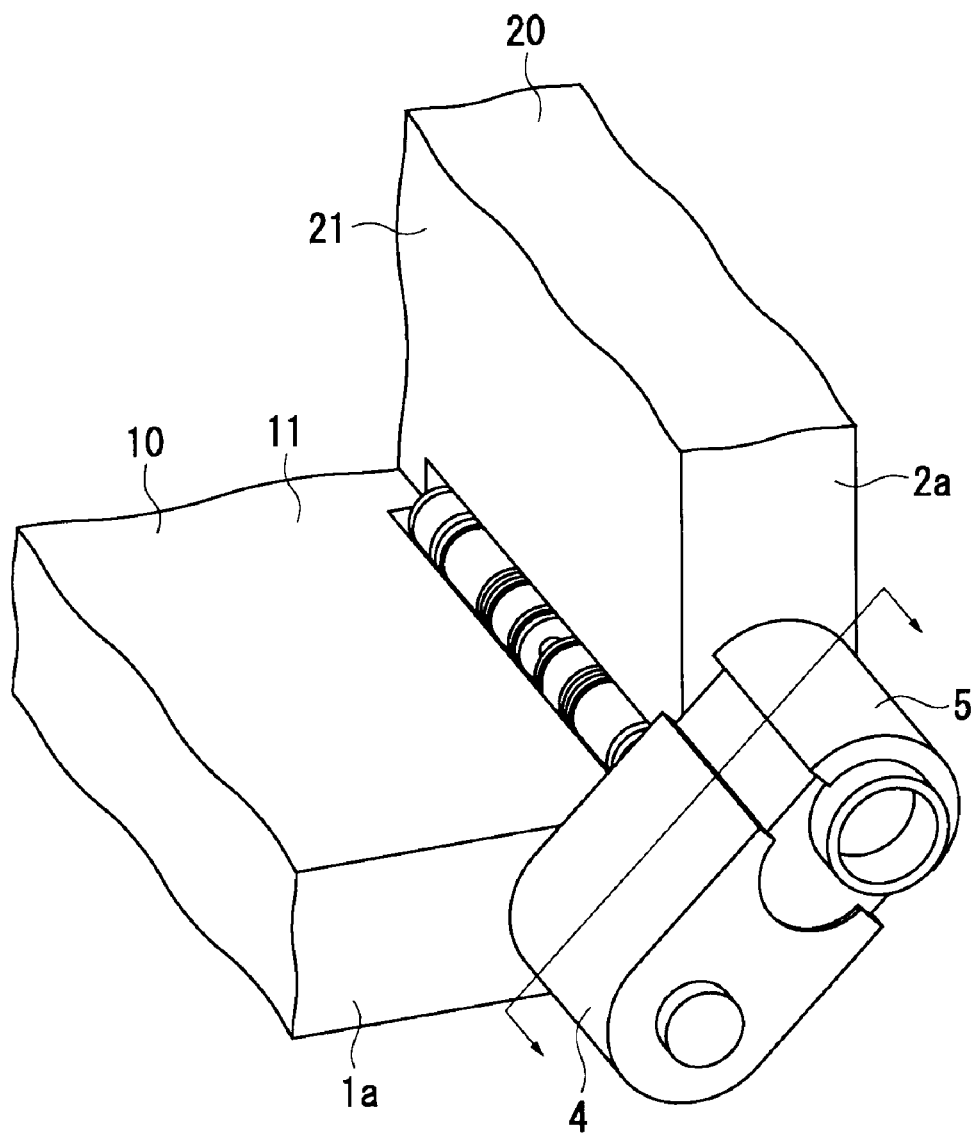
FIG. 18 is a perspective view showing the electronic apparatus in the state where the second casing is rotated by +90° with respect to the first casing.
Figure 19:
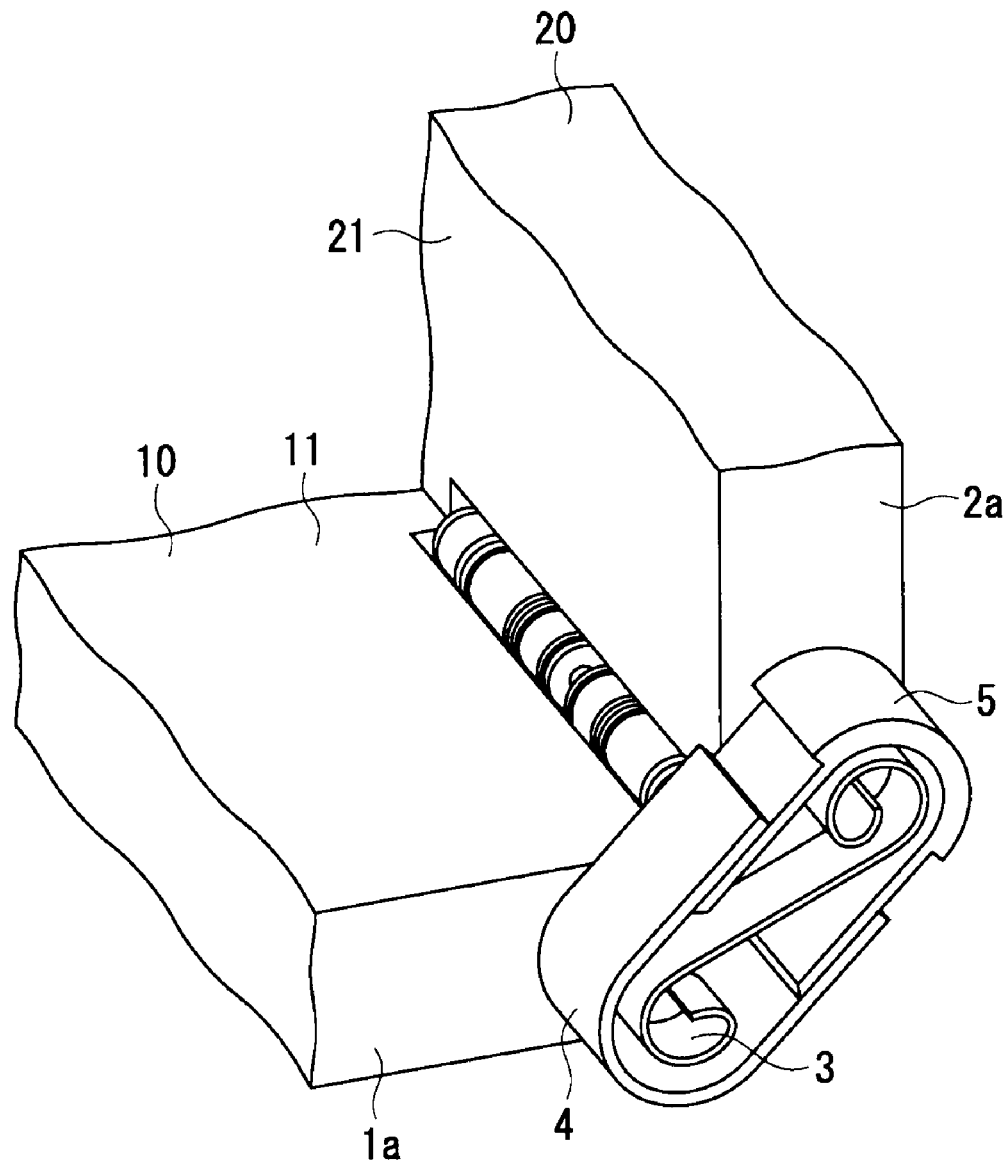
FIG. 19 is a partial sectional view showing the electronic apparatus in the state where the second casing is rotated by +90° with respect to the first casing.

FIG. 18 is a perspective view showing the electronic apparatus 1 in the state where the second casing 20 is rotated by +90° with respect to the first casing 10. FIG. 19 is a partial sectional view showing the electronic apparatus 1 of FIG. 18.

In the state where the second casing 20 is rotated by +90° with respect to the first casing 10, the second casing 20 comes to be apart from the first casing 10. As a result, the portion of the second wiring accommodation portion 5 slidably-coupled with and partially-inserted in the opening of the first wiring accommodation portion 4 comes to be exposed, and the engaging area of the wiring accommodation portions 4, 5 becomes smaller. Then, the center portion of the wiring 3 accommodated in the S-shaped manner in the wiring accommodation portions 4, 5 in the +180° rotation state is unwound in a substantially-straight manner, and the wiring 3 keeps the electric connection of the circuit board in the first casing 10 and the circuit board in the second casing 20 maintained.

Also, according to the wiring of the second example, the circuit boards in the casings can be electrically connected irrespective of the positional relationship of the first casing 10 and the second casing 20.

Figure 20:
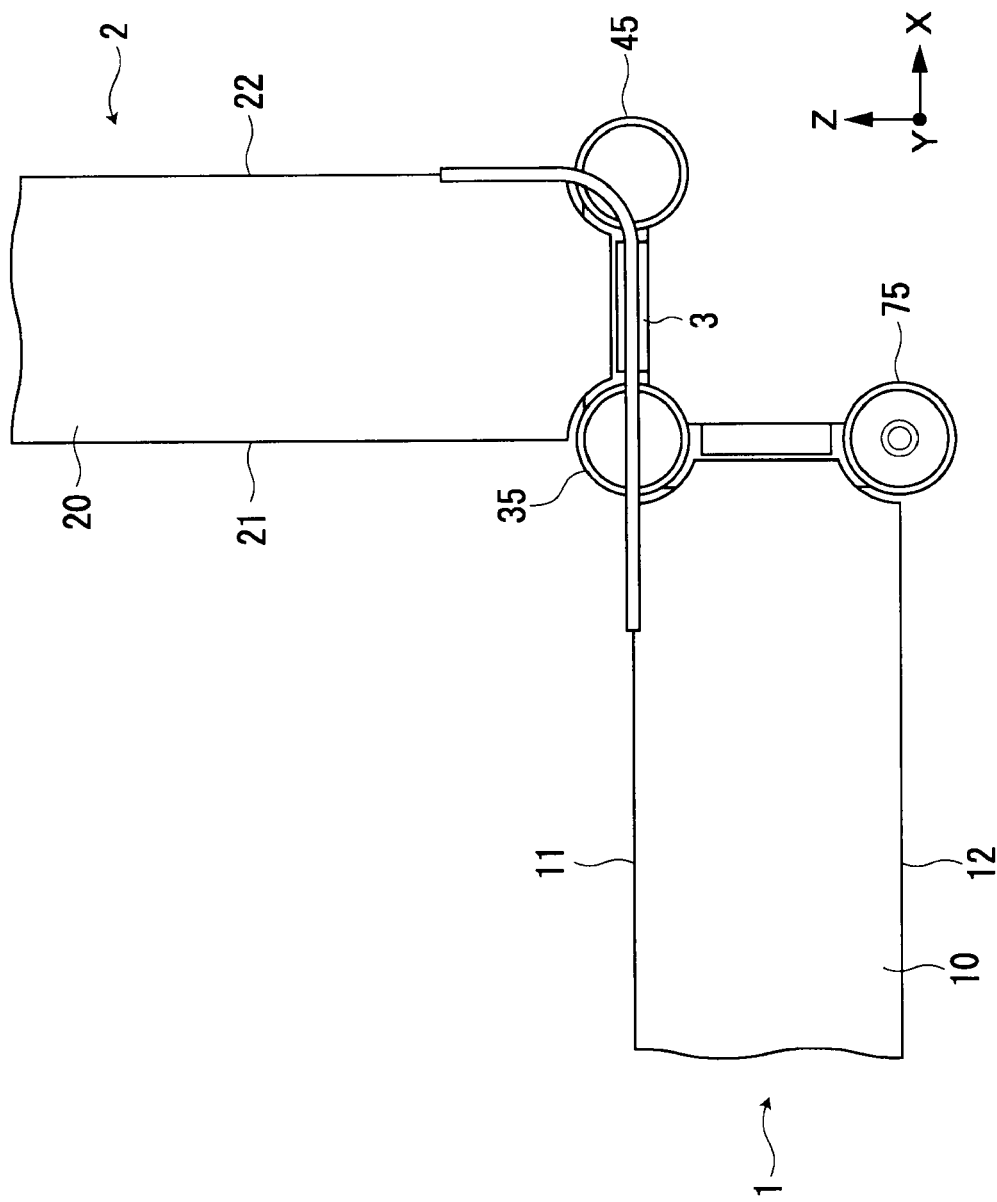
FIG. 20 is a schematic view showing the electronic apparatus in the +90° rotation state including a wiring electrically connecting the circuit board accommodated in the first casing and the circuit board accommodated in the second casing of a third example.

FIG. 20 is a schematic view showing the electronic apparatus 1 in the +90° rotation state including a wiring electrically connecting the circuit board accommodated in the first casing 10 and the circuit board accommodated in the second casing 20 of a third example.

In this example, the wiring 3 electrically connecting the circuit board in the first casing 10 and the circuit board in the second casing 20 is provided on the first shaft connecting portion 51 of the first hinge unit 30. The wiring 3 may be accommodated in the first shaft connecting portion 51 being hollow, or may be arranged along the first shaft connecting portion 51.

The wiring 3 is arranged on the side of the first main surface 11 in the first casing 10, and is arranged on the side of the fourth main surface 22 in the second casing 20. Accordingly, the casings 10, 20 are capable of being rotated relatively about the first rotation shaft 34 as the fulcrum and about the second rotation shaft 44 as the fulcrum. Note that the wiring 3 may be arranged on the side of the second main surface 12 in the first casing 10, and may be arranged on the side of the third main surface 21 in the second casing 20.

Second Embodiment

Structures of Electronic Apparatus and Connecting Apparatuses

Figure 21:
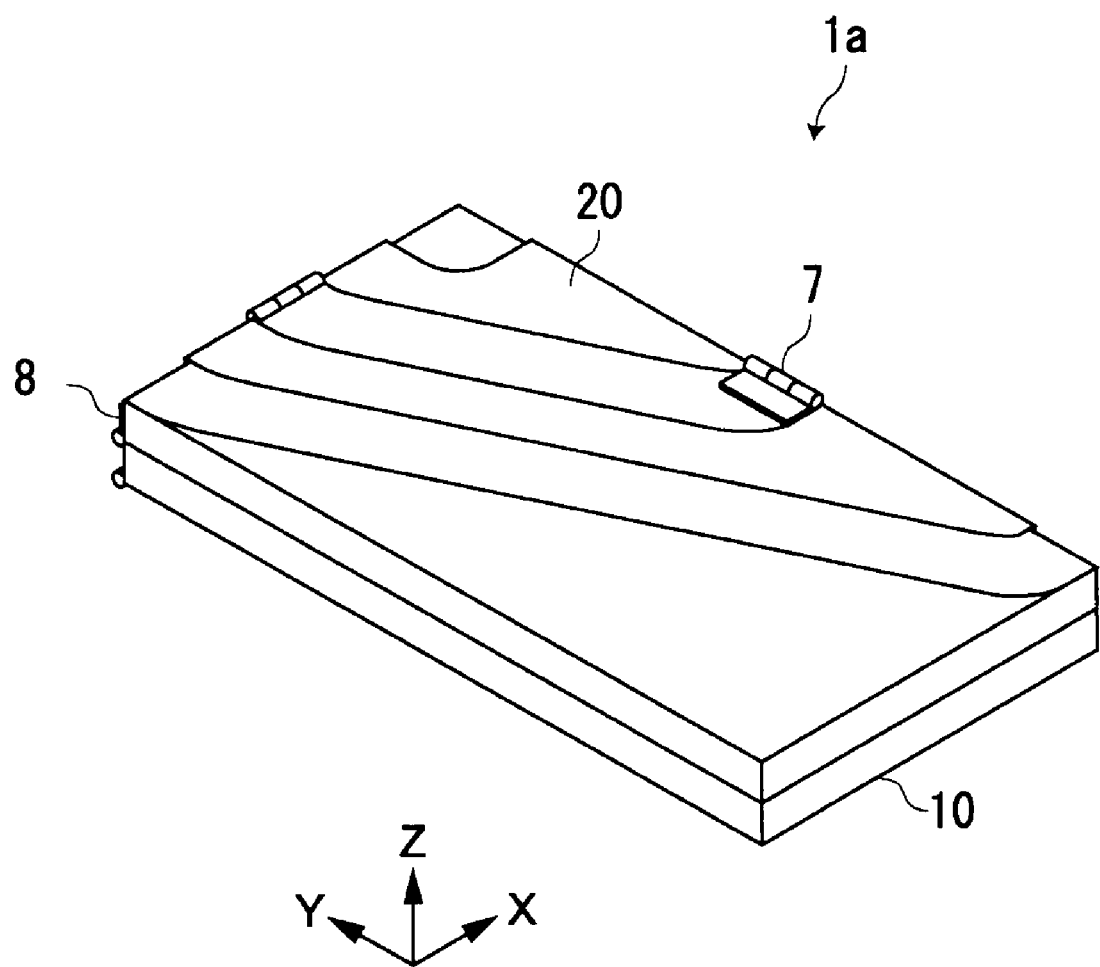
FIG. 21 is a perspective view showing an electronic apparatus in a closed state according to another embodiment of the present invention.
Figure 22:
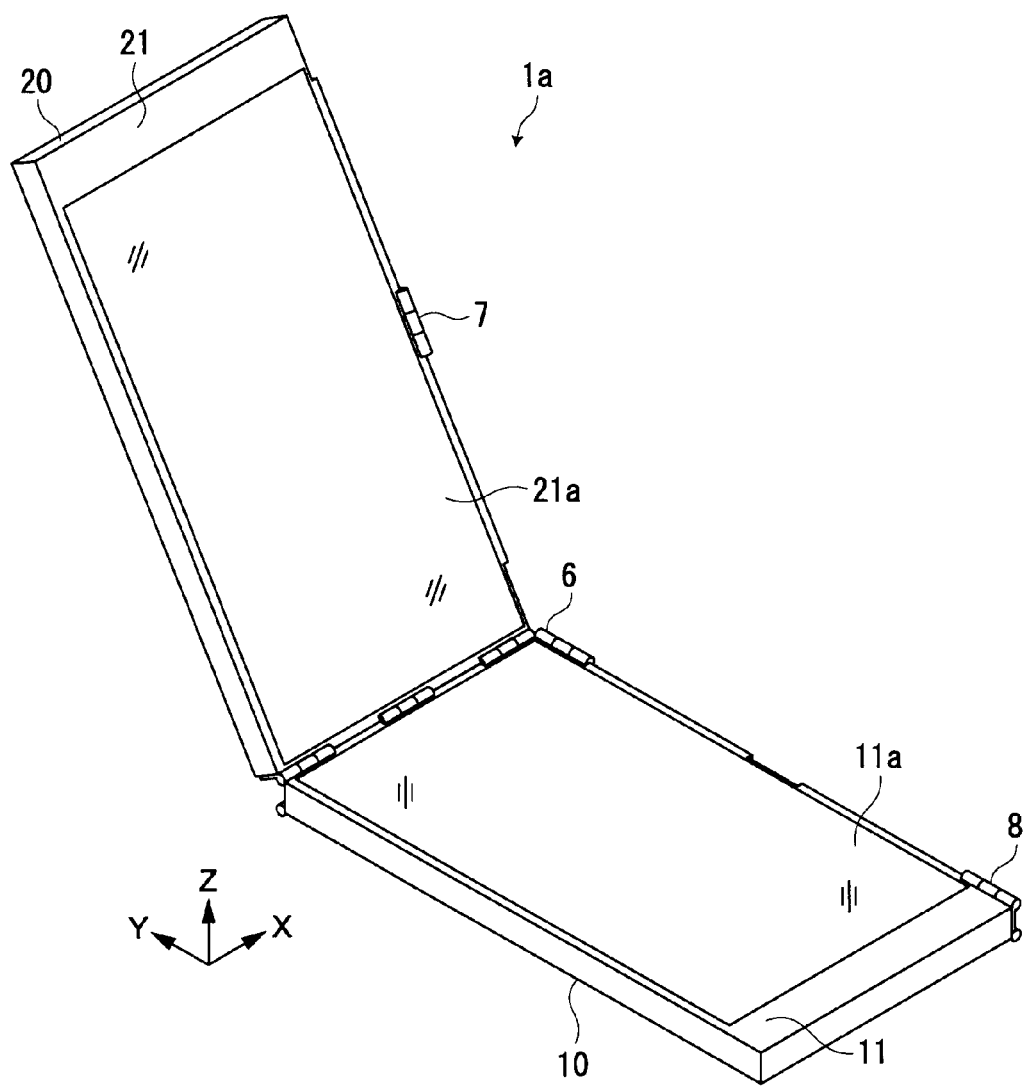
FIG. 22 is a perspective view showing the electronic apparatus in an open state.
Figure 23:
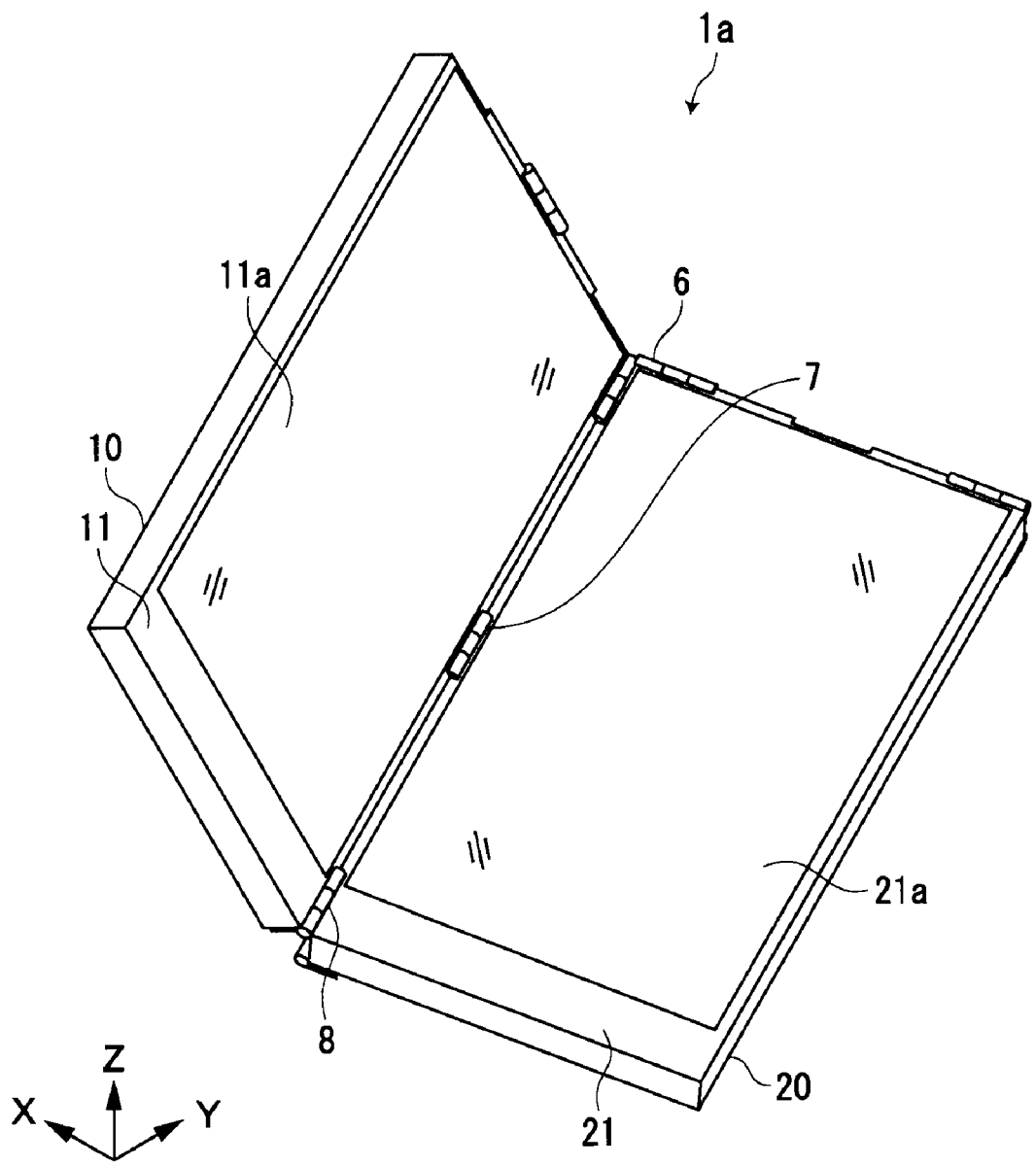
FIG. 23 is a perspective view showing the electronic apparatus in another open state.

FIG. 21 is a perspective view showing an electronic apparatus 1a in a closed state according to another embodiment of the present invention. FIG. 22 is a perspective view showing the electronic apparatus 1a in an open state. FIG. 23 is a perspective view showing the electronic apparatus 1a in another open state. These two open states will be described later.

The electronic apparatus 1a includes a first casing 10, a second casing 20, a first connecting apparatus 6, a second connecting apparatus 7, and a third connecting apparatus 8. In the state of FIG. 21, the first main surface 11 of the first casing 10 is overlapped with the third main surface 21 of the second casing 20. Each of the first connecting apparatus 6, the second connecting apparatus 7, and the third connecting apparatus 8 includes two hinge units, each of the hinge units having the structure same as the structure of the first hinge unit 30 or the second hinge unit 60 of the first embodiment.

Hereinafter, description of members, structures, and the like similar to the members, structures, and the like described in the first embodiment will be omitted or shortened, and points different from the first embodiment will mainly be described.

Figure 34:
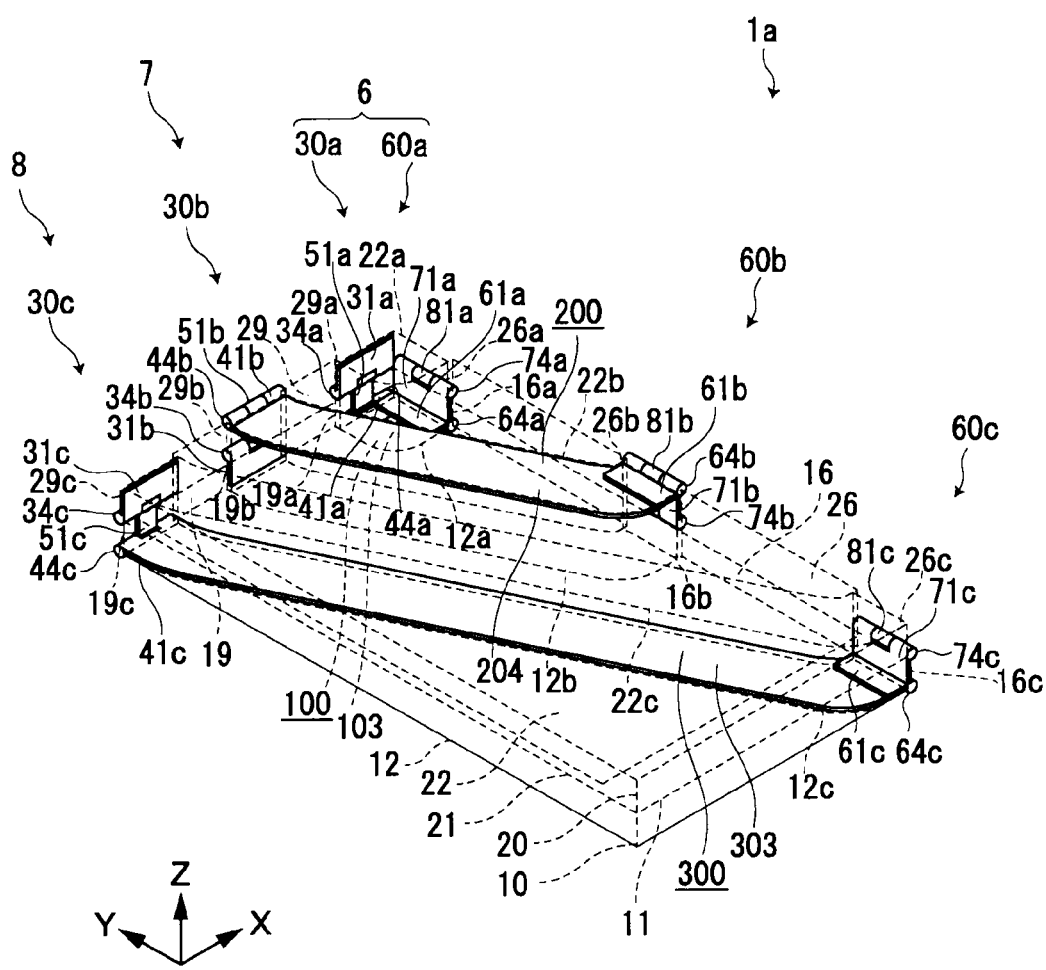
FIG. 34 is a perspective view showing the first connecting apparatus, the second connecting apparatus, and the third connecting apparatus of the electronic apparatus of FIG. 21.

FIG. 34 is a perspective view showing the first connecting apparatus 6, the second connecting apparatus 7, and the third connecting apparatus 8 of the electronic apparatus 1a of FIG. 21.

The first connecting apparatus 6 includes a first hinge unit 30a, a second hinge unit 60a, and a first hinge connecting portion 100.

The first hinge unit 30a includes a first hinge plate portion 31a, a second hinge plate portion 41a, and a first shaft connecting portion 51a. The first hinge plate portion 31a and the first shaft connecting portion 51a are rotatably connected by the first rotation shaft 34a. The second hinge plate portion 41a and the first shaft connecting portion 51a are rotatably connected by the second rotation shaft 44a.

The first hinge plate portion 31a is fixed on the fourth side surface 29 of the second casing 20. In the first hinge plate portion 31a, the axial center of the first rotation shaft 34a rotatably supporting the first hinge plate portion 31a is arranged along the line on which the plane on the third main surface 21 of the second casing 20 crosses the plane on the fourth side surface 29 of the second casing 20.

The second hinge unit 60a includes a third hinge plate portion 61a, a fourth hinge plate portion 71a, and a second shaft connecting portion 81a. The third hinge plate portion 61a and the second shaft connecting portion 81a are rotatably connected by the third rotation shaft 64a. The fourth hinge plate portion 71a and the second shaft connecting portion 81a are rotatably connected by the fourth rotation shaft 74a.

The fourth hinge plate portion 71a is fixed on the first side surface 16 of the first casing 10. In the fourth hinge plate portion 71a, the axial center of the fourth rotation shaft 74a rotatably supporting the fourth hinge plate portion 71a is arranged along the line on which the plane on the first main surface 11 of the first casing 10 crosses the plane on the first side surface 16 of the first casing 10.

The second hinge plate portion 41a of the first hinge unit 30a is fixed on one end portion of the first hinge connecting portion 100. The surface of the first hinge connecting portion 100 on which the second hinge plate portion 41a is fixed is referred to as "second surface 104".

The third hinge plate portion 61a of the second hinge unit 60a is fixed on the other end portion of the first hinge connecting portion 100. The third hinge plate portion 61a is fixed on a first surface 103 of the first hinge connecting portion 100, the first surface 103 being the backside surface of the second surface 104.

Note that, on the second main surface 12 of the first casing 10, a concave portion 12a capable of accommodating the first hinge connecting portion 100 is provided. Accordingly, the second surface 104 of the first hinge connecting portion 100 can be arranged on the plane substantially same as the plane on the second main surface 12. On the portion of the fourth main surface 22 of the second casing 20 corresponding to the concave portion 12a, a concave portion 22a having the shape similar to the shape of the concave portion 12a is provided.

On the first side surface 16 of the first casing 10, a concave portion 16a on which the fourth hinge plate portion 71a of the second hinge unit 60a is fixed for accommodating the fourth hinge plate portion 71a is provided. Accordingly, in the fourth hinge plate portion 71a, the axial center of the fourth rotation shaft 74a rotatably supporting the fourth hinge plate portion 71a is arranged along the line on which the plane on the first main surface 11 of the first casing 10 crosses the plane on the first side surface 16 of the first casing 10. On the portion of the third main surface 26 of the second casing 20 corresponding to the concave portion 16a, a concave portion 26a having the shape similar to the shape of the concave portion 16a is provided.

On the fourth side surface 29 of the second casing 20, a concave portion 29a on which the first hinge plate portion 31a of the first hinge unit 30a is fixed for accommodating the first hinge plate portion 31a is provided. Accordingly, in the first hinge plate portion 31a, the axial center of the first rotation shaft 34a rotatably supporting the first hinge plate portion 31a is arranged along the line on which the plane on the third main surface 21 of the second casing 20 crosses the plane on the fourth side surface 29 of the second casing 20. On the portion of the second side surface 19 of the first casing 10 corresponding to the concave portion 29a, a concave portion 19a having the shape similar to the shape of the concave portion 29a is provided.

The second connecting apparatus 7 includes a third hinge unit 30b, a fourth hinge unit 60b, and a second hinge connecting portion 200.

The third hinge unit 30b includes a fifth hinge plate portion 31b, a sixth hinge plate portion 41b, and a third shaft connecting portion 51b. The fifth hinge plate portion 31b and the third shaft connecting portion 51b are rotatably connected by the fifth rotation shaft 34b. The sixth hinge plate portion 41b and the third shaft connecting portion 51b are rotatably connected by the sixth rotation shaft 44b.

The fifth hinge plate portion 31b is fixed on the second side surface 19 of the first casing 10. In the fifth hinge plate portion 31b, the axial center of the fifth rotation shaft 34b rotatably supporting the fifth hinge plate portion 31b is arranged along the line on which the plane on the first main surface 11 of the first casing 10 crosses the plane on the second side surface 19 of the first casing 10.

The fourth hinge unit 60b includes a seventh hinge plate portion 61b, an eighth hinge plate portion 71b, and a fourth shaft connecting portion 81b. The seventh hinge plate portion 61b and the fourth shaft connecting portion 81b are rotatably connected by the seventh rotation shaft 64b. The eighth hinge plate portion 71b and the fourth shaft connecting portion 81b are rotatably connected by the eighth rotation shaft 74b.

The eighth hinge plate portion 71b is fixed on the third side surface 26 of the second casing 20. In the eighth hinge plate portion 71b, the axial center of the eighth rotation shaft 74b rotatably supporting the eighth hinge plate portion 71b is arranged along the line on which the plane on the third main surface 21 of the second casing 20 crosses the plane on the third side surface 26 of the second casing 20.

The sixth hinge plate portion 41b of the third hinge unit 30b is fixed on one end portion of the second hinge connecting portion 200. The surface of the second hinge connecting portion 200 on which the sixth hinge plate portion 41b is fixed is referred to as "first surface 203".

The seventh hinge plate portion 61b of the fourth hinge unit 60b is fixed on the other end portion of the second hinge connecting portion 200. The seventh hinge plate portion 61b is fixed on a second surface 204 of the second hinge connecting portion 200, the second surface 204 being the backside surface of the first surface 203.

Note that, on the third side surface 26 of the second casing 20, a concave portion 26b on which the eighth hinge plate portion 71b of the fourth hinge unit 60b is fixed for accommodating the eighth hinge plate portion 71b is provided. Accordingly, in the eighth hinge plate portion 71b, the axial center of the eighth rotation shaft 74b is arranged along the line on which the plane on the third main surface 21 of the second casing 20 crosses the plane on the third side surface 26 of the second casing 20. On the portion of the first side surface 16 of the first casing 10 corresponding to the concave portion 26b, a concave portion 16b having the shape similar to the shape of the concave portion 26b is provided.

On the second side surface 19 of the first casing 10, a concave portion 19b on which the fifth hinge plate portion 31b of the third hinge unit 30b is fixed for accommodating the fifth hinge plate portion 31*b* is provided. Accordingly, in the fifth hinge plate portion 31*b*, the axial center of the fifth rotation shaft 34*b* is arranged along the line on which the plane on the first main surface 11 of the first casing 10 crosses the plane on the second side surface 19 of the first casing 10. On the portion of the fourth side surface 29 of the second casing 20 corresponding to the concave portion 19*b*, a concave portion 29*b* having the shape similar to the shape of the concave portion 19*b* is provided.

On the fourth main surface 22 of the second casing 20, a concave portion 22*b* capable of accommodating the second hinge connecting portion 200 is provided. Accordingly, the second surface 204 of the second hinge connecting portion 200 can be arranged on the plane substantially same as the plane on the second main surface 12. On the portion of the second main surface 12 of the first casing 10 corresponding to the concave portion 22*b*, a concave portion 12*b* having the shape similar to the shape of the concave portion 22*b* is provided.

The third connecting apparatus 8 includes a fifth hinge unit 30*c*, a sixth hinge unit 60*c*, and a third hinge connecting portion 300.

The fifth hinge unit 30*c* includes a ninth hinge plate portion 31*c*, a tenth hinge plate portion 41*c*, and a fifth shaft connecting portion 51*c*. The ninth hinge plate portion 31*c* and the fifth shaft connecting portion 51*c* are rotatably connected by the ninth rotation shaft 34*c*. The tenth hinge plate portion 41*c* and the fifth shaft connecting portion 51*c* are rotatably connected by the tenth rotation shaft 44*c*.

The ninth hinge plate portion 31*c* is fixed on the fourth side surface 29 of the second casing 20. In the ninth hinge plate portion 31*c*, the axial center of the ninth rotation shaft 34*c* rotatably supporting the ninth hinge plate portion 31*c* is arranged along the line on which the plane on the third main surface 21 of the second casing 20 crosses the plane on the fourth side surface 29 of the second casing 20.

The sixth hinge unit 60*c* includes an eleventh hinge plate portion 61*c*, a twelfth hinge plate portion 71*c*, and a sixth shaft connecting portion 81*c*. The eleventh hinge plate portion 61*c* and the sixth shaft connecting portion 81*c* are rotatably connected by the eleventh rotation shaft 64*c*. The twelfth hinge plate portion 71*c* and the sixth shaft connecting portion 81*c* are rotatably connected by the twelfth rotation shaft 74*c*.

The twelfth hinge plate portion 71*c* is fixed on the first side surface 16 of the first casing 10. In the twelfth hinge plate portion 71*c*, the axial center of the twelfth rotation shaft 74*c* rotatably supporting the twelfth hinge plate portion 71*c* is arranged along the line on which the plane on the first main surface 11 of the first casing 10 crosses the plane on the first side surface 16 of the first casing 10.

The tenth hinge plate portion 41*c* of the fifth hinge unit 30*c* is fixed on one end portion of the third hinge connecting portion 300. The surface of the third hinge connecting portion 300 on which the tenth hinge plate portion 41*c* is fixed is referred to as "second surface 304".

The eleventh hinge plate portion 61*c* of the sixth hinge unit 60*c* is fixed on the other end portion of the third hinge connecting portion 300. The eleventh hinge plate portion 61*c* is fixed on a first surface 303 of the third hinge connecting portion 300, the first surface 303 being the backside surface of the second surface 304.

Note that, on the second main surface 12 of the first casing 10, a concave portion 12*c* capable of accommodating the third hinge connecting portion 300 is provided. Accordingly, the second surface 304 of the third hinge connecting portion 300 can be arranged on the plane substantially same as the plane on the second main surface 12. On the portion of the fourth main surface 22 of the second casing 20 corresponding to the concave portion 12*c*, a concave portion 22*c* having the shape similar to the shape of the concave portion 12*c* is provided.

On the first side surface 16 of the first casing 10, a concave portion 16*c* on which the twelfth hinge plate portion 71*c* of the sixth hinge unit 60*c* is fixed for accommodating the twelfth hinge plate portion 71*c* is provided. Accordingly, in the twelfth hinge plate portion 71*c*, the axial center of the twelfth rotation shaft 74*c* is arranged along the line on which the plane on the first main surface 11 of the first casing 10 crosses the plane on the first side surface 16 of the first casing 10. On the portion of the third main surface 26 of the second casing 20 corresponding to the concave portion 16*c*, a concave portion 26*c* having the shape similar to the shape of the concave portion 16*c* is provided.

On the fourth side surface 29 of the second casing 20, a concave portion 29*c* on which the ninth hinge plate portion 31*c* of the fifth hinge unit 30*c* is fixed for accommodating the ninth hinge plate portion 31*c* is provided. Accordingly, in the ninth hinge plate portion 31*c*, the axial center of the ninth rotation shaft 34*c* is arranged along the line on which the plane on the third main surface 21 of the second casing 20 crosses the plane on the fourth side surface 29 of the second casing 20. On the portion of the second side surface 19 of the first casing 10 corresponding to the concave portion 29*c*, a concave portion 19*c* having the shape similar to the shape of the concave portion 29*c* is provided.

Note that, in the following description, the "second main surface 12" of the first casing 10 includes the concave portions 12*a*, 12*b*, 12*c*. The "first side surface 16" includes the concave portions 16*a*, 16*b*, 16*c*. The "second side surface 19" includes the concave portions 19*a*, 19*b*, 19*c*. The "fourth main surface 22" of the second casing 20 includes the concave portions 22*a*, 22*b*, 22*c*. The "third side surface 26" includes the concave portions 26*a*, 26*b*, 26*c*. The "fourth side surface 29" includes the concave portions 29*a*, 29*b*, 29*c*.

(Operations of Connecting Apparatuses when Casing of Electronic Apparatus is Rotated about X Axis)

Next, operations of the first connecting apparatus 6, the second connecting apparatus 7, and the third connecting apparatus 8 in the case where a user opens/closes the electronic apparatus 1*a* thus structured will be described.

Before the user opens/closes the electronic apparatus 1*a*, the first main surface 11 of the first casing 10 is overlapped with the third main surface 21 of the second casing 20 as shown in FIGS. 21 and 34. Further, in the first hinge connecting portion 100, the first surface 103 comes in contact with the second main surface 12 of the first casing 10, and the second surface 104 is exposed. In the second hinge connecting portion 200, the first surface 203 comes in contact with the fourth main surface 22 of the second casing 20, and the second surface 204 is exposed. In the third hinge connecting portion 300, the first surface 303 comes in contact with the second main surface 12 of the first casing 10, and the second surface 304 is exposed.

Hereinafter, operations of the first connecting apparatus 6, the second connecting apparatus 7, and the third connecting apparatus 8, in a case where the second casing 20 is rotated with respect to the first casing 10, the position of the first casing 10 being not changed, will be described with reference to the drawings. Note that, for easier understanding of the drawings, hereinafter, the positions of the concave portions 12*a*, 12*b*, 12*c*, 22*a*, 22*b*, 22*c* of the second main surface 12 of the first casing 10 and the fourth main surface 22 of the second casing 20 will be shown in the drawings, but the depths thereof will not be shown in the drawings.

The state where the first main surface 11 of the first casing 10 is overlapped with the third main surface 21 of the second casing 20 is referred to as "0° rotation state". Hereinafter, operations in a case where the user opens/closes the electronic apparatus 1a by rotating the second casing 20 with respect to the first casing 10 about the X axis will be described.

Figure 24:
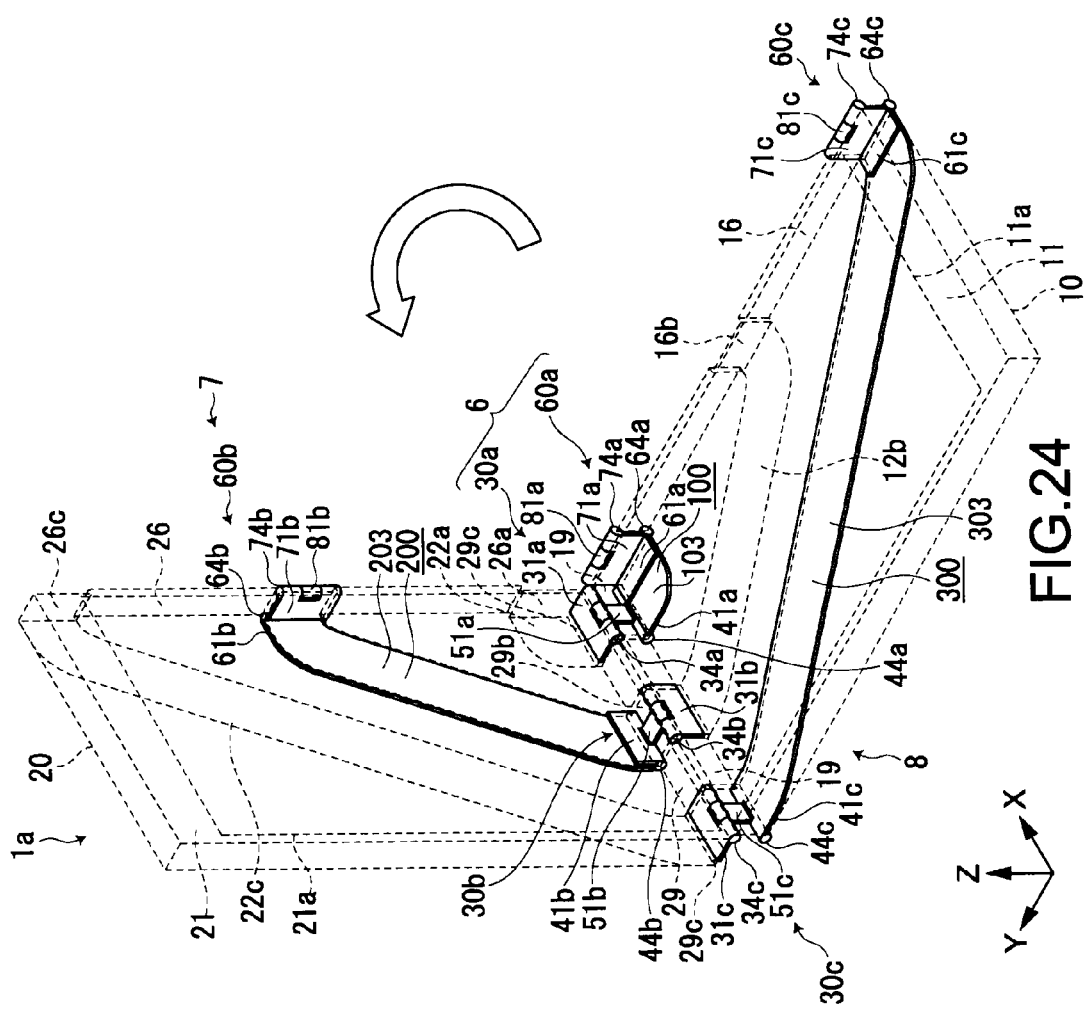
FIG. 24 is a perspective view showing a first connecting apparatus, a second connecting apparatus, and a third connecting apparatus, in a state where the second casing is rotated by +90° with respect to the first casing about the X axis.

FIG. 24 is a perspective view showing the first connecting apparatus 6, the second connecting apparatus 7, and the third connecting apparatus 8, in a state where the second casing 20 is rotated from the 0° rotation state by +90° with respect to the first casing 10 about the X axis (X-axis +90° rotation state).

As shown in FIG. 24, the first rotation shaft 34a of the first hinge plate portion 31a, the fifth rotation shaft 34b of the fifth hinge plate portion 31b, and the ninth rotation shaft 34c of the ninth hinge plate portion 31c are in the coaxial relationship in the X-axis direction. The second casing 20 is capable of being rotated with respect to the first casing 10 about the X axis, specifically, about the first rotation shaft 34a, the fifth rotation shaft 34b, and the ninth rotation shaft 34c as the fulcrum.

In the case where the second casing 20 is rotated with respect to the first casing 10, in the first hinge unit 30a of the first connecting apparatus 6, the first hinge plate portion 31a fixed on the fourth side surface 29 of the second casing 20 is rotated about the X axis, specifically, about the first rotation shaft 34a as the fulcrum. Herein, the first shaft connecting portion 51a keeps in contact with the second side surface 19 of the first casing 10 even though the second casing 20 is rotated with respect to the first casing 10. Further, the first surface 103 of the first hinge connecting portion 100 fixed on the second hinge plate portion 41a connected to the first shaft connecting portion 51a by the second rotation shaft 44a keeps in contact with the second main surface 12 of the first casing 10 even though the second casing 20 is rotated with respect to the first casing 10.

Meanwhile, in the case where the second casing 20 is rotated with respect to the first casing 10, in the third hinge unit 30b of the second connecting apparatus 7, the third shaft connecting portion 51b coming in contact with the fourth side surface 29 of the second casing 20 is rotated about the fifth rotation shaft 34b as the fulcrum. Herein, the second hinge connecting portion 200 fixed on the sixth hinge plate portion 41b connected to the third shaft connecting portion 51b by the sixth rotation shaft 44b is rotated about the fifth rotation shaft 34b as the fulcrum together with the third shaft connecting portion 51b while the first surface 203 keeps in contact with the fourth main surface 22 of the second casing 20.

Meanwhile, in the case where the second casing 20 is rotated with respect to the first casing 10, in the fifth hinge unit 30c of the third connecting apparatus 8, the ninth hinge plate portion 31c fixed on the fourth side surface 29 of the second casing 20 is rotated about the X axis, specifically, about the ninth rotation shaft 34c as the fulcrum. Herein, the fifth shaft connecting portion 51c keeps in contact with the second side surface 19 of the first casing 10 even though the second casing 20 is rotated with respect to the first casing 10. Further, the first surface 303 of the third hinge connecting portion 300 fixed on the tenth hinge plate portion 41c connected to the fifth shaft connecting portion 51c by the tenth rotation shaft 44c keeps in contact with the second main surface 12 of the first casing 10 even though the second casing 20 is rotated with respect to the first casing 10.

As described above, in the rotation processes from 0° to +180° about the X axis, the second casing 20 is rotated about the first rotation shaft 34a, the fifth rotation shaft 34b, and the ninth rotation shaft 34c as the fulcrum.

Figure 25:
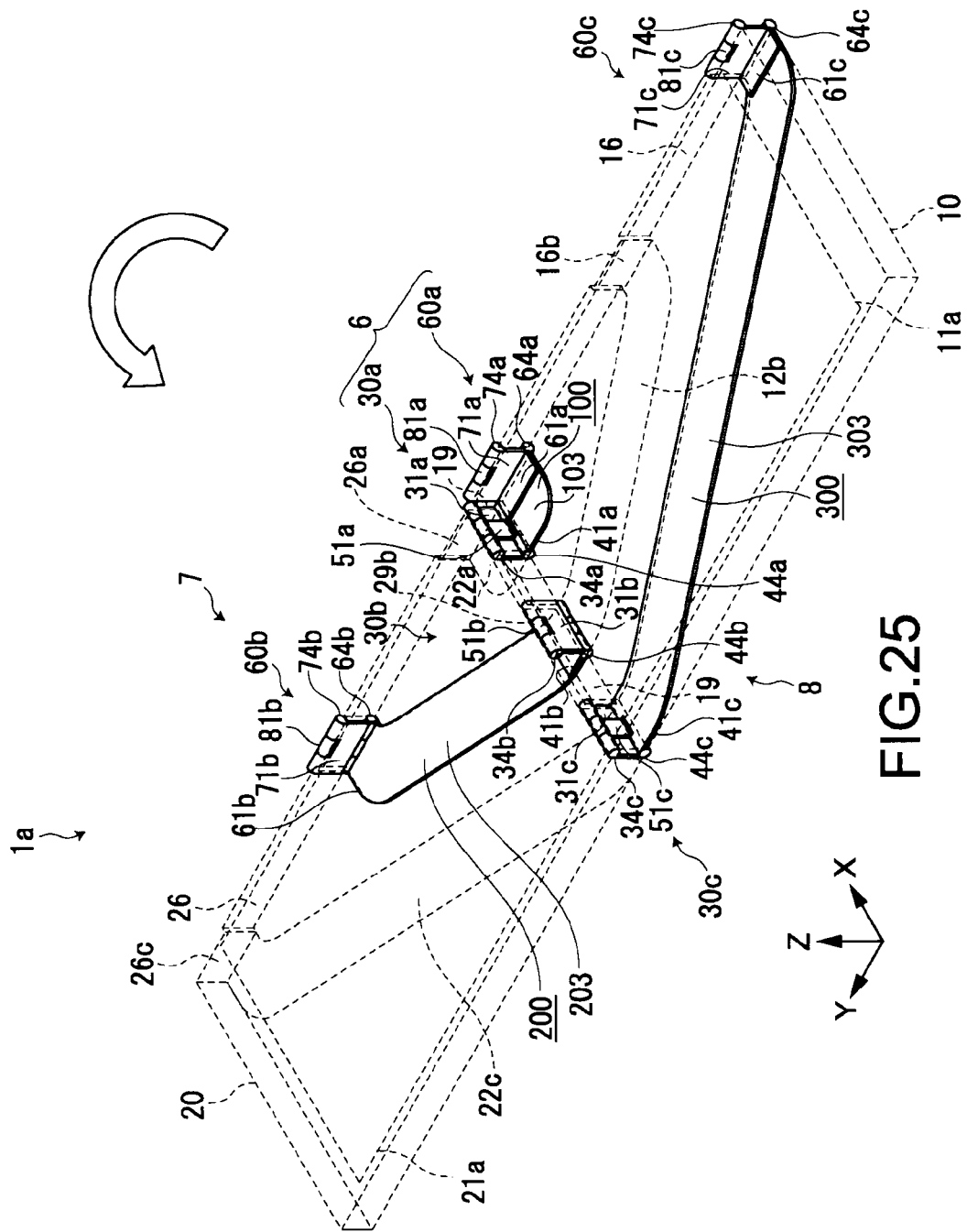
FIG. 25 is a perspective view showing the first connecting apparatus, the second connecting apparatus, and the third connecting apparatus, in a state where the second casing is rotated by +180° with respect to the first casing about the X axis.

FIG. 25 is a perspective view showing the first connecting apparatus 6, the second connecting apparatus 7, and the third connecting apparatus 8, in a state where the second casing 20 is rotated by +180° with respect to the first casing 10 about the X axis (X-axis +180° rotation state).

In the X-axis +180° rotation state, in the first hinge unit 30a of the first connecting apparatus 6, the first hinge plate portion 31a rotated about the X axis, specifically, about the first rotation shaft 34a as the fulcrum comes in contact with the first shaft connecting portion 51a coming in contact with the first casing 10 such that the first hinge plate portion 31a is overlapped with the first shaft connecting portion 51a.

Meanwhile, in the X-axis +180° rotation state, in the second hinge unit 30b of the second connecting apparatus 7, the third hinge plate portion 51b rotated about the X axis, specifically, about the fifth rotation shaft 34b as the fulcrum comes in contact with the fifth hinge plate portion 31b fixed on the first casing 10 such that the third hinge plate portion 51b is overlapped with the fifth hinge plate portion 31b.

Meanwhile, in the X-axis +180° rotation state, in the third hinge unit 30c of the third connecting apparatus 8, the ninth hinge plate portion 31c rotated about the X axis, specifically, about the ninth rotation shaft 34c as the fulcrum comes in contact with the fifth shaft connecting portion 51c coming in contact with the first casing 10 such that the ninth hinge plate portion 31c is overlapped with the fifth shaft connecting portion 51c.

Figure 26:
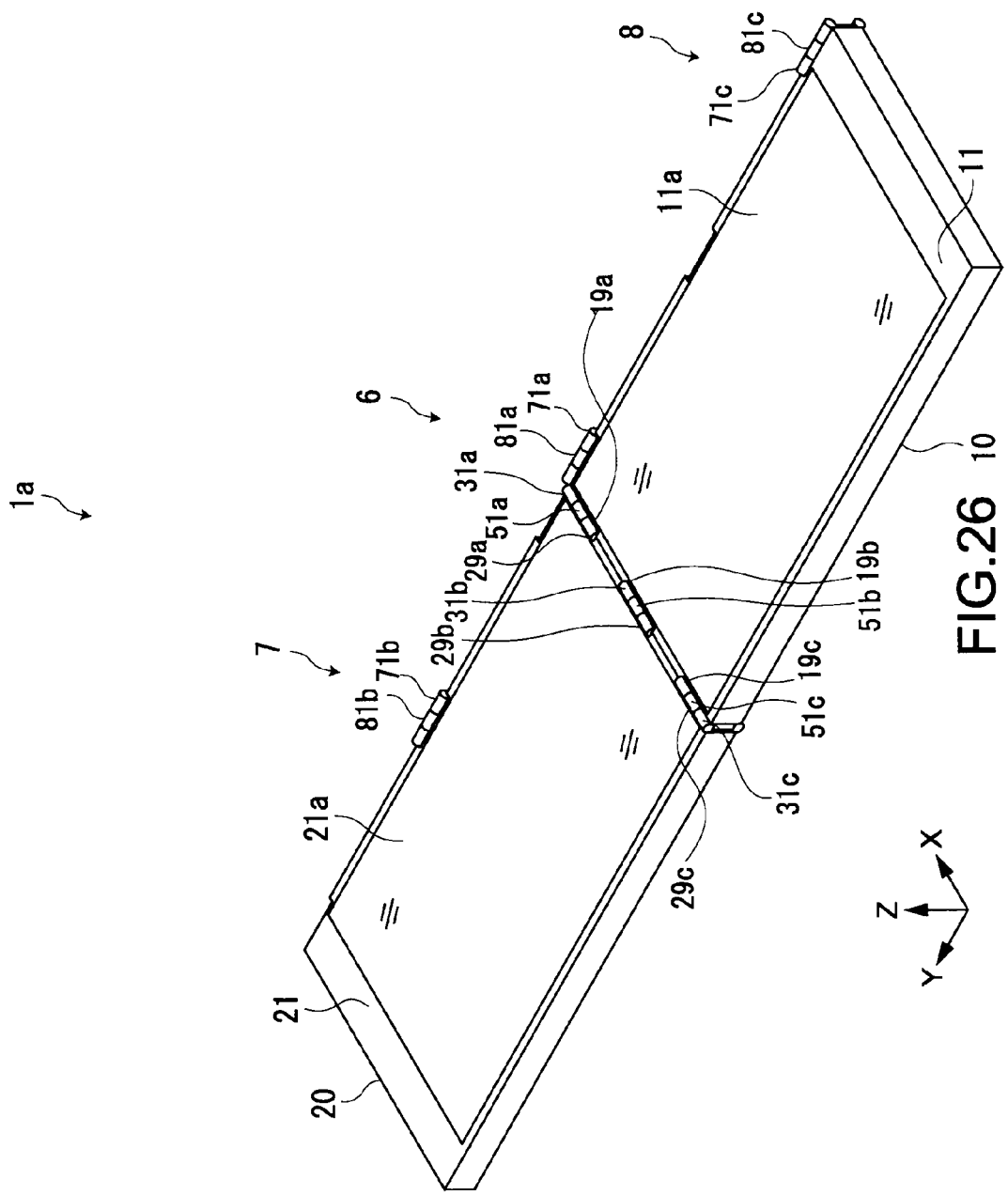
FIG. 26 is a perspective view showing the electronic apparatus in the X-axis +180° rotation state.

FIG. 26 is a perspective view showing the electronic apparatus 1a in the X-axis +180° rotation state.

As shown in FIG. 26, in the state where the second casing 20 is rotated by +180° with respect to the first casing 10 about the X axis, the first main surface 11 of the first casing 10 and the third main surface 21 of the second casing 20 are arranged in parallel and on the same plane.

In this state, the fourth side surface 29 of the second casing 20 comes to be faced with the second side surface 19 of the first casing 10. Herein, in the concave portions 19a, 29a facing with each other, the first hinge plate portion 31a and the first shaft connecting portion 51a overlapped with each other are accommodated. In the concave portions 19b, 29b facing with each other, the fifth hinge plate portion 31b and the third shaft connecting portion 51b overlapped with each other are accommodated. In the concave portions 19c, 29c facing with each other, the ninth hinge plate portion 31c and the fifth shaft connecting portion 51c overlapped with each other are accommodated.

Accordingly, in the X-axis +180° rotation state, the distance between the first casing 10 and the second casing 20 can be made smaller. The distance between the touch sensor panel 11a and the touch sensor panel 21a can thus be made smaller. In this state, the display panels overlapped with the touch sensor panels 11a, 21a may function as one display area.

Figure 27:
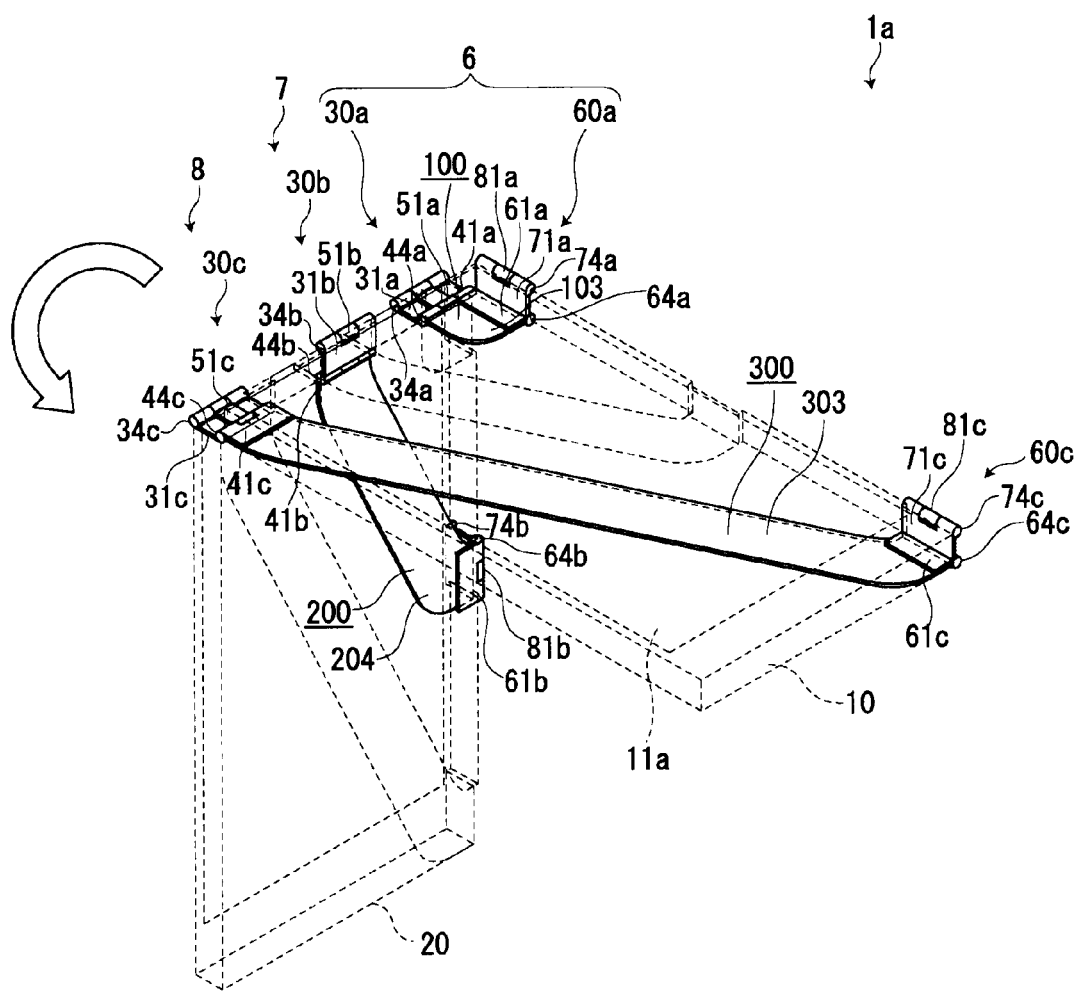
FIG. 27 is a perspective view showing the first connecting apparatus, the second connecting apparatus, and the third connecting apparatus, in a state where the second casing is rotated by +270° with respect to the first casing about the X axis.

FIG. 27 is a perspective view showing the first connecting apparatus 6, the second connecting apparatus 7, and the third connecting apparatus 8, in a state where the second casing 20 is rotated by +270° with respect to the first casing 10 about the X axis (X-axis +270° rotation state).

As shown in FIGS. 25 and 27, the second rotation shaft 44a, the sixth rotation shaft 44b, and the tenth rotation shaft 44c are in the coaxial relationship in the X-axis direction. The second casing 20 is capable of being rotated with respect to the first casing 10 about the second rotation shaft 44a, the sixth rotation shaft 44b, and the tenth rotation shaft 44c as the fulcrum.

That is, while in the rotation from 0° to +180° about the X axis, the first rotation shaft 34a, the fifth rotation shaft 34b, and the ninth rotation shaft 34c serve as the fulcrum of the rotation, in the rotation from +180° to +360° about the X axis, the second rotation shaft 44a, the sixth rotation shaft 44b, and the tenth rotation shaft 44c serve as the fulcrum of the rotation.

In the case where the second casing 20 is rotated with respect to the first casing 10, in the first hinge unit 30a of the first connecting apparatus 6, the first hinge plate portion 31a fixed on the fourth side surface 29 of the second casing 20 is rotated about the X axis, specifically, about the second rotation shaft 44a as the fulcrum. Further, the first shaft connecting portion 51a coming in contact with the first hinge plate portion 31a in the overlapped manner is rotated about the X axis, specifically, about the second rotation shaft 44a together with the first hinge plate portion 31a. Herein, the first surface 103 of the first hinge connecting portion 100 fixed on the second hinge plate portion 41a connected to the first shaft connecting portion 51a by the second rotation shaft 44a keeps in contact with the second main surface 12 of the first casing 10 even though the second casing 20 is rotated with respect to the first casing 10.

Meanwhile, in the case where the second casing 20 is rotated with respect to the first casing 10, in the third hinge unit 30b of the second connecting apparatus 7, the second hinge connecting portion 200 fixed on the sixth hinge plate portion 41b connected to the third shaft connecting portion 51b by the sixth rotation shaft 44b is rotated about the X axis, specifically, about the sixth rotation shaft 44b as the fulcrum while the first surface 203 keeps in contact with the fourth main surface 22 of the second casing 20. Herein, the third shaft connecting portion 51b keeps in contact with the fifth hinge plate portion 31b fixed on the first casing 10 even though the second casing 20 is rotated with respect to the first casing 10.

Meanwhile, in the case where the second casing 20 is rotated with respect to the first casing 10, in the fifth hinge unit 30c of the third connecting apparatus 8, the ninth hinge plate portion 31c fixed on the fourth side surface 29 of the second casing 20 is rotated about the X axis, specifically, about the tenth rotation shaft 44c as the fulcrum. Further, the fifth shaft connecting portion 51c coming in contact with the ninth hinge plate portion 31c in the overlapped manner is rotated about the X axis, specifically, about the tenth rotation shaft 44c together with the ninth hinge plate portion 31c. Herein, the first surface 303 of the third hinge connecting portion 300 fixed on the tenth hinge plate portion 41c connected to the fifth shaft connecting portion 51c by the tenth rotation shaft 44c keeps in contact with the second main surface 12 of the first casing 10 even though the second casing 20 is rotated with respect to the first casing 10.

Figure 28:
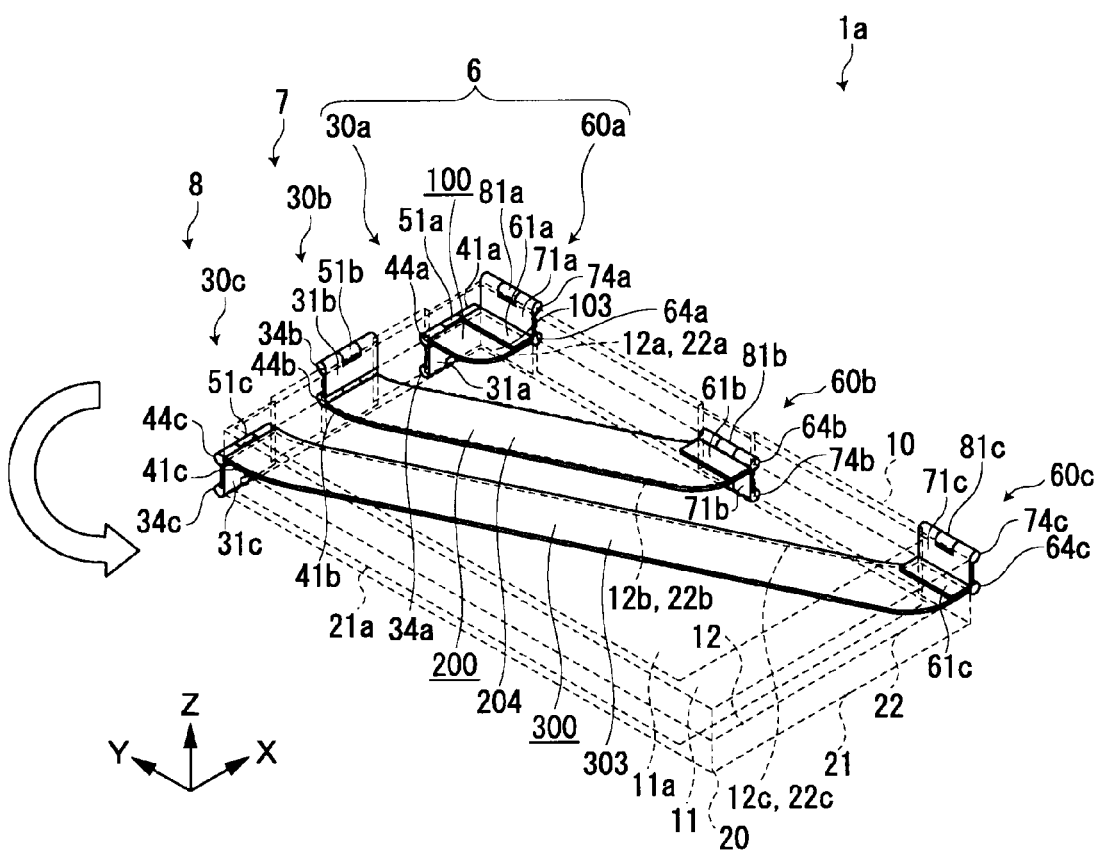
FIG. 28 is a perspective view showing the first connecting apparatus, the second connecting apparatus, and the third connecting apparatus, in a state where the second casing is rotated by +360° with respect to the first casing about the X axis.

FIG. 28 is a perspective view showing the first connecting apparatus 6, the second connecting apparatus 7, and the third connecting apparatus 8, in a state where the second casing 20 is rotated by +360° with respect to the first casing 10 about the X axis (X-axis +360° rotation state).

In the state where the second casing 20 is rotated with respect to the first casing 10 about the X axis by +360°, the fourth main surface 22 of the second casing 20 comes to be overlapped with the second main surface 12 of the first casing 10.

In the X-axis +360° rotation state, in the first hinge unit 30a of the first connecting apparatus 6, the axial center of the first rotation shaft 34a of the first hinge plate portion 31a fixed on the fourth side surface 29 of the second casing 20 is arranged on the plane on the third main surface 21 of the second casing 20. The first shaft connecting portion 51a connected to the first hinge plate portion 31a by the first rotation shaft 34a comes in contact with the first hinge plate portion 31a. The second hinge plate portion 41a connected to the first shaft connecting portion 51a by the second rotation shaft 44a is arranged between the second main surface 12 of the first casing 10 and the fourth main surface 22 of the second casing 20 overlapped with each other in a sandwiched manner. The axial center of the second rotation shaft 44a is arranged on the plane on which the second main surface 12 comes in contact with the fourth main surface 22.

The first hinge connecting portion 100 fixed on the second hinge plate portion 41a is accommodated in the concave portions 12a, 22a such that the first hinge connecting portion 100 is sandwiched between the second main surface 12 of the first casing 10 and the fourth main surface 22 of the second casing 20. The first surface 103 of the first hinge connecting portion 100 keeps in contact with the second main surface 12 of the first casing 10. The second surface 104 being the backside surface of the first surface 103 comes in contact with the fourth main surface 22 of the second casing 20.

The axial center of the third rotation shaft 64a of the third hinge plate portion 61a of the second hinge unit 60a fixed on the first hinge connecting portion 100 is arranged on the plane on which the second main surface 12 of the first casing 10 comes in contact with the fourth main surface 22 of the second casing 20. The second shaft connecting portion 81a connected to the third hinge plate portion 61a by the third rotation shaft 64a comes in contact with the fourth hinge plate portion 71a fixed on the first side surface 16 of the first casing 10. The axial center of the fourth rotation shaft 74a is arranged on the plane on the first main surface 11 of the first casing 10.

Meanwhile, in the X-axis +360° rotation state, in the third hinge unit 30b of the second connecting apparatus 7, the axial center of the fifth rotation shaft 34b of the fifth hinge plate portion 31b fixed on the second side surface 19 of the first casing 10 is arranged on the plane on the first main surface 11 of the first casing 10. The third shaft connecting portion 51b connected to the fifth hinge plate portion 31b by the fifth rotation shaft 34b comes in contact with the fifth hinge plate portion 31b. The sixth hinge plate portion 41b connected to the third shaft connecting portion 51b by the sixth rotation shaft 44b is arranged between the second main surface 12 of the first casing 10 and the fourth main surface 22 of the second casing 20 overlapped with each other in a sandwiched manner. The axial center of the sixth rotation shaft 44b is arranged on the plane on which the second main surface 12 comes in contact with the fourth main surface 22.

The second hinge connecting portion 200 fixed on the sixth hinge plate portion 41b is accommodated in the concave portions 12b, 22b such that the second hinge connecting portion 200 is sandwiched between the second main surface 12 of the first casing 10 and the fourth main surface 22 of the second casing 20. The first surface 203 of the second hinge connecting portion 200 keeps in contact with the fourth main surface 22 of the second casing 20. The second surface 204 being the backside surface of the first surface 203 comes in contact with the second main surface 12 of the first casing 10.

The axial center of the seventh rotation shaft 64b of the seventh hinge plate portion 61b of the fourth hinge unit 60b fixed on the second hinge connecting portion 200 is arranged on the plane on which the second main surface 12 of the first casing 10 comes in contact with the fourth main surface 22 of the second casing 20. The fourth shaft connecting portion 81b connected to the seventh hinge plate portion 61b by the seventh rotation shaft 64b comes in contact with the eighth hinge plate portion 71b fixed on the third side surface 26 of the second casing 20. The axial center of the eighth rotation shaft 74b is arranged on the plane on the third main surface 21 of the second casing 20.

Meanwhile, in the X-axis +360° rotation state, in the fifth hinge unit 30c of the third connecting apparatus 8, the axial center of the ninth rotation shaft 34c of the ninth hinge plate portion 31c fixed on the fourth side surface 29 of the second casing 20 is arranged on the plane on the third main surface 21 of the second casing 20. The fifth shaft connecting portion 51c connected to the ninth hinge plate portion 31c by the ninth rotation shaft 34c comes in contact with the ninth hinge plate portion 31c. The tenth hinge plate portion 41c connected to the fifth shaft connecting portion 51c by the tenth rotation shaft 44c is arranged between the second main surface 12 of the first casing 10 and the fourth main surface 22 of the second casing 20 overlapped with each other in a sandwiched manner. The axial center of the tenth rotation shaft 44c is arranged on the plane on which the second main surface 12 comes in contact with the fourth main surface 22.

The third hinge connecting portion 300 fixed on the tenth hinge plate portion 41c is accommodated in the concave portions 12c, 22c such that the third hinge connecting portion 300 is sandwiched between the second main surface 12 of the first casing 10 and the fourth main surface 22 of the second casing 20. The first surface 303 of the third hinge connecting portion 300 keeps in contact with the second main surface 12 of the first casing 10. The second surface 304 being the backside surface of the first surface 303 comes in contact with the fourth main surface 22 of the second casing 20.

The axial center of the eleventh rotation shaft 64c of the eleventh hinge plate portion 61c of the sixth hinge unit 60c fixed on the third hinge connecting portion 300 is arranged on the plane on which the second main surface 12 of the first casing 10 comes in contact with the fourth main surface 22 of the second casing 20. The sixth shaft connecting portion 81c connected to the eleventh hinge plate portion 61c by the eleventh rotation shaft 64c comes in contact with the twelfth hinge plate portion 71c fixed on the first side surface 16 of the first casing 10. The axial center of the twelfth rotation shaft 74c is arranged on the plane on the first main surface 11 of the first casing 10.

In this state, the second rotation shaft 44a, the sixth rotation shaft 44b, and the tenth rotation shaft 44c are coaxially arranged in the X-axis direction. The third rotation shaft 64a, the seventh rotation shaft 64b, and the eleventh rotation shaft 64c are coaxially arranged in the Y-axis direction. Further, the axial centers of these rotation shafts are arranged on the plane on which the second main surface 12 comes in contact with the fourth main surface 22. That is, the second, sixth and tenth rotation shafts 44a, 44b, 44c, and the third, seventh, and eleventh rotation shafts 64a, 64b, 64c are arranged on the same plane and in the orthogonal manner.

Further, in the case where the second main surface 12 of the first casing 10 comes in contact with the fourth main surface 22 of the second casing 20, the first hinge connecting portion 100 is accommodated in the concave portions 12a, 22a facing with each other. The second hinge connecting portion 200 is accommodated in the concave portions 12b, 22b facing with each other. The third hinge connecting portion 300 is accommodated in the concave portions 12c, 22c facing with each other.

Accordingly, in the state where the first, second, and third hinge connecting portions 100, 200, 300 are arranged between the first casing 10 and the second casing 20, the second main surface 12 comes in contact with the fourth main surface 22. The electronic apparatus 1a is thus secured and the design thereof is improved.

(Operations of Connecting Apparatuses when Casing of Electronic Apparatus is Rotated about Y Axis)

As shown in FIG. 28, in the electronic apparatus 1a, the second main surface 12 of the first casing 10 is overlapped with the fourth main surface 22 of the second casing 20. Operations of the first connecting apparatus 6, the second connecting apparatus 7, and the third connecting apparatus 8 in the case where the second casing 20 is rotated from the state where the first casing 10 is overlapped with the second casing 20 (0° rotation state) with respect to the first casing 10 about the Y axis will be described.

Figure 29:
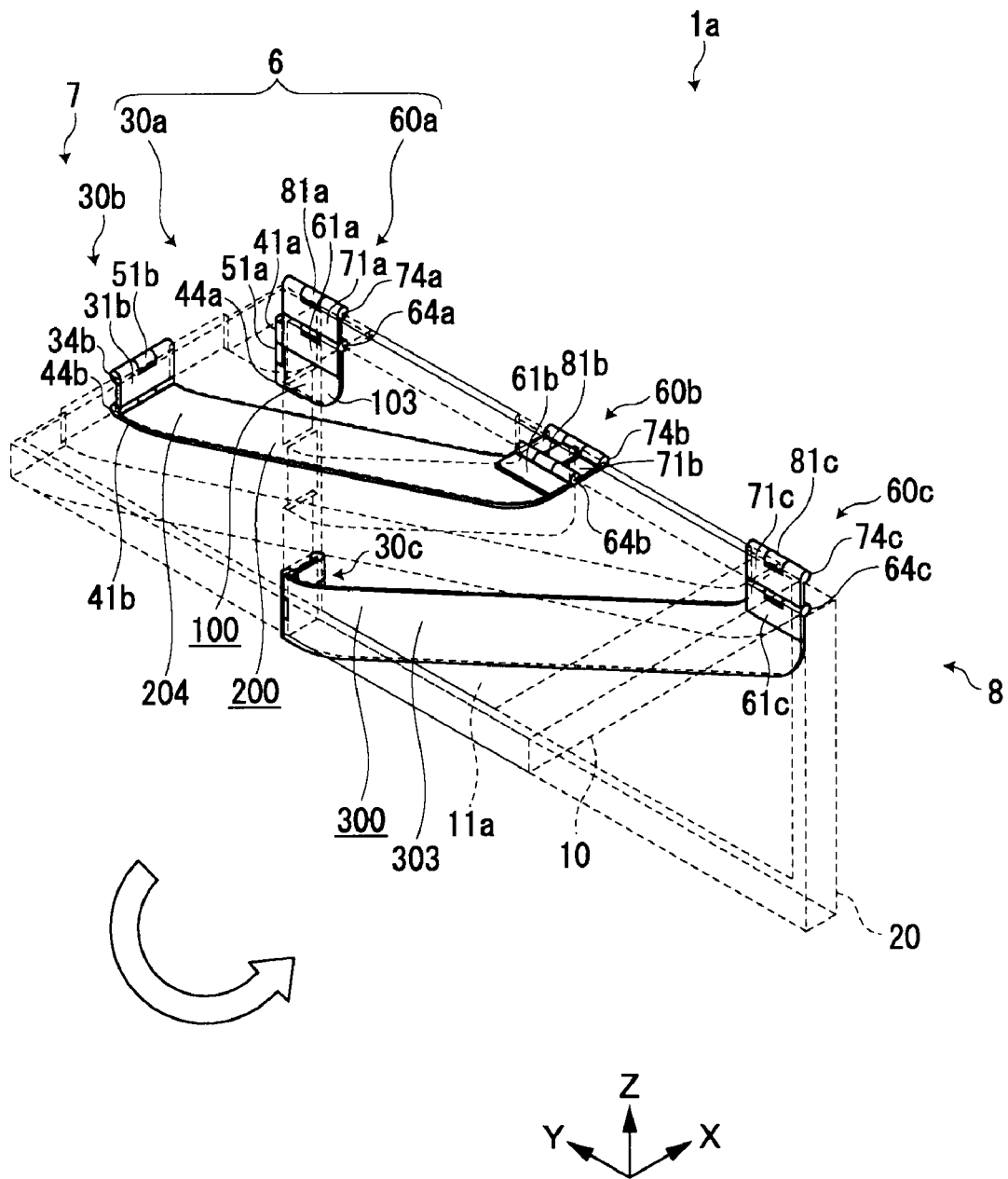
FIG. 29 is a perspective view showing the first connecting apparatus, the second connecting apparatus, and the third connecting apparatus, in a state where the second casing is rotated by +90° with respect to the first casing about the Y axis.

FIG. 29 is a perspective view showing the first connecting apparatus 6, the second connecting apparatus 7, and the third connecting apparatus 8, in a state where the second casing 20 is rotated from the 0° rotation state by +90° with respect to the first casing 10 about the Y axis (Y-axis +90° rotation state).

As shown in FIG. 28, the third rotation shaft 64a of the third hinge plate portion 61a, the seventh rotation shaft 64b of the seventh hinge plate portion 61b, and the eleventh rotation shaft 64c of the eleventh hinge plate portion 61c are in the coaxial relationship in the Y-axis direction. The second casing 20 is capable of being rotated with respect to the first casing 10 about the Y axis, specifically, about the third rotation shaft 64a, the seventh rotation shaft 64b, and the eleventh rotation shaft 64c as the fulcrum.

In the case where the second casing 20 is rotated with respect to the first casing 10, in the second hinge unit 60a of the first connecting apparatus 6, the first hinge connecting portion 100 having the second surface 104 coming in contact with the fourth main surface 22 of the second casing 20 and the third hinge plate portion 61a fixed on the first hinge connecting portion 100 are rotated about the Y axis, specifically, about the third rotation shaft 64a as the fulcrum. Herein, the second shaft connecting portion 81a keeps in contact with the fourth hinge plate portion 71a fixed on the first side surface 16 of the first casing 10 even though the second casing 20 is rotated with respect to the first casing 10.

In the case where the second casing 20 is rotated with respect to the first casing 10, in the fourth hinge unit 60b of the second connecting apparatus 7, the eighth hinge plate portion 71b fixed on the third side surface 26 of the second casing 20 is rotated about the Y axis, specifically, about the seventh rotation shaft 64b as the fulcrum. Herein, the fourth shaft connecting portion 81b coming in contact with the eighth hinge plate portion 71b in the overlapped manner is rotated about the Y axis, specifically, about the seventh rotation shaft 64b as the fulcrum together with the eighth hinge plate portion 71b. Meanwhile, the second surface 204 of the second hinge connecting portion 200 fixed on the seventh hinge plate portion 61b connected to the fourth shaft connecting portion 81b by the seventh rotation shaft 64b keeps in contact with the second main surface 12 of the first casing 10 even though the second casing 20 is rotated with respect to the first casing 10.

In the case where the second casing 20 is rotated with respect to the first casing 10, in the sixth hinge unit 60c of the third connecting apparatus 8, the third hinge connecting portion 300 having the second surface 304 coming in contact with the fourth main surface 22 of the second casing 20 and the eleventh hinge plate portion 61c fixed on the third hinge connecting portion 300 are rotated about the Y axis, specifically, about the eleventh rotation shaft 64c as the fulcrum. Herein, the sixth shaft connecting portion 81c keeps in contact with the twelfth hinge plate portion 71c fixed on the first side surface 16 of the first casing 10 even though the second casing 20 is rotated with respect to the first casing 10.

As described above, in the rotation processes from 0° to +180° about the Y axis, the second casing 20 is rotated about the third rotation shaft 64a, the seventh rotation shaft 64b, and the eleventh rotation shaft 64c as the fulcrum.

In the first hinge connecting portion 100, in the above-mentioned rotation processes about the X axis, the first surface 103 comes in contact with the second main surface 12 of the first casing 10, and the second surface 104 is exposed. However, in the rotation processes about the Y axis, the second surface 104 comes in contact with the fourth main surface 22 of the second casing 20, and the first surface 103 is exposed.

In the second hinge connecting portion 200, in the rotation processes about the X axis, the first surface 203 comes in contact with the fourth main surface 22 of the second casing 20, and the second surface 204 is exposed. However, in the rotation processes about the Y axis, the second surface 204 comes in contact with the second main surface 12 of the first casing 10, and the first surface 203 is exposed.

In the third hinge connecting portion 300, in the rotation processes about the X axis, the first surface 303 comes in contact with the second main surface 12 of the first casing 10, and the second surface 304 is exposed. However, in the rotation processes about the Y axis, the second surface 304 comes in contact with the fourth main surface 22 of the second casing 20, and the first surface 303 is exposed.

Figure 30:
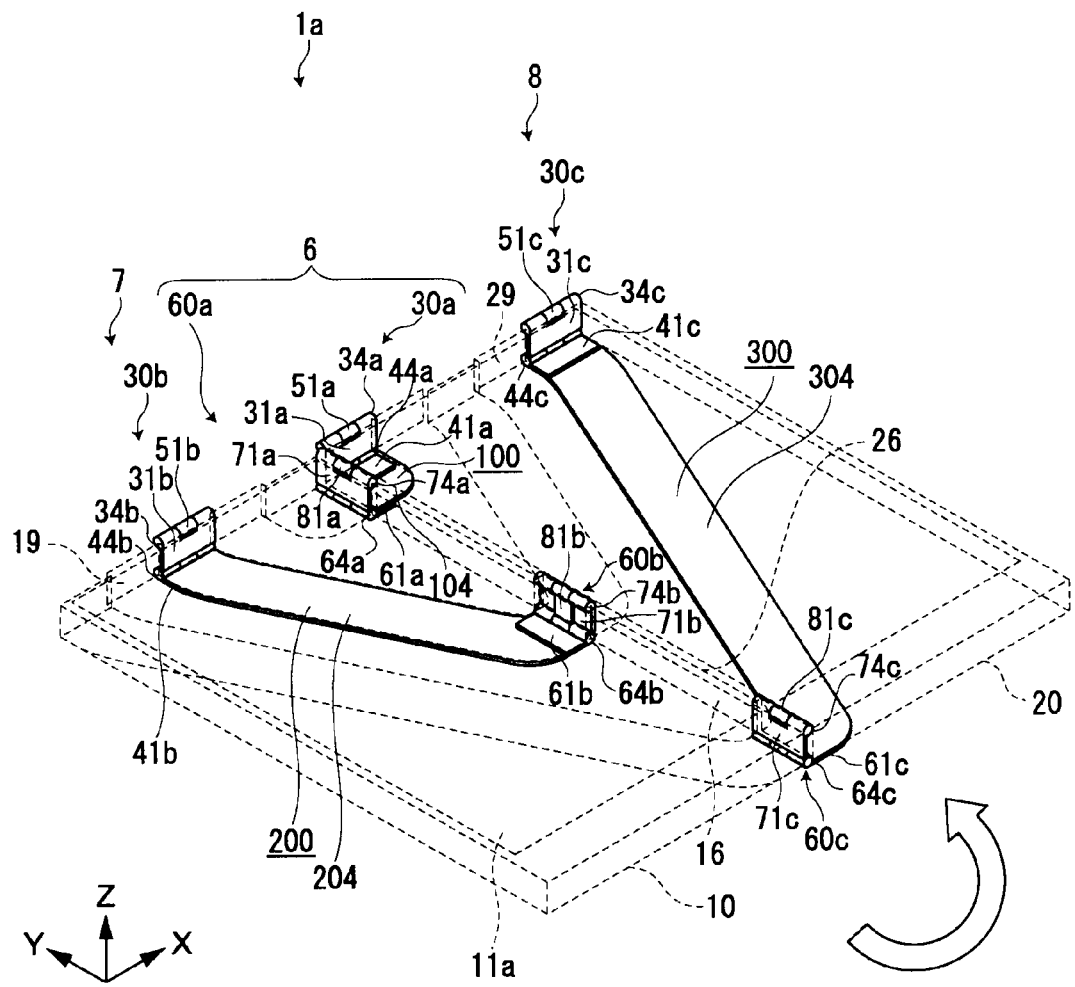
FIG. 30 is a perspective view showing the first connecting apparatus, the second connecting apparatus, and the third connecting apparatus, in a state where the second casing is rotated by +180° with respect to the first casing about the Y axis.

FIG. 30 is a perspective view showing the first connecting apparatus 6, the second connecting apparatus 7, and the third connecting apparatus 8, in a state where the second casing 20 is rotated by +180° with respect to the first casing 10 about the Y axis (Y-axis +180° rotation state).

In the Y-axis +180° rotation state, in the first connecting apparatus 6, the third side surface 26 of the second casing 20 comes in contact with the fourth hinge plate portion 71a fixed on the first side surface 16 of the first casing 10 and the second shaft connecting portion 81a coming in contact with the fourth hinge plate portion 71a such that the third side surface 26 is overlapped with the fourth hinge plate portion 71a and the second shaft connecting portion 81a. Accordingly, one surface of the second shaft connecting portion 81a comes in contact with the third side surface 26 of the second casing 20 while the other surface keeps in contact with the fourth hinge plate portion 71a.

Meanwhile, in the Y-axis +180° rotation state, in the second connecting apparatus 7, the eighth hinge plate portion 71b fixed on the third side surface 26 of the second casing 20 and the fourth shaft connecting portion 81b coming in contact with the eighth hinge plate portion 71b in an overlapped manner come in contact with the first side surface 16 of the first casing 10. Accordingly, one surface of the fourth shaft connecting portion 81b comes in contact with the first side surface 16 of the first casing 10 while the other surface keeps in contact with the eighth hinge plate portion 71b.

Meanwhile, in the Y-axis +180° rotation state, in the third connecting apparatus 8, the third side surface 26 of the second casing 20 comes in contact with the twelfth hinge plate portion 71c fixed on the first side surface 16 of the first casing 10 and the sixth shaft connecting portion 81c coming in contact with the twelfth hinge plate portion 71c such that the third side surface 26 is overlapped with the twelfth hinge plate portion 71c and the sixth shaft connecting portion 81c. Accordingly, one surface of the sixth shaft connecting portion 81c comes in contact with the third side surface 26 of the second casing 20 while the other surface keeps in contact with the twelfth hinge plate portion 71c.

In this state, the third rotation shaft 64a, the seventh rotation shaft 64b, and the eleventh rotation shaft 64c are coaxially arranged in the Y-axis direction. Meanwhile, the fourth rotation shaft 74a, the eighth rotation shaft 74b, and the twelfth rotation shaft 74c are coaxially arranged in the Y-axis direction.

Figure 31:
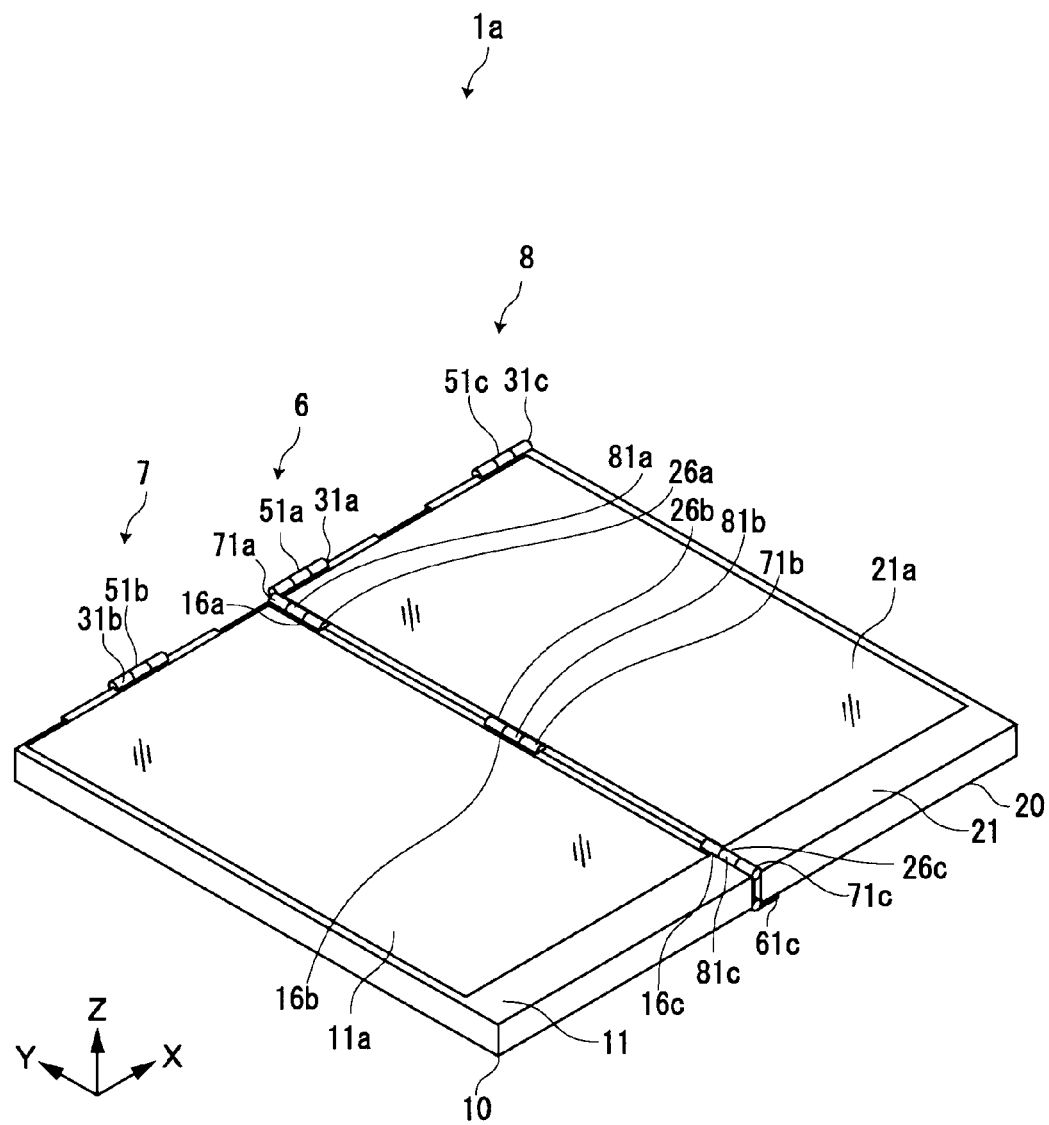
FIG. 31 is a perspective view showing the electronic apparatus in the Y-axis +180° rotation state.

FIG. 31 is a perspective view showing the electronic apparatus 1a in the Y-axis +180° rotation state.

As shown in FIG. 31, in the state where the second casing 20 is rotated by +180° with respect to the first casing 10 about the Y axis, the first main surface 11 of the first casing 10 and the third main surface 21 of the second casing 20 are arranged in parallel and on the same plane.

In this state, the third side surface 26 of the second casing 20 comes to be faced with the first side surface 16 of the first casing 10. Herein, in the concave portions 16a, 26a facing with each other, the fourth hinge plate portion 71a and the second shaft connecting portion 81a overlapped with each other are accommodated. In the concave portions 16b, 26b facing with each other, the eighth hinge plate portion 71b and the fourth shaft connecting portion 81b overlapped with each other are accommodated. In the concave portions 16c, 26c facing with each other, the twelfth hinge plate portion 71c and the sixth shaft connecting portion 81c overlapped with each other are accommodated.

Accordingly, in the Y-axis +180° rotation state, the distance between the first casing 10 and the second casing 20 can be made smaller. The distance between the touch sensor panel 11a and the touch sensor panel 21a can thus be made smaller. In this state, the display panels overlapped with the touch sensor panels 11a, 21a may function as one display area.

Figure 32:
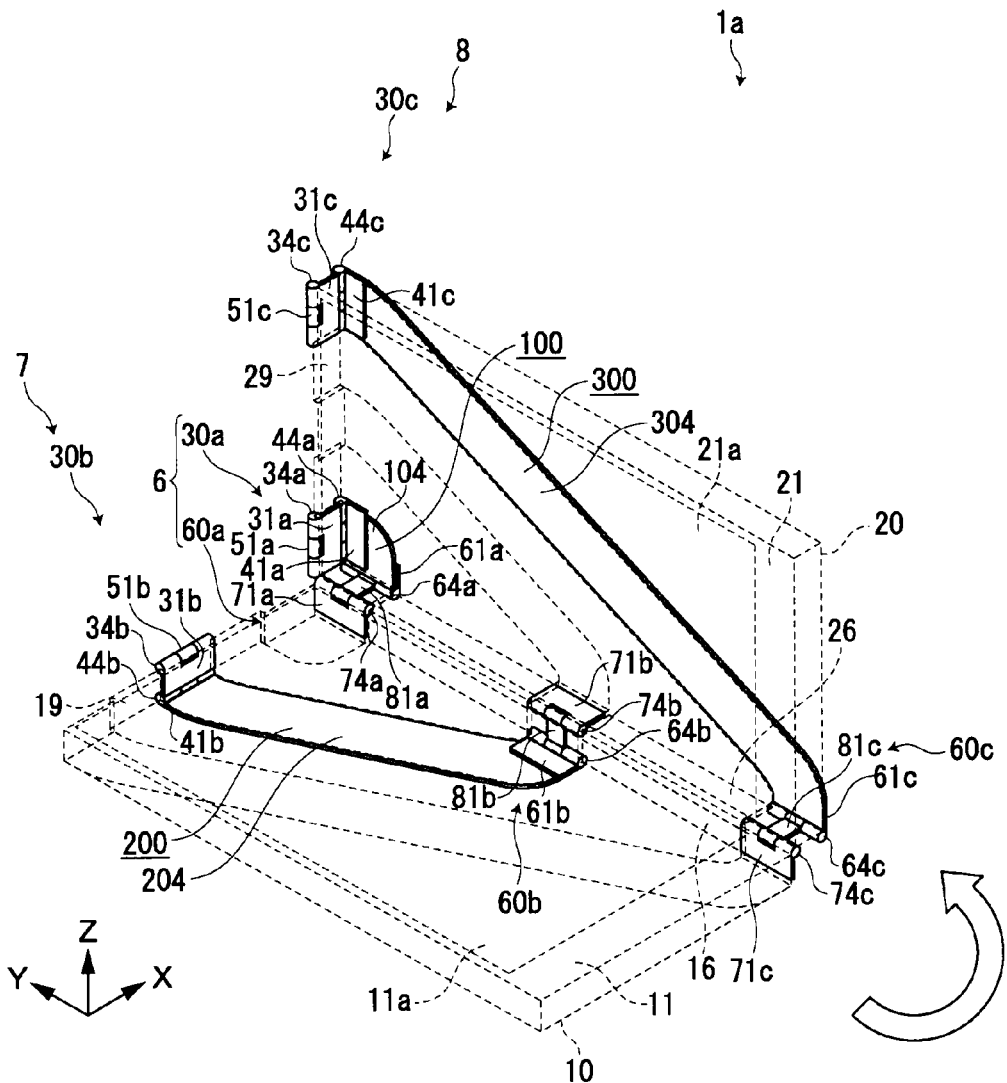
FIG. 32 is a perspective view showing the first connecting apparatus, the second connecting apparatus, and the third connecting apparatus, in a state where the second casing is rotated by +270° with respect to the first casing about the Y axis.

FIG. 32 is a perspective view showing the first connecting apparatus 6, the second connecting apparatus 7, and the third connecting apparatus 8, in a state where the second casing 20 is rotated by +270° with respect to the first casing 10 about the Y axis (Y-axis +270° rotation state).

While in the rotation from 0° to +180° about the Y axis, the third rotation shaft 64a, the seventh rotation shaft 64b, and the eleventh rotation shaft 64c serve as the fulcrum of the rotation, in the rotation from +180° to +360° about the Y axis, the fourth rotation shaft 74a, the eighth rotation shaft 74b, and the twelfth rotation shaft 74c serve as the fulcrum of the rotation.

In the case where the second casing 20 is rotated with respect to the first casing 10, in the second hinge unit 60a of the first connecting apparatus 6, the second shaft connecting portion 81a coming in contact with the third side surface 26 of the second casing 20 is rotated about the Y axis, specifically, about the fourth rotation shaft 74a as the fulcrum. Herein, the first hinge connecting portion 100 fixed on the third hinge plate portion 61a connected to the second shaft connecting portion 81a by the third rotation shaft 64a is rotated about the Y axis, specifically, about the fourth rotation shaft 74a as the fulcrum together with the second shaft connecting portion 81a while the second surface 104 keeps in contact with the fourth main surface 22 of the second casing 20.

Meanwhile, in the case where the second casing 20 is rotated with respect to the first casing 10, in the fourth hinge unit 60b of the second connecting apparatus 7, the eighth hinge plate portion 71b fixed on the third side surface 26 of the second casing 20 is rotated about the Y axis, specifically, about the eighth rotation shaft 74b as the fulcrum. Herein, the fourth shaft connecting portion 81b keeps in contact with the first side surface 16 of the first casing 10 even though the second casing 20 is rotated with respect to the first casing 10. Further, the second surface 204 of the second hinge connecting portion 200 fixed on the seventh hinge plate portion 61b connected to the fourth shaft connecting portion 81b by the seventh rotation shaft 64b keeps in contact with the second main surface 12 of the first casing 10 even though the second casing 20 is rotated with respect to the first casing 10.

In the case where the second casing 20 is rotated with respect to the first casing 10, in the sixth hinge unit 60c of the third connecting apparatus 8, the sixth shaft connecting portion 81c coming in contact with the third side surface 26 of the second casing 20 is rotated about the Y axis, specifically, about the twelfth rotation shaft 74c as the fulcrum. Herein, the third hinge connecting portion 300 fixed on the eleventh hinge plate portion 61c connected to the sixth shaft connecting portion 81c by the eleventh rotation shaft 64c is rotated about the Y axis, specifically, about the twelfth rotation shaft 74c as the fulcrum together with the sixth shaft connecting portion 81c while the second surface 304 keeps in contact with the fourth main surface 22 of the second casing 20.

Figure 33:
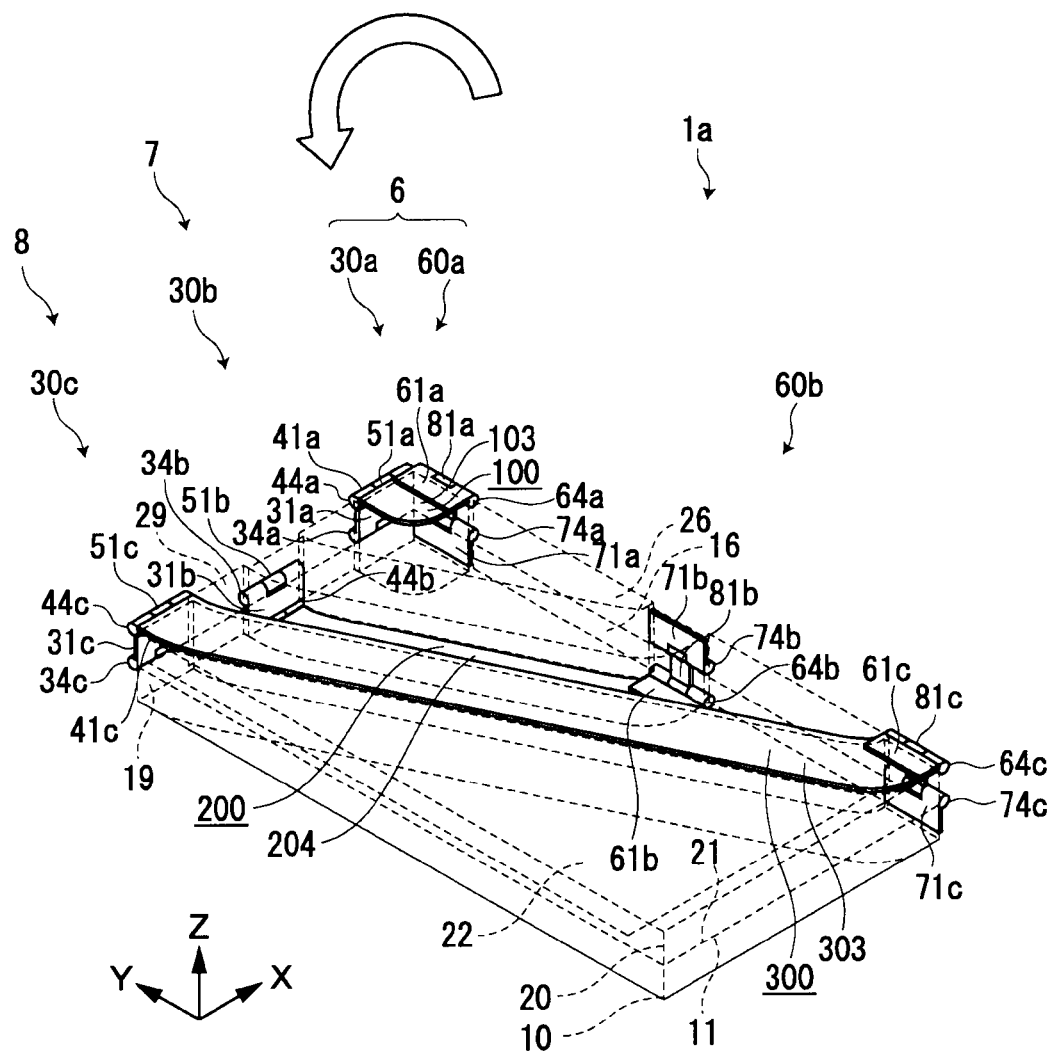
FIG. 33 is a perspective view showing the first connecting apparatus, the second connecting apparatus, and the third connecting apparatus, in a state where the second casing is rotated by +360° with respect to the first casing about the Y axis.

FIG. 33 is a perspective view showing the first connecting apparatus 6, the second connecting apparatus 7, and the third connecting apparatus 8, in a state where the second casing 20 is rotated by +360° with respect to the first casing 10 about the Y axis (Y-axis +360° rotation state).

In the state where the second casing 20 is rotated with respect to the first casing 10 about the Y axis by +360°, the third main surface 21 of the second casing 20 comes to be overlapped with the first main surface 11 of the first casing 10.

In the rotation processes about the X axis and the Y axis, the operations of the first connecting apparatus 6, the second connecting apparatus 7, and the third connecting apparatus 8 in the case where the second casing 20 is rotated with respect to the first casing 10, the position of the first casing 10 being not changed, have been described.

In the first hinge connecting portion 100, in the 0° rotation state, the first surface 103 comes in contact with the second main surface 12 of the first casing 10 and the second surface 104 is exposed. Then, after the second casing 20 is rotated about the X axis by 360° and further rotated about the Y axis by 360°, the second surface 104 comes in contact with the fourth main surface 22 of the second casing 20 and the first surface 103 is exposed.

In the second hinge connecting portion 200, in the 0° rotation state, the first surface 203 comes in contact with the fourth main surface 22 of the second casing 20 and the second surface 204 is exposed. Then, after the second casing 20 is rotated about the X axis by 360° and further rotated about the Y axis by 360°, the second surface 204 comes in contact with the second main surface 12 of the first casing 10 and the first surface 203 is exposed.

In the third hinge connecting portion 300, in the 0° rotation state, the first surface 303 comes in contact with the second main surface 12 of the first casing 10 and the second surface 304 is exposed. Then, after the second casing 20 is rotated about the X axis by 360° and further rotated about the Y axis by 360°, the second surface 304 comes in contact with the fourth main surface 22 of the second casing 20 and the first surface 303 is exposed.

According to this embodiment, the first casing 10 and the second casing 20 are capable of being rotated relatively about the X axis by 360°, the first, fifth, and ninth rotation shafts 34a, 34b, 34c being the fulcrum of the rotation from 0° to +180° about the X axis, and the second, sixth, and tenth rotation shafts 44a, 44b, 44c being the fulcrum of the rotation from +180° to +360° about the X axis. Further, the first casing 10 and the second casing 20 are capable of being rotated relatively about the Y axis by 360°, the third, seventh, and eleventh rotation shafts 64a, 64b, 64c being the fulcrum of the rotation from 0° to +180° about the Y axis, and the fourth, eighth, and twelfth rotation shafts 74a, 74b, 74c being the fulcrum of the rotation from +180° to +360° about the Y axis.

Note that by rotating the second casing 20 in the Y-axis +360° rotation state (see FIG. 33), the second casing 20 having been rotated about the X axis by 360° and further rotated about the Y axis by 360°, with respect to the first casing 10 in the − direction opposite to the opening direction, the second casing 20 is capable of being returned to the original 0° rotation state.

Herein, predetermined colors or patterns are applied on the first surface 103 of the first hinge connecting portion 100 (hereinafter referred to as "coloration A"). The coloration A is applied on the portion (concave portion 12a) of the second main surface 12 of the first casing 10 with which the first surface 103 comes in contact. Predetermined colors or patterns different from the coloration A are applied on the second surface 104 of the first hinge connecting portion 100 (hereinafter referred to as "coloration B"). The coloration B is applied on the portion (concave portion 22a) of the fourth main surface 22 of the second casing 20 with which the second surface 104 comes in contact.

Meanwhile, the coloration B is applied on the first surface 203 of the second hinge connecting portion 200. The coloration B is applied on the portion (concave portion 22b) of the fourth main surface 22 of the second casing 20 with which the first surface 203 comes in contact. The coloration A is applied on the second surface 204 of the second hinge connecting portion 200. The coloration A is applied on the portion (concave portion 12b) of the second main surface 12 of the first casing 10 with which the second surface 204 comes in contact.

Meanwhile, the coloration A is applied on the first surface 303 of the third hinge connecting portion 300. The coloration A is applied on the portion (concave portion 12c) of the second main surface 12 of the first casing 10 with which the first surface 303 comes in contact. The coloration B is applied on the second surface 304 of the third hinge connecting portion 300. The coloration B is applied on the portion (concave portion 22c) of the fourth main surface 22 of the second casing 20 with which the second surface 304 comes in contact.

In the two-toned electronic apparatus 1a as described above, in the rotation processes about the X axis, the portions of the coloration A come in contact with each other in the overlapped manner, and the portions of the coloration B are exposed. Meanwhile, in the rotation processes about the Y axis, the portions of the coloration B come in contact with each other in the overlapped manner, and the portions of the coloration A are exposed. The design of the electronic apparatus 1a is thus improved.

In this embodiment, the circuit board accommodated in the first casing 10 and the circuit board accommodated in the second casing 20 may be electrically connected using the wiring of the first example as described above.

In the wiring of the first example, a notch surface having an opening is provided on the corner portion of the first casing 10 on which the rotation shafts in the X-axis direction and the Y-axis direction cross with each other, and a notch surface having an opening is provided on the corner portion of the second casing 20 on which the rotation shafts in the X-axis direction and the Y-axis direction cross with each other. That is, on each corner portion in the vicinity of the first connecting apparatus 6, the notch having an opening is provided. The circuit board accommodated in the first casing 10 and the circuit board accommodated in the second casing 20 are electrically connected through the openings. By providing openings on the corner portions on which the rotation shafts in the X-axis direction and the Y-axis direction cross with each other, both in the rotation processes about the X axis and the rotation processes about the Y axis, the circuit boards in the casings can be electrically connected irrespective of the positional relationship of the first casing 10 and the second casing 20.

According to this embodiment, three connecting apparatuses, that is, the first connecting apparatus 6, the second connecting apparatus 7, and the third connecting apparatus 8 are used, but not limited to the above. As described above, in the rotation processes of the second casing 20 about the X axis and the Y axis, the members of the first connecting apparatus 6 have the same functions as those of the members of the third connecting apparatus 8. Accordingly, by only using two connecting apparatuses, that is, the first connecting apparatus 6 and the second connecting apparatus 7 or the second connecting apparatus 7 and the third connecting apparatus 8, the second casing 20 can be rotated about the X axis and the Y axis in the above-mentioned manner. However, by using the three connecting apparatuses, the connection of the first casing 10 and the second casing 20 is made stronger compared to the case where the two connecting apparatuses are used. In this effect, in addition to the first connecting apparatus 6, the second connecting apparatus 7, and the third connecting apparatus 8, another connecting apparatus having the effects same as those of the second connecting apparatus 7 may further be provided.

MODIFIED EXAMPLE

First Modified Example

Next, electronic apparatuses according to modified examples of the embodiments will be described.

Figure 35:
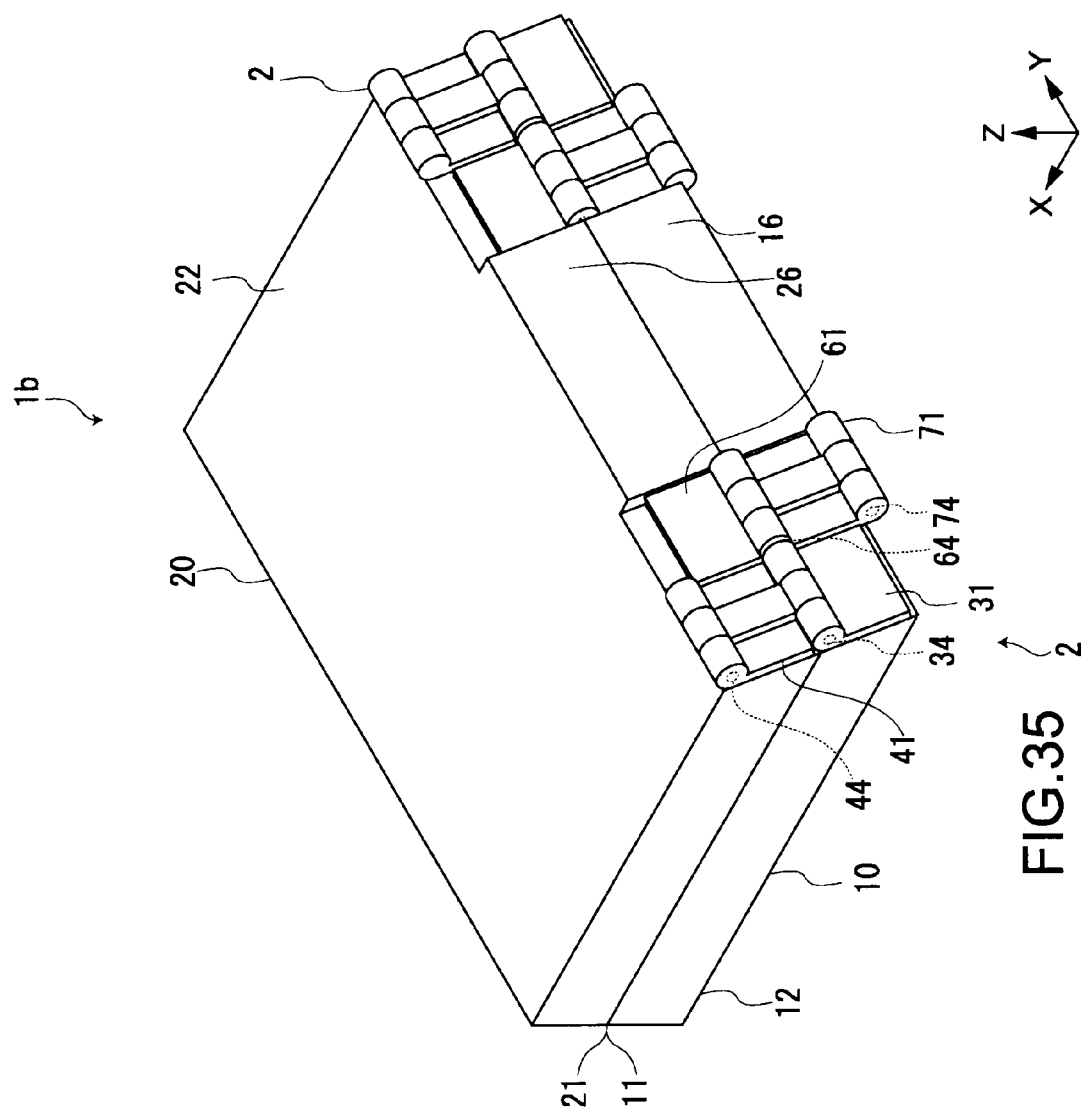
FIG. 35 is a perspective view showing an electronic apparatus in the 0° rotation state according to a modified example of the electronic apparatus of the first embodiment.

FIG. 35 is a perspective view showing an electronic apparatus 1b in the 0° rotation state according to a modified example of the electronic apparatus 1 of the first embodiment.

Note that, in the following drawings, for easier understandings, the electronic apparatus is changed from the actual shape. For example, the size of the casings, the scale ratio of the connection apparatuses with respect to the casings, and the like are changed.

In the electronic apparatus 1b of this modified example, the thickness of the first casing 10 in the Z-axis direction is the same as the thickness of the second casing 20 in the Z-axis direction. In the first casing 10, the first side surface 16 on which the connecting apparatuses 2 are fixed is inclined with respect to the direction orthogonal to the main surfaces 11, 12. Specifically, the first side surface 16 is inclined such that the angle between the first side surface 16 and the first main surface 11 is obtuse, and the angle between the first side surface 16 and the second main surface 12 is acute. In the second casing 20, the third side surface 26 on which the connecting apparatuses 2 are fixed is inclined with respect to the main surfaces 21, 22 by the angle same as the inclination of the first side surface 16. Specifically, the third side surface 26 is inclined such that the angle between the third side surface 26 and the third main surface 21 is acute, and the angle between the third side surface 26 and the fourth main surface 22 is obtuse. Accordingly, the distance of the sides of the first side surface 16 of the first casing 10 facing in the Z-axis direction is same as the distance of the sides of the third side surface 26 of the second casing 20 facing in the Z-axis direction.

The first casing 10 and the second casing 20 thus structured in the state where the first main surface 11 is overlapped with the third main surface 21 are connected by the connecting apparatuses 2, 2 such that the first casing 10 and the second casing 20 are capable of being rotated relatively. In the 0° rotation state, the first side surface 16 and the third side surface 26 are arranged such that they are on the same plane. In the connecting apparatus 2, the first rotation shaft 34 of the first hinge plate portion 31 and the third rotation shaft 64 of the third hinge plate portion 61 are in the coaxial relationship and are on the plane on which the third main surface 21 of the second casing 20 is overlapped with the first main surface 11 of the first casing 10. Accordingly, the second casing 20 is capable of being rotated with respect to the first casing 10 about the first rotation shaft 34 and the third rotation shaft 64. Further, the axial center of the second rotation shaft 44 of the second hinge plate portion 41 is arranged on the plane on the fourth main surface 22 of the second casing 20, and the axial center of the fourth rotation shaft 74 of the fourth hinge plate portion 71 is arranged on the plane on the second main surface 12 of the first casing 10. Accordingly, similar to the first embodiment, the second casing 20 is capable of being rotated with respect to the first casing 10 about, in the rotation from 0° to +180°, the first rotation shaft 34 and the third rotation shaft 64 as the fulcrum of the rotation, and in the rotation from +180° to +360°, the second rotation shaft 44 and the fourth rotation shaft 74 as the fulcrum of the rotation.

Figure 36:
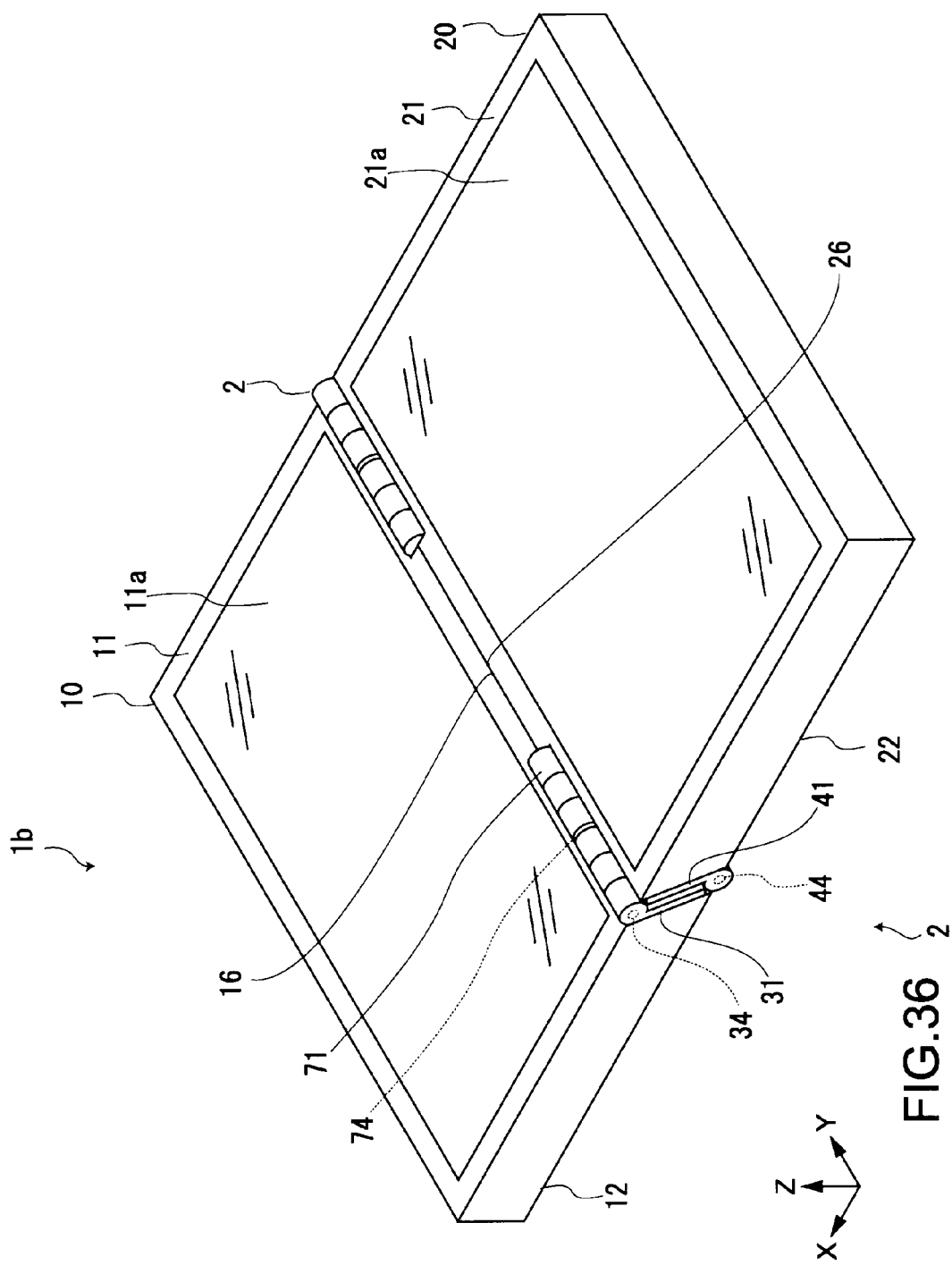
FIG. 36 is a perspective view showing the electronic apparatus of FIG. 35 in the +180° rotation state.

FIG. 36 is a perspective view showing the electronic apparatus 1b in the +180° rotation state.

In the +180° rotation state, the first side surface 16 of the first casing 10 comes to be faced with and in contact with the third side surface 26 of the second casing 20 via the connecting apparatuses 2, 2. Accordingly, in the +180° rotation state, the first main surface 11 of the first casing 10 and the third main surface 21 of the second casing 20 are arranged in parallel and on the same plane.

Figure 37:
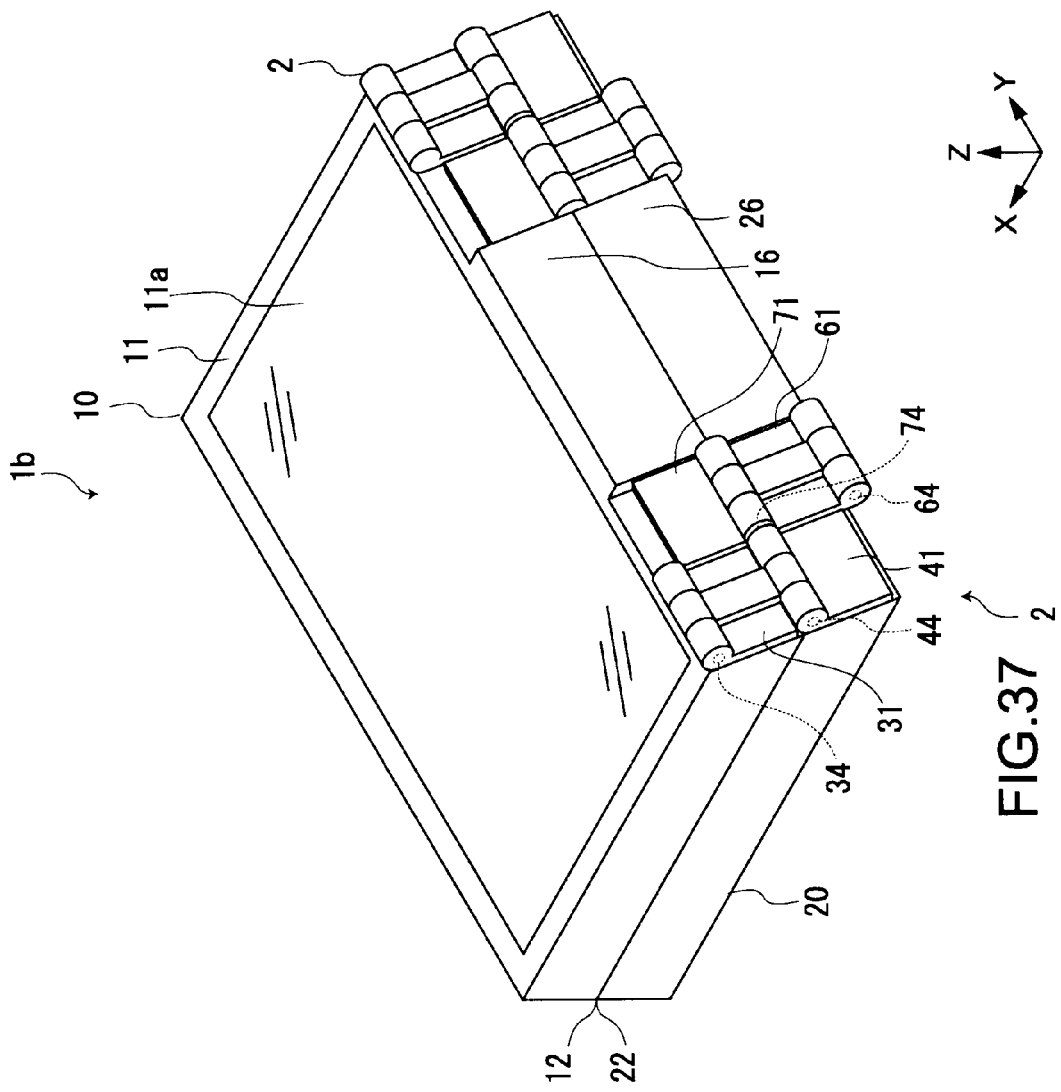
FIG. 37 is a perspective view showing the electronic apparatus of FIG. 35 in the +360° rotation state.

FIG. 37 is a perspective view showing the electronic apparatus 1b in the +360° rotation state.

In the +360° rotation state, the first side surface 16 of the first casing 10 and the third side surface 26 of the second casing 20 are arranged on the same plane.

Second Modified Example

Figure 38:
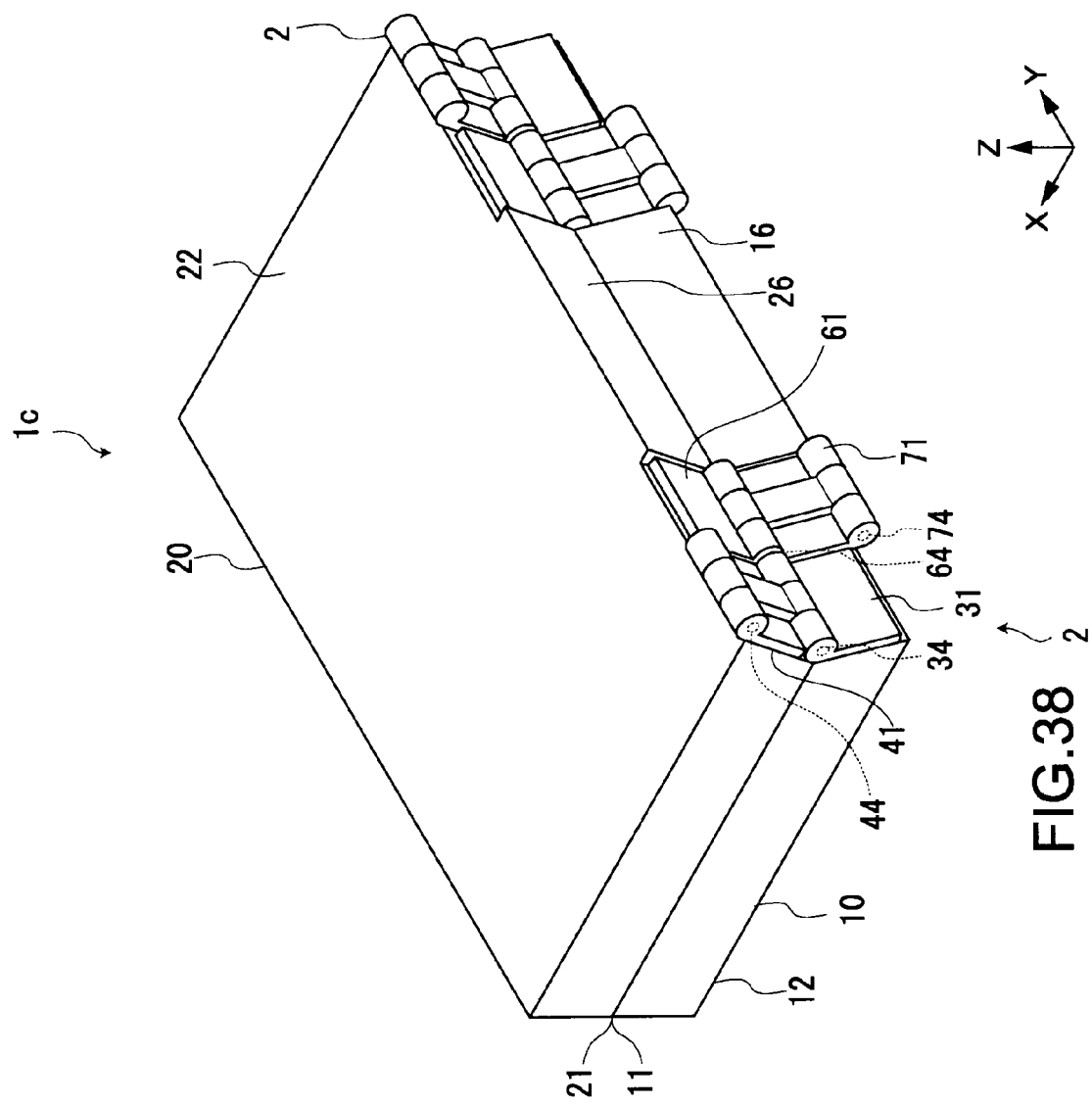
FIG. 38 is a perspective view showing an electronic apparatus in the 0° rotation state according to another modified example of the electronic apparatus of the first embodiment.

FIG. 38 is a perspective view showing an electronic apparatus 1c in the 0° rotation state according to another modified example of the electronic apparatus 1 of the first embodiment.

In the electronic apparatus 1c of this modified example, the thickness of the first casing 10 in the Z-axis direction is the same as the thickness of the second casing 20 in the Z-axis direction. In the first casing 10, the first side surface 16 is inclined with respect to the direction orthogonal to the main surfaces 11, 12. Specifically, the first side surface 16 is inclined such that the angle between the first side surface 16 and the first main surface 11 is obtuse, and the angle between the first side surface 16 and the second main surface 12 is acute. In the second casing 20, the third side surface 26 is inclined with respect to the main surfaces 21, 22 by the angle same as the inclination of the first side surface 16. Specifically, the third side surface 26 is inclined such that the angle between the third side surface 26 and the third main surface 21 is obtuse, and the angle between the third side surface 26 and the fourth main surface 22 is acute. Accordingly, the distance of the sides of the first side surface 16 of the first casing 10 facing in the Z-axis direction is same as the distance of the sides of the third side surface 26 of the second casing 20 facing in the Z-axis direction.

The first casing 10 and the second casing 20 thus structured in the state where the first main surface 11 is overlapped with the third main surface 21 are connected by the connecting apparatuses 2, 2 such that the first casing 10 and the second casing 20 are capable of being rotated relatively. In the connecting apparatus 2, the first rotation shaft 34 of the first hinge plate portion 31 and the third rotation shaft 64 of the third hinge plate portion 61 are in the coaxial relationship and are on the plane on which the third main surface 21 of the second casing 20 is overlapped with the first main surface 11 of the first casing 10. Accordingly, the second casing 20 is capable of being rotated with respect to the first casing 10 about the first rotation shaft 34 and the third rotation shaft 64. Further, the axial center of the second rotation shaft 44 of the second hinge plate portion 41 is arranged on the plane on the fourth main surface 22 of the second casing 20, and the axial center of the fourth rotation shaft 74 of the fourth hinge plate portion 71 is arranged on the plane on the second main surface 12 of the first casing 10. Accordingly, similar to the first embodiment, the second casing 20 is capable of being rotated with respect to the first casing 10 about, in the rotation from 0° to +180°, the first rotation shaft 34 and the third rotation shaft 64 as the fulcrum of the rotation, and in the rotation from +180° to +360°, the second rotation shaft 44 and the fourth rotation shaft 74 as the fulcrum of the rotation.

Figure 39:
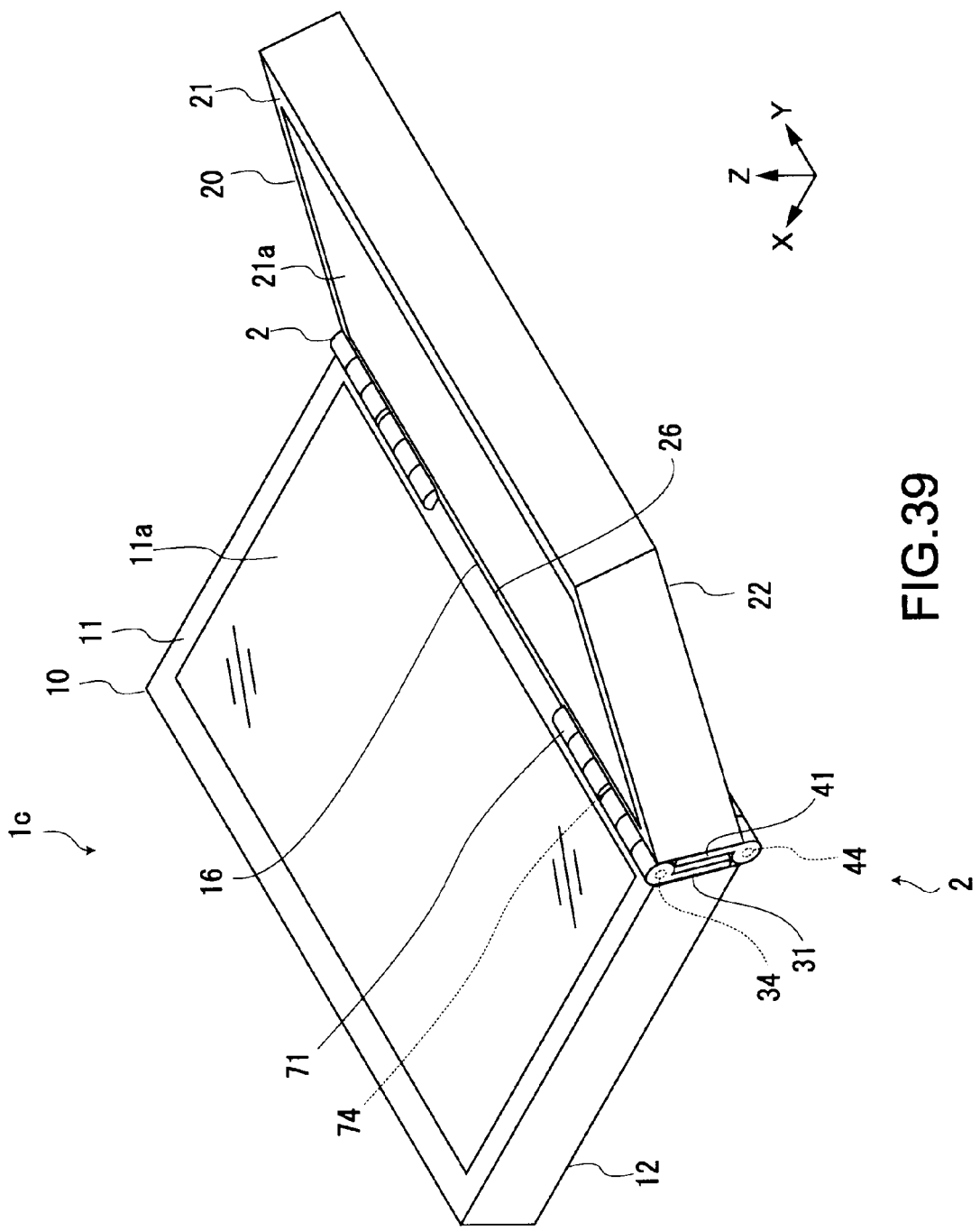
FIG. 39 is a perspective view showing the electronic apparatus of FIG. 38 in the +180° rotation state.

FIG. 39 is a perspective view showing the electronic apparatus 1c in the +180° rotation state.

In the +180° rotation state, the first side surface 16 of the first casing 10 comes to be faced with and in contact with the third side surface 26 of the second casing 20 via the connecting apparatuses 2, 2. Herein, since the angle between the first side surface 16 and the first main surface 11 is obtuse and the angle between the third side surface 26 and the third main surface 21 is obtuse, the second casing 20 is arranged so as to be inclined with respect to the first casing 10.

Note that since the second casing 20 is arranged so as to be inclined with respect to the first casing 10, the angle between the first main surface 11 and the third main surface 21 is not 180° as shown in FIG. 6 and the like. However, in the connecting apparatus 2, the second hinge plate portion 41 is rotated about the first rotation shaft 34 by +180° and comes to be faced with the first hinge plate portion 31, that is, the connecting apparatus 2 is in the state same as the state of the +180° rotation state of the first embodiment as shown in FIG. 6 and the like. Accordingly, in this modified example, although the angle between the first main surface 11 and the third main surface 21 is not 180°, the state where the second hinge plate portion 41 of the connecting apparatus 2 is rotated about the first rotation shaft 34 by +180° is referred to as the "+180° rotation state".

Figure 40:
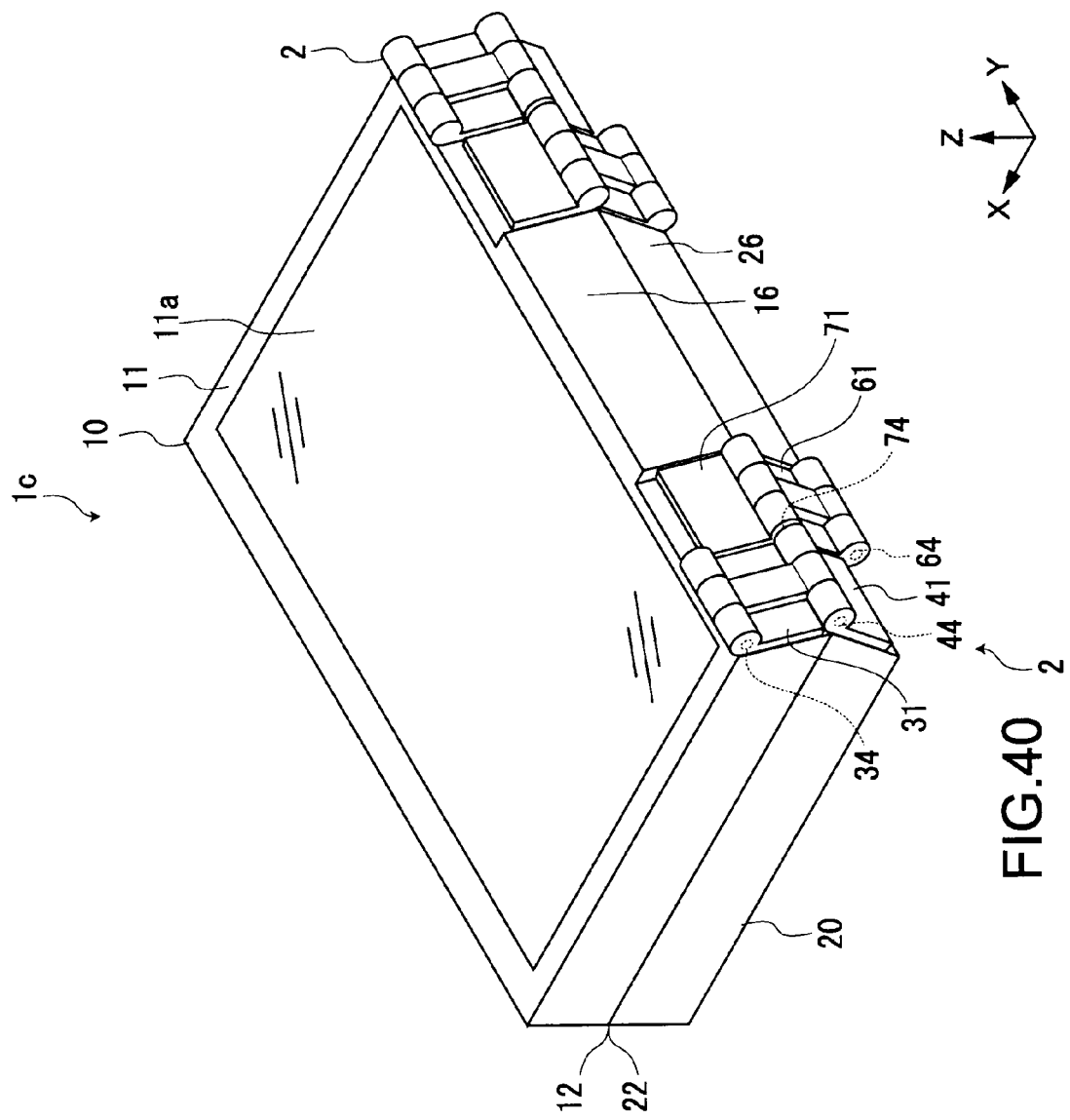
FIG. 40 is a perspective view showing the electronic apparatus of FIG. 38 in the +360° rotation state.

FIG. 40 is a perspective view showing the electronic apparatus 1c in the +360° rotation state.

In the +360° rotation state, the first side surface 16 of the first casing 10 and the third side surface 26 of the second casing 20 connected to the first casing 10 by the connecting apparatuses 2, 2 are arranged on the same plane.

Third Modified Example

FIG. 41 is a plan view showing an electronic apparatus 1d in the 0° rotation state according to a modified example of the electronic apparatus 1a of the second embodiment.

In the electronic apparatus 1d according to this modified example, each of the third and fourth main surfaces 21, 22 of the second casing 20 has a trapezoidal shape in which a side corresponding to the fourth side surface 29 is inclined. Specifically, each of the third and fourth main surfaces 21, 22 of the second casing 20 has a trapezoidal shape in which the side corresponding to the fourth side surface 29 is inclined such that a side corresponding to the third side surface 26 is longer than the side facing this side. Each of the first and second main surfaces 11, 12 of the first casing 10 has the trapezoidal shape same as the trapezoidal shape of each of the third and fourth main surfaces 21, 22 of the second casing 20. The first casing 10 and the second casing 20 thus structured in the state where the first main surface 11 is overlapped with the third main surface 21 are connected by the first, second, and third connecting apparatuses 6, 7, 8 such that the first casing 10 and the second casing 20 are capable of being rotated relatively.

Note that in the electronic apparatus 1d according to this modified example, since each main surface of the first and second casings 10, 20 is a trapezoidal shape, the first and second casings 10, 20 are rotated relatively about the rotation shafts inclined with respect to the X axis. However, for easier understandings, the rotation about the rotation shafts corresponding the rotation shafts along the X axis of the second embodiment will be referred to as "rotation about the X axis" in the following description.

The second side surface 19 and the fourth side surface 29 are arranged on the same plane, and the first side surface 16 and the third side surface 26 are arranged on the same plane. The first, second, and third connecting apparatuses 6, 7, 8 are fixed on those side surfaces. On the second side surface 19 of the first casing 10 and the fourth side surface 29 of the second casing 20, the rotation shafts serving as the fulcrum of the rotation about the X axis from 0° to +180° are coaxially arranged. Accordingly, similar to the second embodiment, the second casing 20 is capable of being rotated with respect to the first casing 10 about the X axis from 0° to +180°.

Figure 42:
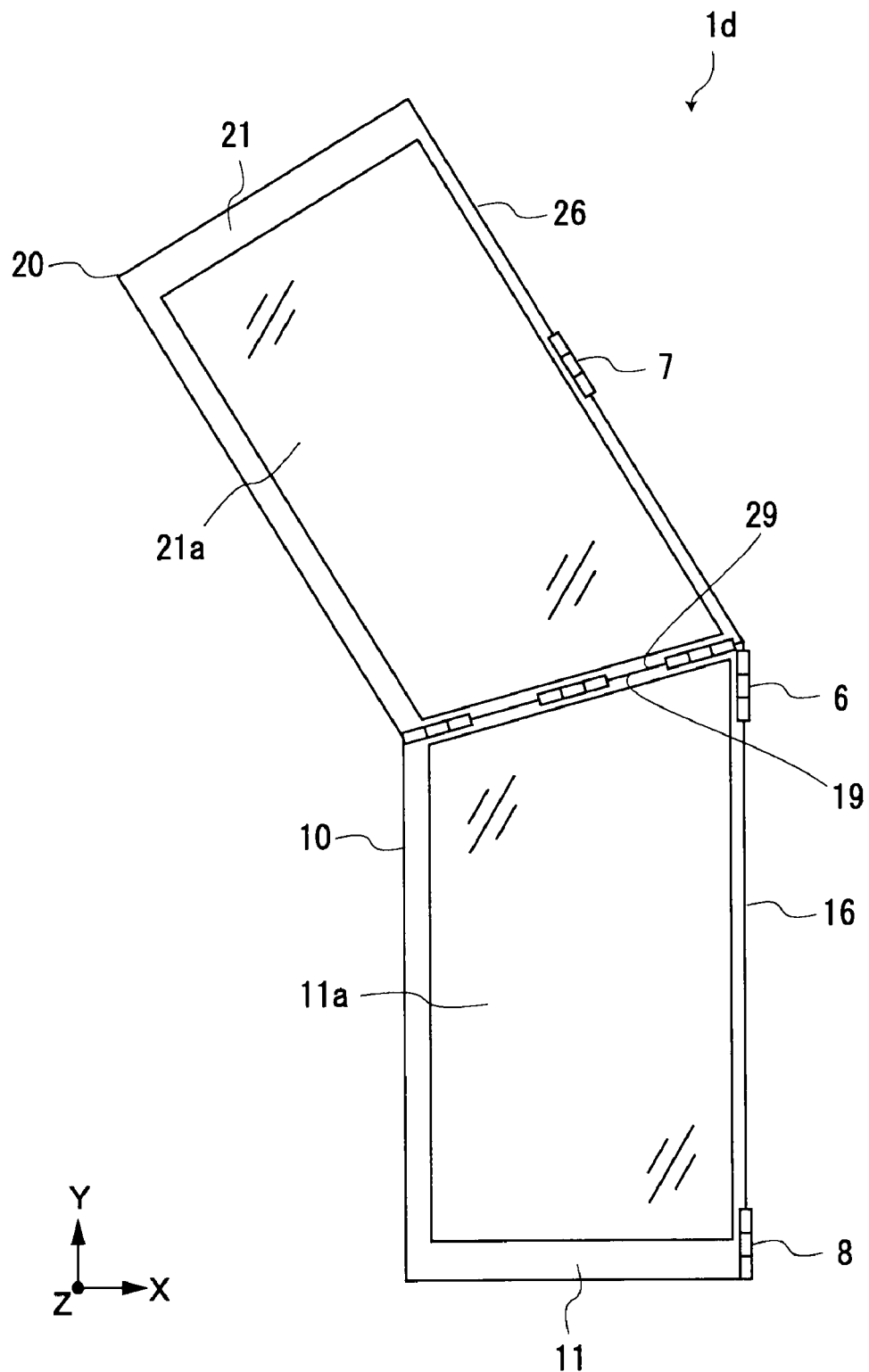
FIG. 42 is a plan view showing the electronic apparatus of FIG. 41 in the X-axis +180° rotation state.

FIG. 42 is a plan view showing the electronic apparatus 1d in the X-axis +180° rotation state.

In the X-axis +180° rotation state, the second side surface 19 of the first casing 10 comes to be faced with and in contact with the fourth side surface 29 of the second casing 20 via the first, second, and third connecting apparatuses 6, 7, 8. Accordingly, in the X-axis +180° rotation state, the first main surface 11 of the first casing 10 and the third main surface 21 of the second casing 20 are arranged on the same plane. On the second side surface 19 of the first casing 10 and the fourth side surface 29 of the second casing 20, the rotation shafts serving as the fulcrum of the rotation about the X axis from +180° to +360° are coaxially arranged. Accordingly, similar to the second embodiment, the second casing 20 is capable of being rotated with respect to the first casing 10 about the X axis from +180° to +360°.

Figure 43:
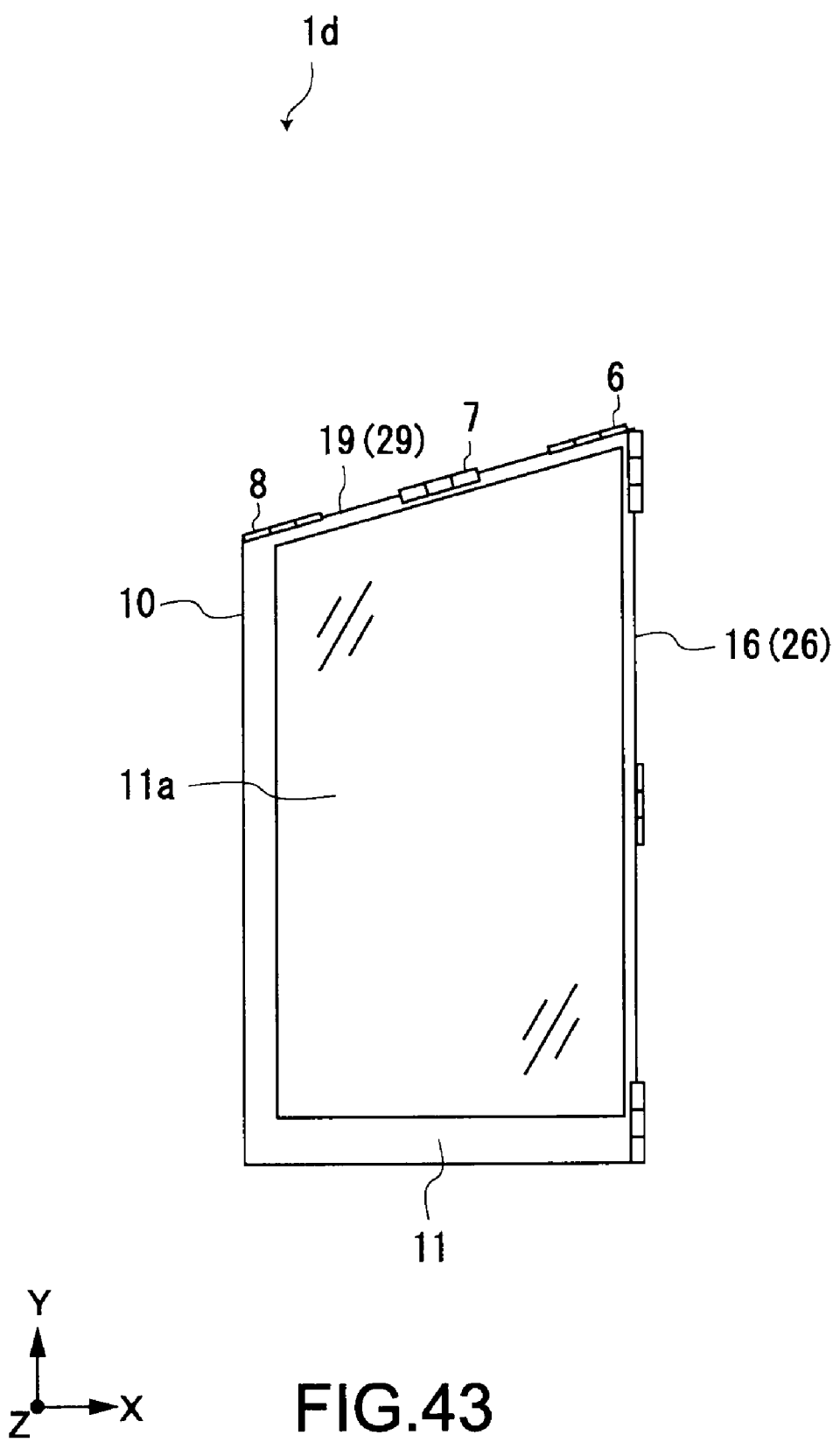
FIG. 43 is a plan view showing the electronic apparatus of FIG. 41 in the X-axis +360° rotation state.

FIG. 43 is a plan view showing the electronic apparatus 1d in the X-axis +360° rotation state.

In the X-axis +360° rotation state, the second main surface 12 of the first casing 10 comes to be faced with and in contact with the fourth main surface 22 of the second casing 20. Accordingly, in the X-axis +360° rotation state, the first side surface 16 of the first casing 10 and the third side surface 26 of the second casing 20 are arranged on the same plane. On the first side surface 16 of the first casing 10 and the third side surface 26 of the second casing 20, the rotation shafts serving as the fulcrum of the rotation about the Y axis from 0° to +180° are coaxially arranged. Accordingly, similar to the second embodiment, the second casing 20 is capable of being rotated with respect to the first casing 10 about the Y axis from 0° to +180°.

FIG. 44 is a plan view showing the electronic apparatus 1d in the Y-axis +180° rotation state.

In the Y-axis +180° rotation state, the first side surface 16 of the first casing 10 comes to be faced with and in contact with the second side surface 26 of the second casing 20 via the first, second, and third connecting apparatuses 6, 7, 8. Accordingly, in the Y-axis +180° rotation state, the first main surface 11 of the first casing 10 and the third main surface 21 of the second casing 20 are arranged on the same plane. On the first side surface 16 of the first casing 10 and the third side surface 26 of the second casing 20, the rotation shafts serving as the fulcrum of the rotation about the Y axis from +180° to +360° are coaxially arranged. Accordingly, similar to the second embodiment, the second casing 20 is capable of being rotated with respect to the first casing 10 about the Y axis from +180° to +360°.

The embodiments according to the present invention are not limited to the embodiments and modified examples as described above, and various modifications are conceivable.

Each of the first casing 10 and the second casing 20 accommodates the touch sensor panel and the display panel in the overlapped manner, but not limited to the above. One casing may accommodate a touch sensor panel and a display panel in an overlapped manner, and the other casing may have a keyboard or the like. Alternatively, one casing may have a display unit such as an LCD as a display panel, and the other casing may have a keyboard or the like.

As an electronic apparatus, a laptop PC is exemplarily employed, but not limited to the above. As an electronic apparatus, a mobile phone, a mobile-type audio visual apparatus, a mobile game apparatus, a PDA (Personal Digital Assistance), an on-screen keyboard, an electronic dictionary, a camera, a display apparatus, an audio visual apparatus, a projector, a game apparatus, a robot apparatus, or other electric appliances may be employed.

The present application contains subject matter related to that disclosed in Japanese Priority Patent Application JP 2009-211852 filed in the Japan Patent Office on Sep. 14, 2009, the entire content of which is hereby incorporated by reference.

What is claimed is:

1. An electronic apparatus, comprising:
a rectangular-parallelepiped first casing;
a rectangular-parallelepiped second casing; and
a first connecting apparatus connecting the first casing and the second casing such that the first casing and the second casing are capable of being rotated relatively in one of a first rotation direction and a second rotation direction orthogonal to each other between a first state and a second state, the first state being a state where a first main surface of the first casing comes to be faced with a third main surface of the second casing, the second state being a state where a second main surface of the first casing comes to be faced with a fourth main surface of the second casing, the first main surface being one main surface of two main surfaces of the first casing, the second main surface being the other main surface which is the backside surface of the first main surface, the third main surface being one main surface of two main surfaces of the second casing, the fourth main surface being the other main surface which is the backside surface of the third main surface,
wherein the first connecting apparatus includes a first hinge unit, a second hinge unit, and a first hinge connecting portion,
wherein the first hinge unit includes
a first rotation shaft serving as a fulcrum of rotation between the first state and a first intermediate state, the first intermediate state being a state where the first main surface of the first casing is in parallel with the third main surface of the second casing in a first rotation process, the first rotation process being a rotation process between the first state and the second state in the first rotation direction,
a first shaft bearing portion fixed on the first casing and pivotally supporting the first rotation shaft,
a second rotation shaft serving as a fulcrum of rotation between the first intermediate state and the second state,
a second shaft bearing portion pivotally supporting the second rotation shaft, and
a first shaft connecting portion connecting the first rotation shaft pivotally supported by the first shaft bearing portion and the second rotation shaft pivotally supported by the second shaft bearing portion such that the first rotation shaft and the second rotation shaft are capable of being rotated,
wherein the second hinge unit includes
a third rotation shaft serving as a fulcrum of rotation between the second state and a second intermediate state, the second intermediate state being a state where the first main surface of the first casing is in parallel with the third main surface of the second casing in a second rotation process, the second rotation process being a rotation process between the first state and the second state in the second rotation direction,
a third shaft bearing portion pivotally supporting the third rotation shaft,
a fourth rotation shaft serving as a fulcrum of rotation between the second intermediate state and the first state,
a fourth shaft bearing portion fixed on the second casing and pivotally supporting the fourth rotation shaft, and
a second shaft connecting portion connecting the third rotation shaft pivotally supported by the third shaft bearing portion and the fourth rotation shaft pivotally supported by the fourth shaft bearing portion such that the third rotation shaft and the fourth rotation shaft are capable of being rotated, and
wherein the first hinge connecting portion connects the second shaft bearing portion and the third shaft bearing portion.

2. The electronic apparatus according to claim 1,
wherein the first casing has a first notch surface having a first wiring opening, the first notch surface being provided on a corner portion formed by the first main surface, the second main surface, a first side surface, and a second side surface, the first side surface coming to be faced with the second casing in the first intermediate state, the second side surface coming to be faced with the second casing in the second intermediate state,
wherein the second casing has a second notch surface having a second wiring opening, the second notch surface being provided on a corner portion formed by the third main surface, the fourth main surface, a third side surface, and a fourth side surface, the third side surface coming to be faced with the first side surface of the first casing in the first intermediate state, the fourth side surface coming to be faced with the second side surface of the first casing in the second intermediate state,
wherein the electronic apparatus further comprises:
a first circuit board accommodated in the first casing;
a second circuit board accommodated in the second casing; and
a wiring electrically connecting the first circuit board and the second circuit board through the first wiring opening and the second wiring opening.

3. The electronic apparatus according to claim 2,
wherein the first side surface of the first casing has a first concave portion,
wherein the second side surface of the first casing has a second concave portion, wherein the third side surface of the second casing coming to be faced with the first side surface of the first casing in the first intermediate state has a third concave portion capable of coming to be faced with the first concave portion, wherein the fourth side surface of the second casing coming to be faced with the second side surface of the first casing in the second intermediate state has a fourth concave portion capable of coming to be faced with the second concave portion, wherein at least a part of the first shaft connecting portion is accommodated in the first concave portion and the third concave portion facing with each other in the first intermediate state, and wherein at least a part of the second shaft connecting portion is accommodated in the second concave portion and the fourth concave portion facing with each other in the second intermediate state.

4. The electronic apparatus according to claim 3, further comprising
a display unit provided in at least one of the first casing and the second casing.

5. The electronic apparatus according to claim 4,
wherein the second main surface of the first casing has a first accommodation concave portion accommodating the first hinge connecting portion in the second rotation process, and
wherein the fourth main surface of the second casing has a second accommodation concave portion accommodating the first hinge connecting portion in the first rotation process.

6. The electronic apparatus according to claim 5, further comprising
a second connecting apparatus connecting, cooperatively with the first connecting apparatus, the first casing and the second casing such that the first casing and the second casing are capable of being rotated relatively in one of the first rotation direction and the second rotation direction orthogonal to each other between the first state and the second state,
wherein the second connecting apparatus includes a third hinge unit, a fourth hinge unit, and a second hinge connecting portion,
wherein the third hinge unit includes
a fifth rotation shaft serving, together with the first rotation shaft, as the fulcrum of rotation between the first state and the first intermediate state in the first rotation process in the first rotation direction,
a fifth shaft bearing portion fixed on the second casing and pivotally supporting the fifth rotation shaft,
a sixth rotation shaft serving, together with the second rotation shaft, as the fulcrum of rotation between the first intermediate state and the second state,
a sixth shaft bearing portion pivotally supporting the sixth rotation shaft, and
a third shaft connecting portion connecting the fifth rotation shaft pivotally supported by the fifth shaft bearing portion and the sixth rotation shaft pivotally supported by the sixth shaft bearing portion such that the fifth rotation shaft and the sixth rotation shaft are capable of being rotated,
wherein the fourth hinge unit includes
a seventh rotation shaft serving, together with the third rotation shaft, as the fulcrum of rotation between the second state and the second intermediate state in the second rotation process in the second rotation direction,
a seventh shaft bearing portion pivotally supporting the seventh rotation shaft,
an eighth rotation shaft serving, together with the fourth rotation shaft, as the fulcrum of rotation between the second intermediate state and the first state,
an eighth shaft bearing portion fixed on the first casing and pivotally supporting the eighth rotation shaft, and
a fourth shaft connecting portion connecting the seventh rotation shaft pivotally supported by the seventh shaft bearing portion and the eighth rotation shaft pivotally supported by the eighth shaft bearing portion such that the seventh rotation shaft and the eighth rotation shaft are capable of being rotated, and
wherein the second hinge connecting portion connects the sixth shaft bearing portion and the seventh shaft bearing portion.

7. An electronic apparatus, comprising:
a rectangular-parallelepiped first casing;
a rectangular-parallelepiped second casing; and
a connecting apparatus connecting the first casing and the second casing such that the first casing and the second casing are capable of being rotated relatively between a first state and a second state, the first state being a state where a first main surface of the first casing comes to be faced with a third main surface of the second casing, the second state being a state where a second main surface of the first casing comes to be faced with a fourth main surface of the second casing, the first main surface being one main surface of two main surfaces of the first casing, the second main surface being the other main surface which is the backside surface of the first main surface, the third main surface being one main surface of two main surfaces of the second casing, the fourth main surface being the other main surface which is the backside surface of the third main surface,
wherein the connecting apparatus includes a first hinge unit and a second hinge unit,
wherein the first hinge unit includes
a first rotation shaft serving as a fulcrum of rotation between the first state and an intermediate state, the intermediate state being a state where the first main surface of the first casing is in parallel with the third main surface of the second casing in a rotation process between the first state and the second state,
a first shaft bearing portion fixed on the first casing and pivotally supporting the first rotation shaft,
a second rotation shaft serving as a fulcrum of rotation between the intermediate state and the second state,
a second shaft bearing portion fixed on the second casing and pivotally supporting the second rotation shaft, and
a first shaft connecting portion connecting the first rotation shaft pivotally supported by the first shaft bearing portion and the second rotation shaft pivotally supported by the second shaft bearing portion,
wherein the second hinge unit includes
a third rotation shaft serving, together with the first rotation shaft, as the fulcrum of rotation between the first state and the intermediate state,
a third shaft bearing portion fixed on the second casing and pivotally supporting the third rotation shaft,
a fourth rotation shaft serving, together with the second rotation shaft, as the fulcrum of rotation between the intermediate state and the second state,
a fourth shaft bearing portion fixed on the first casing and pivotally supporting the fourth rotation shaft, and a second shaft connecting portion connecting the third rotation shaft pivotally supported by the third shaft bearing portion and the fourth rotation shaft pivotally supported by the fourth shaft bearing portion.

8. The electronic apparatus according to claim 7,
wherein a first side surface of the first casing coming to be faced with the second casing in the intermediate state has a first concave portion,
wherein a third side surface of the second casing coming to be faced with the first side surface of the first casing in the intermediate state has a second concave portion capable of coming to be faced with the first concave portion, and
wherein at least a part of the first shaft connecting portion and at least a part of the second shaft connecting portion are accommodated in the first concave portion and the second concave portion facing with each other in the first intermediate state.

9. The electronic apparatus according to claim 8, further comprising
a display unit provided in at least one of the first casing and the second casing.

10. The electronic apparatus according to claim 9,
wherein the first casing has a first notch surface having a first wiring opening, the first notch surface being provided on a corner portion formed by the first main surface, the second main surface, the first side surface, and a second side surface orthogonal to the first side surface,
wherein the second casing has a second notch surface having a second wiring opening, the second notch surface being provided on a corner portion formed by the third main surface, the fourth main surface, the third side surface, and a fourth side surface being in parallel with the second side surface of the first casing in the intermediate state,
wherein the electronic apparatus further comprises:
a first circuit board accommodated in the first casing;
a second circuit board accommodated in the second casing; and
a wiring electrically connecting the first circuit board and the second circuit board through the first wiring opening and the second wiring opening.

11. The electronic apparatus according to claim 9,
wherein the first casing has a first wiring opening provided on a second side surface orthogonal to the first side surface coming to be faced with the second casing in the intermediate state,
wherein the second casing has a second wiring opening provided on a fourth side surface being in parallel with the second side surface of the first casing in the intermediate state, and
wherein the electronic apparatus further comprises:
a first circuit board accommodated in the first casing,
a second circuit board accommodated in the second casing, and
a wiring electrically connecting the first circuit board and the second circuit board through the first wiring opening and the second wiring opening.

12. The electronic apparatus according to claim 9, further comprising:
a first circuit board accommodated in the first casing;
a second circuit board accommodated in the second casing; and
a wiring electrically connecting the first circuit board and the second circuit board,
wherein the wiring is provided on one of the first main surface side and the second main surface side in the first casing, the wiring is provided on the fourth main surface side in the second casing in the case where the wiring is provided on the first main surface side in the first casing, and the wiring is provided on the third main surface side in the second casing in the case where the wiring is provided on the second main surface side in the first casing.

* * * * *